United States Patent
Luo et al.

(10) Patent No.: US 12,120,721 B2
(45) Date of Patent: Oct. 15, 2024

(54) ENHANCEMENTS FOR PERIODIC RESOURCES IN AN INTEGRATED ACCESS AND BACKHAUL NETWORK

(71) Applicant: QUALCOMM Incorporated, San Diego, CA (US)

(72) Inventors: Jianghong Luo, Skillman, NJ (US); Navid Abedini, Basking Ridge, NJ (US); Naeem Akl, Somerville, NJ (US); Karl Georg Hampel, Hoboken, NJ (US); Luca Blessent, Whitehouse Station, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 17/447,021

(22) Filed: Sep. 7, 2021

(65) Prior Publication Data

US 2022/0104215 A1 Mar. 31, 2022

Related U.S. Application Data

(60) Provisional application No. 63/083,513, filed on Sep. 25, 2020, provisional application No. 63/083,511, (Continued)

(51) Int. Cl.
*H04W 72/542* (2023.01)
*H04L 5/00* (2006.01)
(Continued)

(52) U.S. Cl.
CPC ......... *H04W 72/542* (2023.01); *H04L 5/0082* (2013.01); *H04W 72/044* (2013.01); *H04W 72/23* (2023.01); *H04W 72/566* (2023.01)

(58) Field of Classification Search
CPC . H04W 72/542; H04W 72/566; H04W 72/23; H04W 72/044; H04L 5/0082;
(Continued)

(56) References Cited

U.S. PATENT DOCUMENTS

| 2013/0034071 A1* | 2/2013 | Lee | H04W 72/23 370/329 |
| 2014/0233419 A1* | 8/2014 | Cheng | H04W 72/542 370/252 |

(Continued)

FOREIGN PATENT DOCUMENTS

| WO | WO-2020029868 A1 * | 2/2020 | ........... H04B 7/0626 |

OTHER PUBLICATIONS

International Search Report and Written Opinion—PCT/US2021/071392—ISA/EPO—Jan. 4, 2022.

*Primary Examiner* — Jackie Zuniga Abad
*Assistant Examiner* — Latresa A McCallum
(74) *Attorney, Agent, or Firm* — Kevin M. Donnelly; Harrity & Harrity, LLP

(57) ABSTRACT

Various aspects of the present disclosure generally relate to wireless communication. In some aspects, a wireless node may receive an indication of a first periodic resource associated with the wireless node, wherein the first periodic resource is associated with one or more parameters for coordinating periodic resources or a priority flag that indicates that the first periodic resource is available to the wireless node irrespective of a resource type associated with the first periodic resource. The wireless node may communicate, with a child node or another wireless node, a message using a modified first periodic resource, wherein the modified first periodic resource includes a modified resource allocation associated with the first periodic resource or a
(Continued)

modified resource type associated with first periodic resource. Numerous other aspects are provided.

30 Claims, 29 Drawing Sheets

Related U.S. Application Data filed on Sep. 25, 2020, provisional application No. 63/198,052, filed on Sep. 25, 2020.

(51) Int. Cl.
*H04W 72/044* (2023.01)
*H04W 72/23* (2023.01)
*H04W 72/566* (2023.01)

(58) Field of Classification Search
CPC ... H04L 5/0064; H04L 5/0091; H04L 5/0094; H04L 5/14
See application file for complete search history.

(56) References Cited

U.S. PATENT DOCUMENTS

| | | | |
|---|---|---|---|
| 2017/0208483 A1* | 7/2017 | Chmiel | H04W 24/02 |
| 2018/0139734 A1* | 5/2018 | Babaei | H04W 72/23 |
| 2018/0324889 A1* | 11/2018 | Babaei | H04L 5/0098 |
| 2018/0368205 A1* | 12/2018 | Park | H04L 41/06 |
| 2019/0349079 A1* | 11/2019 | Novlan | H04B 7/15542 |
| 2019/0394738 A1* | 12/2019 | Abedini | H04W 74/0833 |
| 2020/0053745 A1 | 2/2020 | Luo et al. | |
| 2021/0143959 A1* | 5/2021 | Xu | H04W 40/22 |
| 2021/0345345 A1* | 11/2021 | Liu | H04W 72/20 |
| 2021/0367660 A1* | 11/2021 | Jo | H04W 72/53 |
| 2023/0180248 A1* | 6/2023 | Shim | H04L 5/0032 370/329 |

* cited by examiner

ENHANCEMENTS FOR PERIODIC RESOURCES IN AN INTEGRATED ACCESS AND BACKHAUL NETWORK

CROSS-REFERENCE TO RELATED APPLICATIONS

This Patent Application claims priority to U.S. Patent Application No. 63/083,511, filed on Sep. 25, 2020, entitled "PERIODIC RESOURCE COORDINATION IN AN INTEGRATED ACCESS AND BACKHAUL NETWORK," and assigned to the assignee hereof. This Patent Application also claims priority to U.S. Patent Application No. 63/083,513, filed on Sep. 25, 2020, entitled "DOWNLINK CONFIGURED GRANT IN AN INTEGRATED ACCESS AND BACKHAUL NETWORK," and assigned to the assignee hereof. This Patent Application also claims priority to U.S. Patent Application No. 63/198,052, filed on Sep. 25, 2020, entitled "PRIORITY FLAG SIGNALING FOR PERIODIC RESOURCES," and assigned to the assignee hereof. The disclosures of the prior Applications are considered part of and are incorporated by reference into this Patent Application.

FIELD OF THE DISCLOSURE

Aspects of the present disclosure generally relate to wireless communication and specifically, to techniques and apparatuses for providing enhancements for periodic resources in an integrated access and backhaul (IAB) network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

For periodic or deterministic low latency traffic, such as time sensitive communication (TSC) traffic, a wireless node may be required to satisfy strict latency requirements when forwarding or relaying traffic between a parent node of the wireless node and a child node of the wireless node. A wireless node may be an integrated access and backhaul (IAB) node that includes a mobile termination (MT) component and a distributed unit (DU) component. For periodic traffic, one approach to satisfying the strict latency requirements is to allocate periodic resources in advance, such as via downlink semi-persistent scheduling (SPS) or an uplink configured grant, so that a dynamic downlink control information (DCI) grant may not be required for each data transmission of the periodic traffic. For downlink SPS and some uplink configured grant types, the allocation includes a radio resource control (RRC) configuration of basic parameters, such as a periodicity or a quantity of hybrid automatic repeat request (HARD) processes, among other examples. The RRC configuration may be transmitted by a central unit (CU) of an integrated access and backhaul (IAB) donor. The allocation may include an activation DCI grant with detailed allocation information (for example, time and frequency resource allocation, modulation and coding scheme (MCS), or an antenna port, among other examples). The activation DCI grant may be transmitted by a scheduling node. The scheduling node may be a node that is scheduling a communication, such as the CU of the IAB node, or another IAB node (for example, a parent node).

In some cases, a MT component of the wireless node may be allocated with periodic resources for the TSC traffic by a DU component of a parent node of the wireless node (for example, a scheduling node that is scheduling a communication for the wireless node) via an activation DCI grant. A DU component of the wireless node may allocate corresponding periodic resources for the MT component of a child node of the wireless node via an activation DCI grant. However, because the periodic resources associated with the MT component of the wireless node may be determined or allocated by the parent node of the wireless node, and the periodic resources associated with the DU component of the wireless node may be determined or allocated by the DU component of the wireless node, it may be difficult to ensure that the periodic resources associated with the MT component and the periodic resources associated with the DU component are configured such that the strict latency requirements associated with forwarding or relaying TSC traffic are satisfied (for example, because the DU component may configure the periodic resources associated with the DU component prior to the MT component receiving the allocation for the periodic resources associated with the MT component).

SUMMARY

Some aspects described herein relate to a wireless node for wireless communication. The wireless node may include at least one processor and at least one memory, communicatively coupled with the at least one processor, that stores processor-readable code. The processor-readable code, when executed by the at least one processor, may be configured to cause the wireless node to receive an indication of a first periodic resource associated with the wireless node, wherein the first periodic resource is associated with one or more parameters for coordinating periodic resources or a priority flag that indicates that the first periodic resource is available to the wireless node irrespective of a resource type associated with the first periodic resource. The processor-readable code, when executed by the at least one processor, may be configured to cause the wireless node to communicate, with a child node or another wireless node, a message using a modified first periodic resource, wherein the modified first periodic resource includes a modified resource allocation associated with the first periodic resource or a modified resource type associated with first periodic resource.

Some aspects described herein relate to a method of wireless communication performed by a wireless node. The method may include receiving an indication of a first periodic resource associated with the wireless node, wherein the first periodic resource is associated with one or more parameters for coordinating periodic resources or a priority flag that indicates that the first periodic resource is available to the wireless node irrespective of a resource type associated with the first periodic resource. The method may include communicating, with a child node or another wireless node, a message using a modified first periodic resource, wherein the modified first periodic resource includes a modified resource allocation associated with the first periodic resource or a modified resource type associated with first periodic resource.

Some aspects described herein relate to a non-transitory computer-readable medium that stores a set of instructions for wireless communication by a wireless node. The set of instructions, when executed by one or more processors of the wireless node, may cause the wireless node to receive an indication of a first periodic resource associated with the wireless node, wherein the first periodic resource is associated with one or more parameters for coordinating periodic resources or a priority flag that indicates that the first periodic resource is available to the wireless node irrespective of a resource type associated with the first periodic resource. The set of instructions, when executed by one or more processors of the wireless node, may cause the wireless node to communicate, with a child node or another wireless node, a message using a modified first periodic resource, wherein the modified first periodic resource includes a modified resource allocation associated with the first periodic resource or a modified resource type associated with first periodic resource.

Some aspects described herein relate to an apparatus for wireless communication. The apparatus may include means for receiving an indication of a first periodic resource associated with the wireless node, wherein the first periodic resource is associated with one or more parameters for coordinating periodic resources or a priority flag that indicates that the first periodic resource is available to the wireless node irrespective of a resource type associated with the first periodic resource. The apparatus may include means for communicating, with a child node or another wireless node, a message using a modified first periodic resource, wherein the modified first periodic resource includes a modified resource allocation associated with the first periodic resource or a modified resource type associated with first periodic resource.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
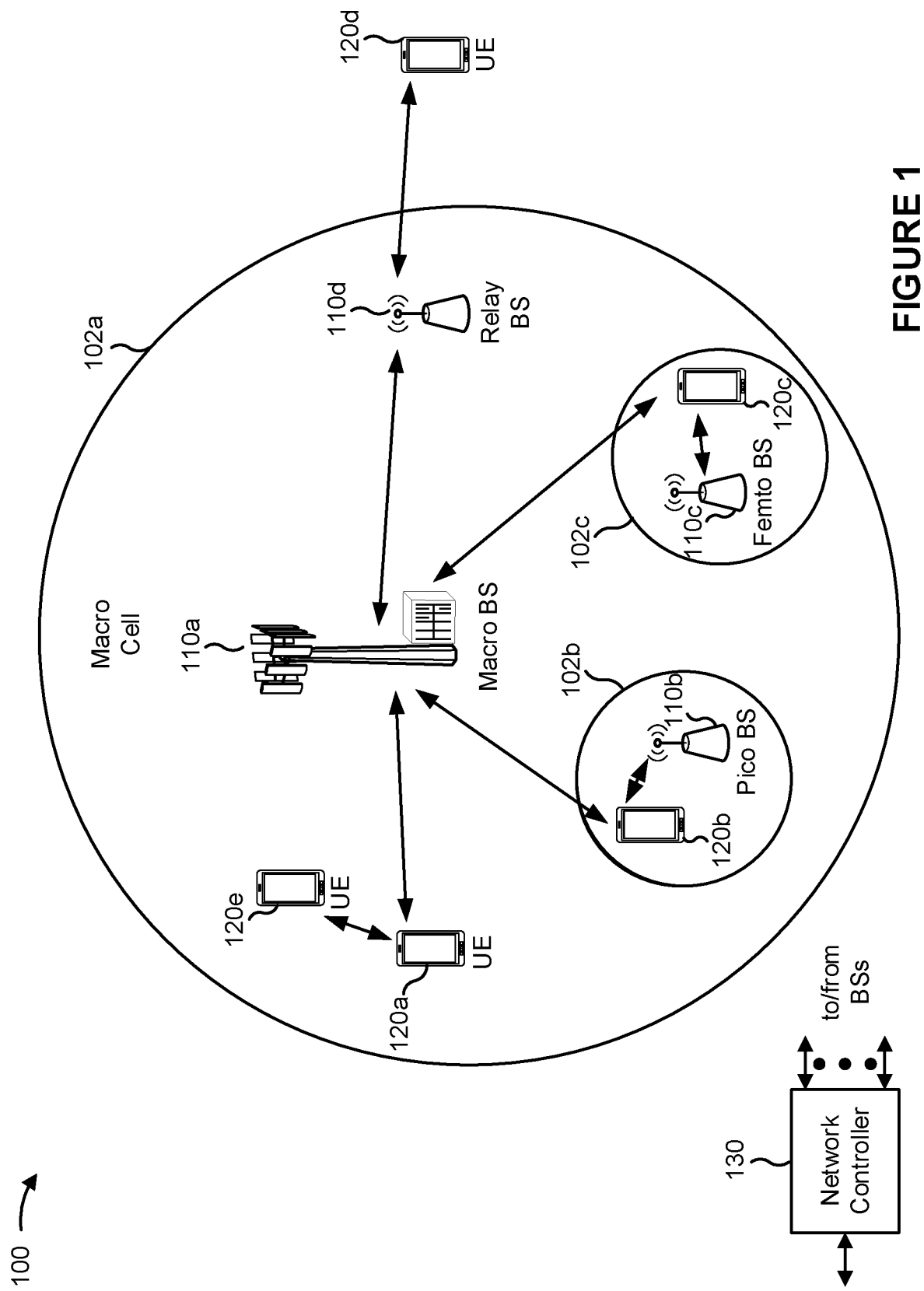
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to enhancements for periodic resources in an integrated access and backhaul (IAB) network. Some aspects more specifically relate to periodic resource coordination in an IAB network. Some aspects more specifically relate to coordinating periodic resources associated with a mobile termination (MT) component of an IAB node with periodic resources associated with a distributed unit (DU) of the IAB node. In some aspects, the IAB node may identify (for example, determine or receive an indication of) one or more parameters for coordinating periodic resources that are associated with the MT component of the IAB node with periodic resources that are associated with the DU of the IAB node. For example, the one or more parameters may indicate a time gap, or a range of time gaps, between periodic resources that are associated with the MT component of the IAB node and periodic resources that are associated with the DU of the IAB node.

In some aspects, the IAB node may receive an activation message for activating a first periodic resource that is associated with the MT component of the IAB node. In some aspects, the IAB node may determine whether a second periodic resource, that corresponds to the first periodic resource and is associated with the DU of the IAB node, satisfies the one or more parameters. For example, the IAB node may be a relay node that forwards periodic communications between a parent node of the IAB node and a child node of the IAB node. In some examples, the first periodic resource may be a downlink periodic resource for receiving downlink communications from the parent node. In such examples, the second periodic resource may be a corresponding downlink periodic resource that is used to forward the downlink communications, that are received from the parent node using the first periodic resource, to the child node. In some other examples, the first periodic resource may be an uplink periodic resource for transmitting uplink communications to the parent node. In such examples, the second periodic resource may be a corresponding uplink periodic resource that is used to receive uplink communications, from the child node, that are to be forwarded to the parent node using the first periodic resource.

If the IAB node determines that the second periodic resource does not satisfy the one or more parameters, the IAB node may modify a resource allocation associated with the second periodic resource. In some aspects, the IAB node may transmit, to the child node associated with the IAB node, an activation message associated with the second periodic resource that indicates the modified resource allocation associated with the second periodic resource. The IAB node may communicate periodic communications (downlink communications or uplink communications) using the first periodic resource and the second periodic resource. For example, the IAB node may communicate (for example, transmit or receive) communications via the MT component using the first periodic resource. The IAB node may communicate (for example, transmit or receive) communications via the DU using the second periodic resource (for example, that may be modified by the DU as described in more detail elsewhere herein).

In some other aspects, a central unit (CU) of an IAB donor may configure a downlink configured grant in an IAB network. In some examples, the CU of the IAB donor determines resource locations for downlink periodic resources in the IAB network. In some examples, the CU of the IAB donor may determine full grant information for downlink periodic resources in the IAB network, such that IAB nodes within the IAB network may communicate using the downlink periodic resources without an activation message. In some other examples, the CU of the IAB donor may determine partial grant information for downlink periodic resources in the IAB network that includes a resource location of the downlink periodic resources. In some such examples, if the CU of the IAB donor determines partial grant information, remaining grant information (for example, information required for an IAB node to communicate using the downlink periodic resources that is not indicated in the partial grant information) may be indicated in an activation message.

In some examples, the CU of the IAB donor may determine the resource locations of the downlink periodic resources based at least in part on a traffic pattern within the IAB network, a duplex communication mode capability of IAB nodes within the communication path, an IAB resource type pattern of IAB nodes within the communication path, an average link quality across the communication path, a processing capability of IAB nodes within the communication path, or a latency requirement of IAB nodes within the communication path, among other examples. In some examples, the CU of the IAB node may configure resource locations of the downlink periodic resources via a periodicity and offset values associated with the downlink periodic resources.

In some other aspects, a priority flag may be assigned to a resource to indicate that the resource is available to an IAB node, irrespective of a resource type associated with the resource. For examples, assigning a priority flag to the resource may enable the resource to be used by the IAB node even when the resource corresponds to a not available (NA) resource type. In some examples, the resource may correspond to a downlink semi-persistent scheduling (SPS) occasion or an uplink configured grant, and the resource may correspond to an NA resource type. In other words, the priority flag assigned to the resource may override the resource type associated with the resource.

Particular aspects of the subject matter described in this disclosure can be implemented to realize one or more of the following potential advantages. In some examples, the described techniques can be used to coordinate periodic resources between a DU of an IAB node and an MT component of the IAB node for periodic low latency traffic. Therefore, a resource allocation of a periodic resource associated with the DU of the IAB node may be based at least in part on a resource allocation of a periodic resource associated with the MT component of the wireless node. As a result, traffic may be forwarded by the IAB node to a next-hop wireless node at an earliest possible time, thereby reducing the latency associated with forwarding the traffic.

In some examples, the described techniques can be used to optimize resource locations for downlink periodic resources for periodic low latency traffic across multiple hops in an IAB network. For example, the CU of the IAB donor may utilize information available to the CU that relates to the entire IAB network to coordinate resource locations for downlink periodic resources across a communication path for periodic low latency traffic. As a result, the CU of the IAB donor may reduce latency associated with communicating the periodic low latency traffic across a communication path that includes multiple hops or multiple wireless nodes. Moreover, the CU of the IAB donor may optimize a downlink periodic resource pattern across multiple hops to reduce a resource confliction among the multiple wireless nodes included in the communication path.

In some examples, the described techniques can be used to reduce latency associated with communications in an IAB network. For example, a downlink SPS occasion or an uplink configured grant corresponding to the resource may not be canceled, which may allow a communication involving the IAB node to occur with reduced latency, in part because a dynamic grant may not be configured for the communication, which would increase the latency.

FIG. 1 is a diagram illustrating an example of a wireless network in accordance with the present disclosure. The wireless network may be or may include elements of a 5G (NR) network or an LTE network, among other examples. The wireless network may include one or more base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, such as macro BSs, pico BSs, femto BSs, or relay BSs. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol), a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies.

Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
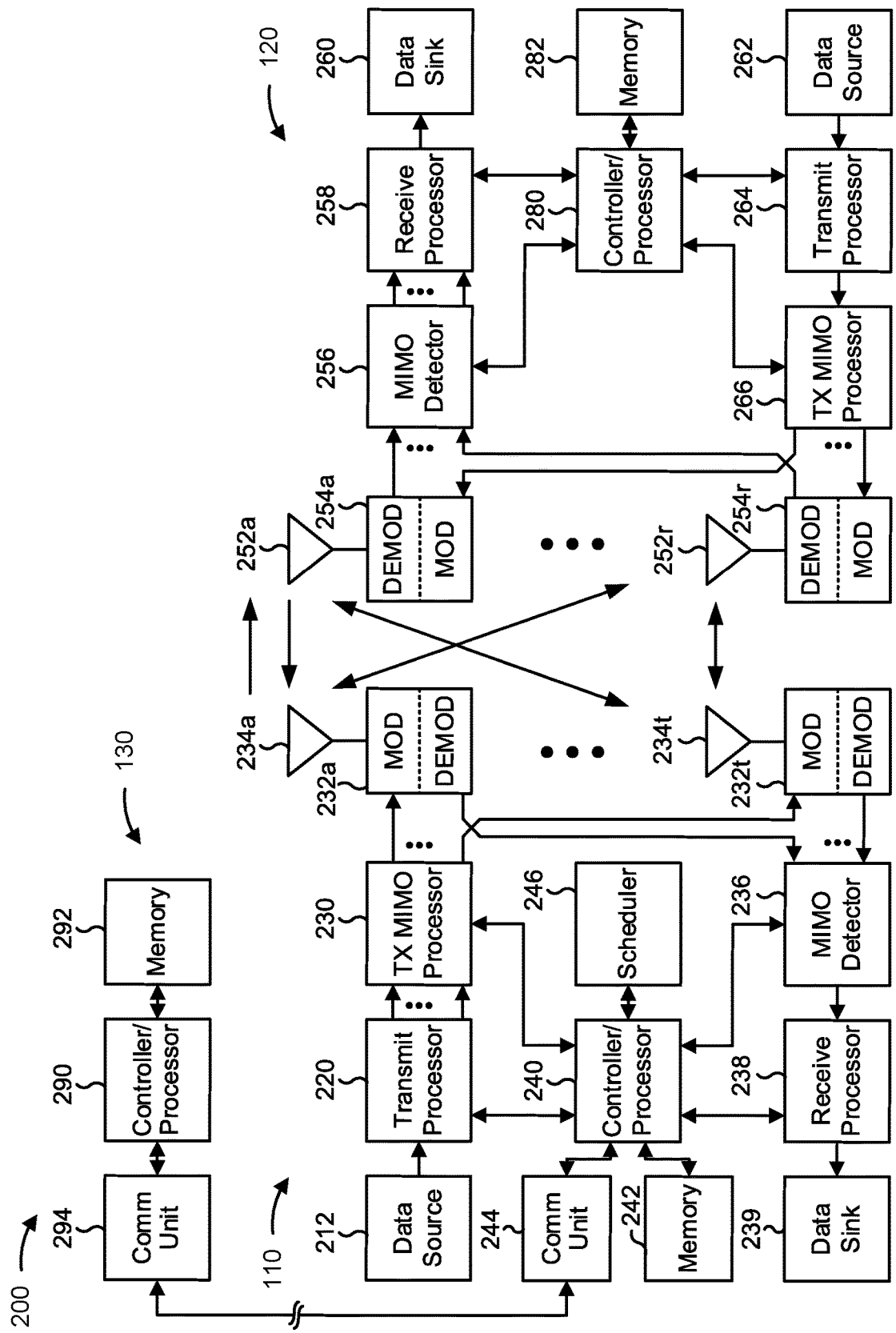
FIG. 2 is a diagram illustrating an example base station (BS) in communication with a user equipment (UE) in a wireless network in accordance with the present disclosure.

FIG. 2 is a diagram illustrating an example base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination of one or more controllers and one or more processors. A channel processor may determine one or more of a reference signal received power (RSRP) parameter, a received signal strength indicator (RSSI) parameter, a reference signal received quality (RSRQ) parameter, or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM)), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with enhancements for periodic resources in an IAB network, as described in more detail elsewhere herein. For example, controller/processor 240 of base station 110, controller/processor 280 of UE 120, or any other component(s) of FIG. 2 may perform or direct operations of, for example, process 1600 of FIG. 16, process 1700 of FIG. 17, process 1800 of FIG. 18, process 1900 of FIG. 19, process 2000 of FIG. 20, process 2100 of FIG. 21, process 2200 of FIG. 22, process 2300 of FIG. 23, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 1600 of FIG. 16, process 1700 of FIG. 17, process 1800 of FIG. 18, process 1900 of FIG. 19, process 2000 of FIG. 20, process 2100 of FIG. 21, process 2200 of FIG. 22, process 2300 of FIG. 23, or other processes as described herein. In some aspects, executing instructions may include running the instructions, converting the instructions, compiling the instructions, or interpreting the instructions, among other examples.

In some aspects, a wireless node includes means for receiving an indication of a first periodic resource associated with the wireless node, wherein the first periodic resource is associated with one or more parameters for coordinating periodic resources or a priority flag that indicates that the first periodic resource is available to the wireless node irrespective of a resource type associated with the first periodic resource. In some aspects, the wireless node includes means for communicating, with a child node or another wireless node, a message using a modified first periodic resource, wherein the modified first periodic resource includes a modified resource allocation associated with the first periodic resource or a modified resource type associated with first periodic resource. The means for the wireless node to perform operations described herein may include, for example, transmit processor 220, TX MIMO processor 230, modulator 232, antenna 234, demodulator 232, MIMO detector 236, receive processor 238, controller/processor 240, memory 242, scheduler 246, antenna 252, demodulator 254, MIMO detector 256, receive processor 258, transmit processor 264, TX MIMO processor 266, modulator 254, controller/processor 280, or memory 282.

Figure 3:
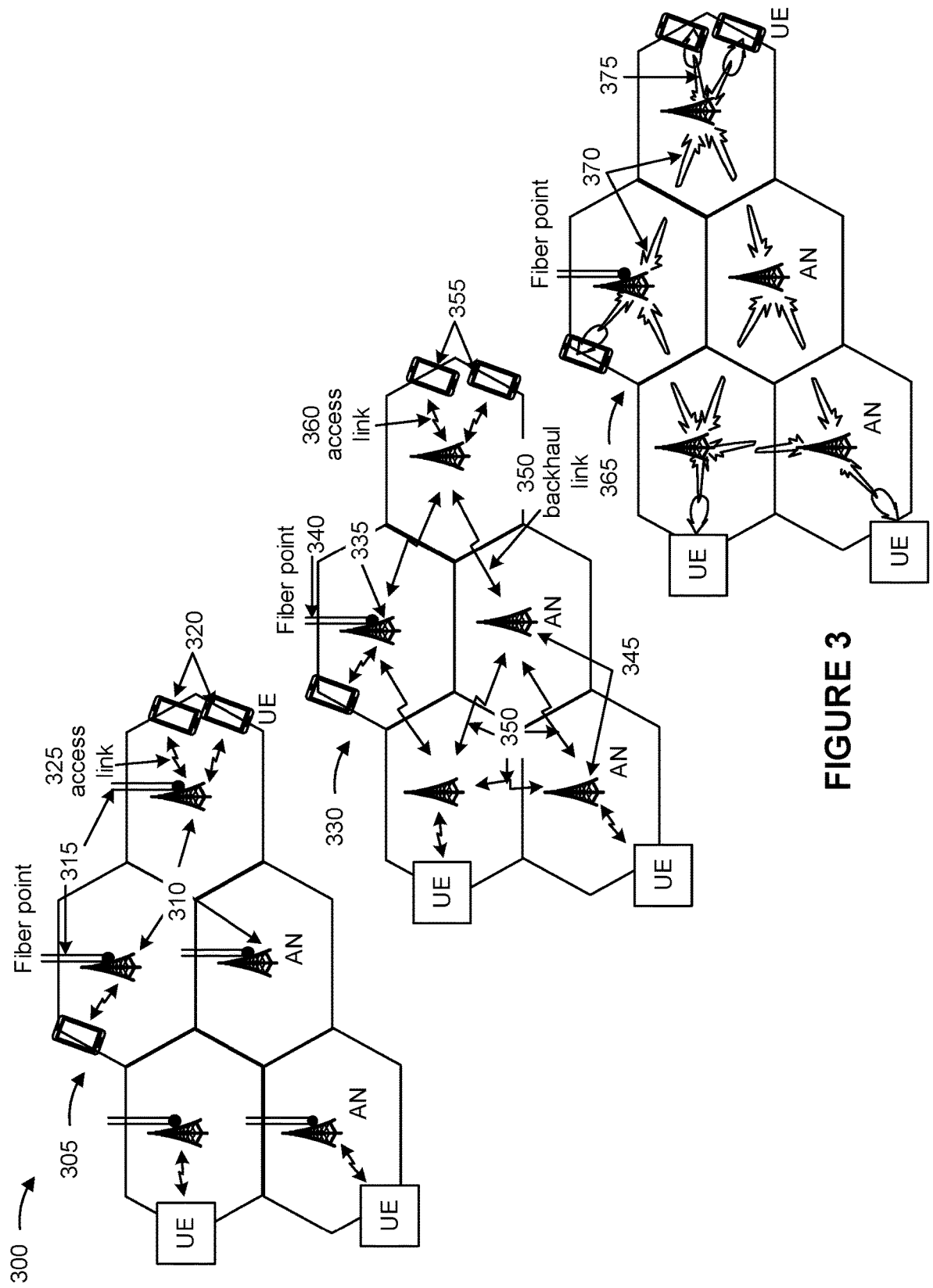
FIG. 3 is a diagram illustrating examples of radio access networks, in accordance with the disclosure.

FIG. 3 is a diagram illustrating examples of radio access networks 300, in accordance with the disclosure. As shown in FIG. 3, a radio access network 305 (for example, a 3G network, a 4G network, or an LTE network) may include multiple base stations 310 (for example, access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

A radio access network 330 may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (for example, via one or more non-anchor base stations 345) to form a backhaul path to the core network for carrying backhaul traffic. Backhaul link 350 may be a wireless link. Anchor base station(s) 335 or non-anchor base station(s) 345 may communicate with one or more UEs 355 via access links 360, which may be wireless links for carrying access traffic. In some aspects, an anchor base station 335 or a non-anchor base station 345 shown in FIG. 3 may be a base station 110 shown in FIG. 1. In some aspects, a UE 355 shown in FIG. 3 may be a UE 120 shown in FIG. 1.

In some aspects, a radio access network 365 that includes an IAB network may utilize millimeter wave technology or directional communications (for example, beamforming) for communications between base stations or UEs (for example, between two base stations, between two UEs, or between a base station and a UE). For example, wireless backhaul links 370 between base stations may use millimeter wave signals to carry information or may be directed toward a target base station using beamforming. Similarly, the wireless access links 375 between a UE and a base station may use millimeter wave signals or may be directed toward a target wireless node (for example, a UE or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (for example, a peer-to-peer network or a device-to-device network). In such examples, "anchor node" may refer to a UE that is directly in communication with a base station (for example, an anchor base station or a non-anchor base station).

Figure 4:
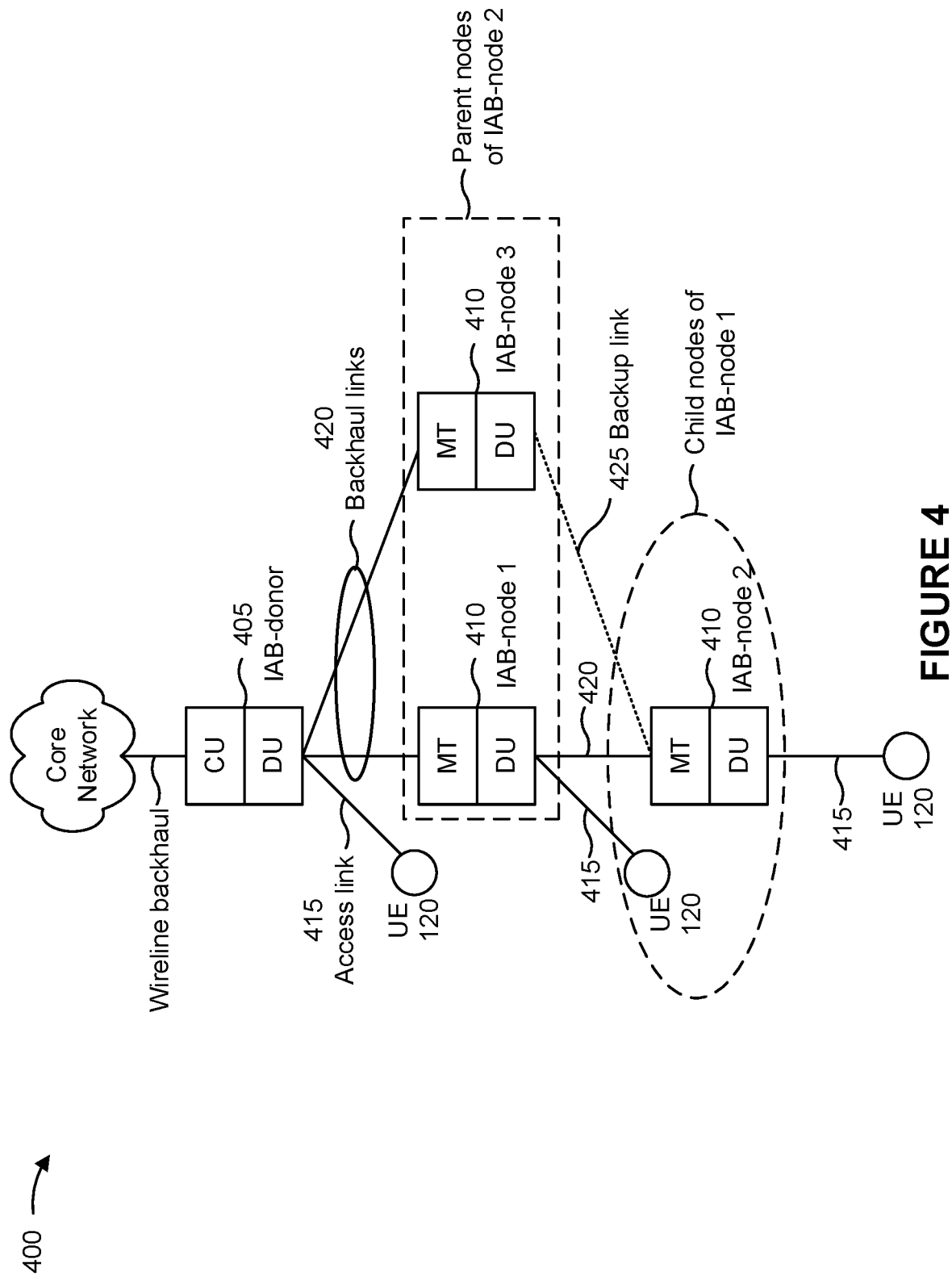
FIG. 4 is a diagram illustrating an example of an integrated access and backhaul (IAB) network architecture, in accordance with the disclosure.

FIG. 4 is a diagram illustrating an example of an IAB network architecture 400, in accordance with the disclosure. As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally or alternatively, an IAB donor 405 may connect to one or more devices of the core network that provide a core access and mobility management function (AMF).

In some aspects, an IAB donor 405 may include a base station 110, such as an anchor base station, as described above in connection with FIG. 3. As shown, an IAB donor 405 may include a CU, which may perform access node controller (ANC) functions or AMF functions, among other examples. The CU may configure a DU of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (for example, a child node) may be controlled or scheduled by another IAB node 410 (for example, a parent node of the child node) or by an IAB donor 405. The DU functions of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node, a scheduled component, or an MT component. In some aspects, an IAB donor 405 may include DU functions and not MT functions. That is, an IAB donor 405 may configure, control, or schedule communications of IAB nodes 410 or UEs 120. A UE 120 may include only MT functions, and not DU functions. That is, communications of a UE 120 may be controlled or scheduled by an IAB donor 405 or an IAB node 410 (for example, a parent node of the UE 120).

When a first node controls or schedules communications for a second node (for example, when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control or schedule communications for child nodes of the parent node. A parent node may be an IAB donor 405 or an IAB node 410, and a child node may be an IAB node 410 or a UE 120. Communications of an MT function of a child node may be controlled or scheduled by a parent node of the child node.

As further shown in FIG. 4, a link between a UE 120 (for example, which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (for example, time resources, frequency resources, or spatial resources, among other examples) may be shared between access links 415 and backhaul links 420. In some aspects, a backhaul link 420 may be a primary backhaul link or a secondary backhaul link (for example, a backup backhaul link). In some aspects, a secondary backhaul link may be used if a primary backhaul link fails, becomes congested, or becomes overloaded, among other examples. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

In some aspects, an IAB node 410 may be capable communicating in a half-duplex communication mode or a full-duplex communication mode. In a half-duplex communication mode, the IAB node 410 may be capable of either transmitting or receiving at a time. That is, the IAB node 410 may not be capable of transmitting and receiving at the same time when operating in a half-duplex communication mode. In some aspects, a half-duplex communication mode may require time division multiplexing (TDM). If the half-duplex communication mode requires TDM, the IAB node 410 may communicate (for example, transmit or receive) using an MT function of the IAB node 410 or may communicate using a DU function of the IAB node. That is, the IAB node 410 may not be capable of communicating using the MT function of the IAB node 410 and the DU function of the IAB node 410 at the same time. In some aspects, a half-duplex communication mode may include spatial division multiplexing (SDM) or frequency division multiplexing (FDM) for transmitting or receiving. If the half-duplex communication mode includes SDM or FDM for transmitting, the IAB node 410 may be capable of transmitting using the MT function of the IAB node 410 and transmitting using the DU function of the IAB node 410 at the same time. If the half-duplex communication mode includes SDM or FDM for receiving, the IAB node 410 may be capable of receiving using the MT function of the IAB node 410 and receiving using the DU function of the IAB node 410 at the same time.

In a full-duplex communication mode, the IAB node 410 may be capable of transmitting and receiving at the same time. For example, the MT function and the DU function of the IAB node 410 may be capable of transmitting and receiving at the same time. The MT function of the IAB node 410 may be capable of transmitting a communication to a parent node at the same time that the DU function of the IAB node 410 is receiving a communication from a child node. Similarly, while operating in the full-duplex communication mode, the MT function of the IAB node 410 may be capable of receiving a communication from a parent node at the same time that the DU function of the IAB node 410 is transmitting a communication to a child node. As used herein, a "duplex communication capability" or a "duplex communication mode" of an IAB node 410 may refer to the half-duplex communication mode or the full-duplex communication mode described above.

An access link 415 may include one or more access radio link control (RLC) channels. An access RLC channel may carry packet data convergence protocol (PDCP) communications (for example, RRC communications or data radio bearer communications, among other examples) from a UE 120 or an MT function of an IAB node 410 to a DU function of an IAB donor 405 or an IAB node 410.

A backhaul link 420 may include one or more backhaul RLC channels. A backhaul RLC channel may carry backhaul adaptation protocol (BAP) communications (for example, for backhauling of access traffic) from an MT function of an IAB node 410 to a DU function of an IAB donor 405 or an IAB node 410 (for example, respective backhaul RLC channels may be between hops on a route from an access IAB node 410 and a DU function of an IAB donor 405). Accordingly, a radio bearer for access traffic of a UE 120 or an MT function of an IAB node 410 (for example, a data radio bearer) may be mapped to a backhaul RLC channel, which may be an existing backhaul RLC channel or a backhaul RLC channel that was established for the radio bearer. As a result, different mappings between radio bearers and backhaul RLC channels may be used. For example, a particular backhaul RLC channel may be mapped to a single radio bearer or multiple radio bearers, such as two radio bearers or three radio bearers.

In some aspects, an RLC channel may be associated with a quality of service (QoS) flow. For example, an RLC channel may be managed or scheduled using one or more QoS parameters associated with the QoS flow, such as a priority level, a permitted packet delay budget (PDB), or a permitted packet error rate, among other examples. In some aspects, the RLC channel may be associated with a time sensitive communication (TSC) QoS flow. A TSC traffic pattern may be associated with periodic and deterministic traffic. For example, a TSC traffic pattern may be defined by a periodicity and a burst arrival time (for example, an arrival time of a data burst at a parent node for downlink communications or an arrival time of a data burst at a child node for uplink communications).

A TSC QoS flow may be associated with low latency traffic or delay sensitive traffic. For example, a TSC QoS flow may be associated with a delay critical guaranteed bit rate (GBR) type of QoS flow. A PDB may define an upper bound for an amount of time that a packet may be delayed. A PDB for a delay critical GBR type of QoS flow may include a 5G access network (5G-AN) PDB and a core network (CN) PDB. The PDB for a delay critical GBR type of QoS flow may use a dynamic value for the CN PDB in order to obtain a more accurate PDB value available for the 5G-AN.

Figure 5:
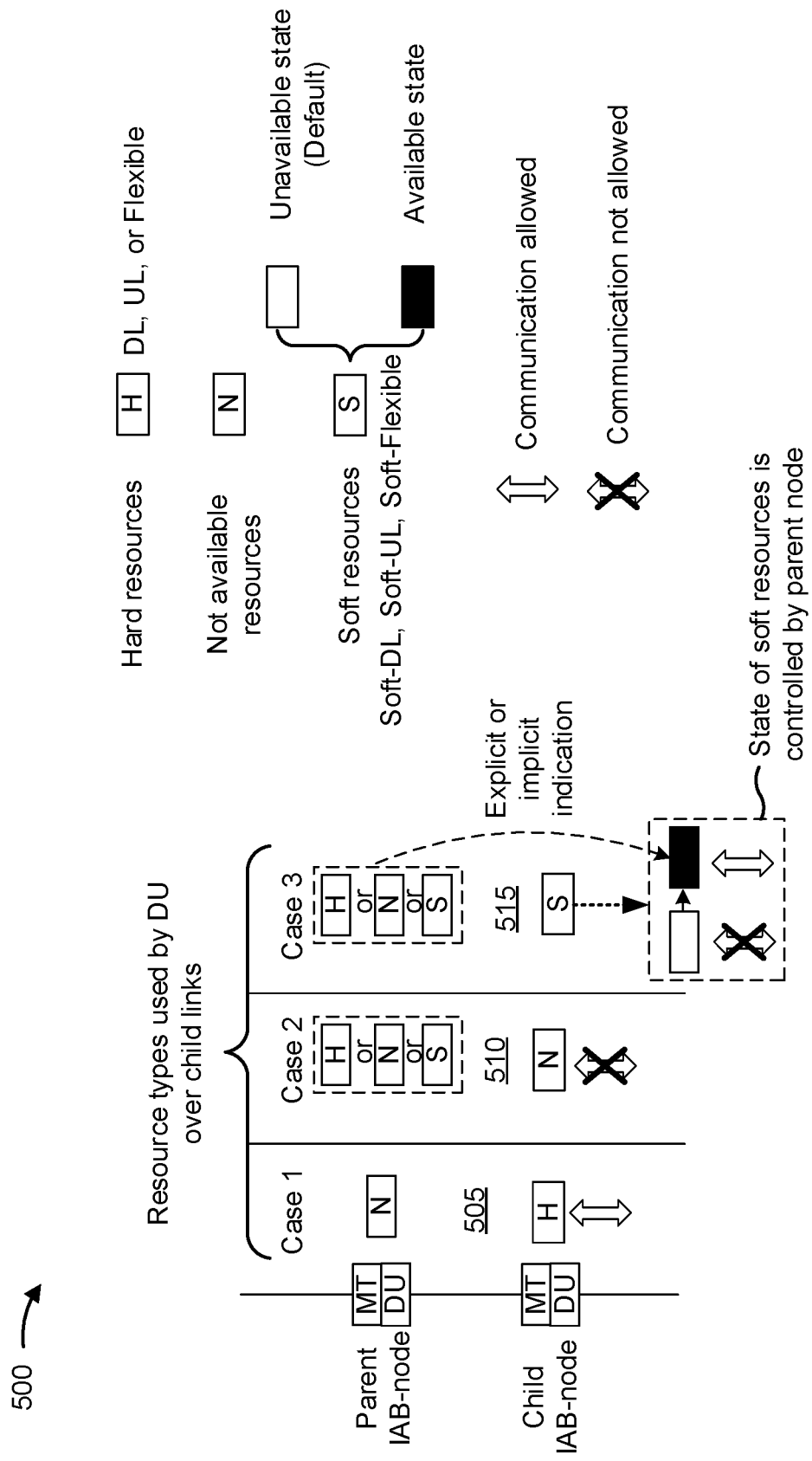
FIG. 5 is a diagram illustrating an example of resource types in an TAB network, in accordance with the disclosure.

FIG. 5 is a diagram illustrating an example of resource types 500 in an IAB network, in accordance with the disclosure. In an IAB network, time domain resources (sometimes referred to as time resources) may be configured as downlink-only, uplink-only, flexible, or not available (for example, unavailable). When a time resource is configured as downlink-only for a wireless node, that time resource may be available for only downlink communications of the wireless node, and not uplink communications.

Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Examples of downlink communications include synchronization signal blocks (SSBs), channel state information reference signals (CSI-RS), physical downlink control channel (PDCCH) communications, or physical downlink shared channel (PDSCH) communications, among other examples. Examples of uplink communications include physical random access channel (PRACH) communications, physical uplink control channel (PUCCH) communications, physical uplink shared channel (PUSCH) communications, or sounding reference signals (SRS), among other examples.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (such as, explicitly or implicitly) whether a soft time resource is available for communications of the wireless node. Thus, a soft time resource may be in one of two states: an available state (for example, when the soft time resource is available for scheduling or communications of the wireless node) and an unavailable state (for example, when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, a time resource 505 may be configured as hard for a child node and may be configured as not available for a parent node of the child node. In such examples, the parent node cannot communicate using that time resource, but the child node can schedule communications in that time resource or communicate using that time resource. This configuration may reduce interference between the parent node and the child node or may reduce scheduling conflicts between the parent node and the child node, among other examples.

As another example, a time resource 510 may be configured as not available for the child node, and may be configured as hard, soft, or not available for the parent node (for example, depending on a network configuration, network conditions, or a configuration of a parent node of the parent node, among other examples). In such examples, the child node cannot schedule communications in that time resource and cannot communicate using that time resource.

As another example, a time resource 515 may be configured as soft for the child node, and may be configured as hard, soft, or not available for the parent node (for example, depending on a network configuration, network conditions, or a configuration of a parent node of the parent node, among other examples). In such examples, the child node cannot schedule or communicate using the time resource unless the child node receives an indication (for example, a release indication), from the parent node (for example, explicitly or implicitly), that the time resource is available (in other words, released) for use by the child node. If the child node receives such an indication, then the child node can schedule communications in that time resource or communicate using that time resource.

Figure 6:
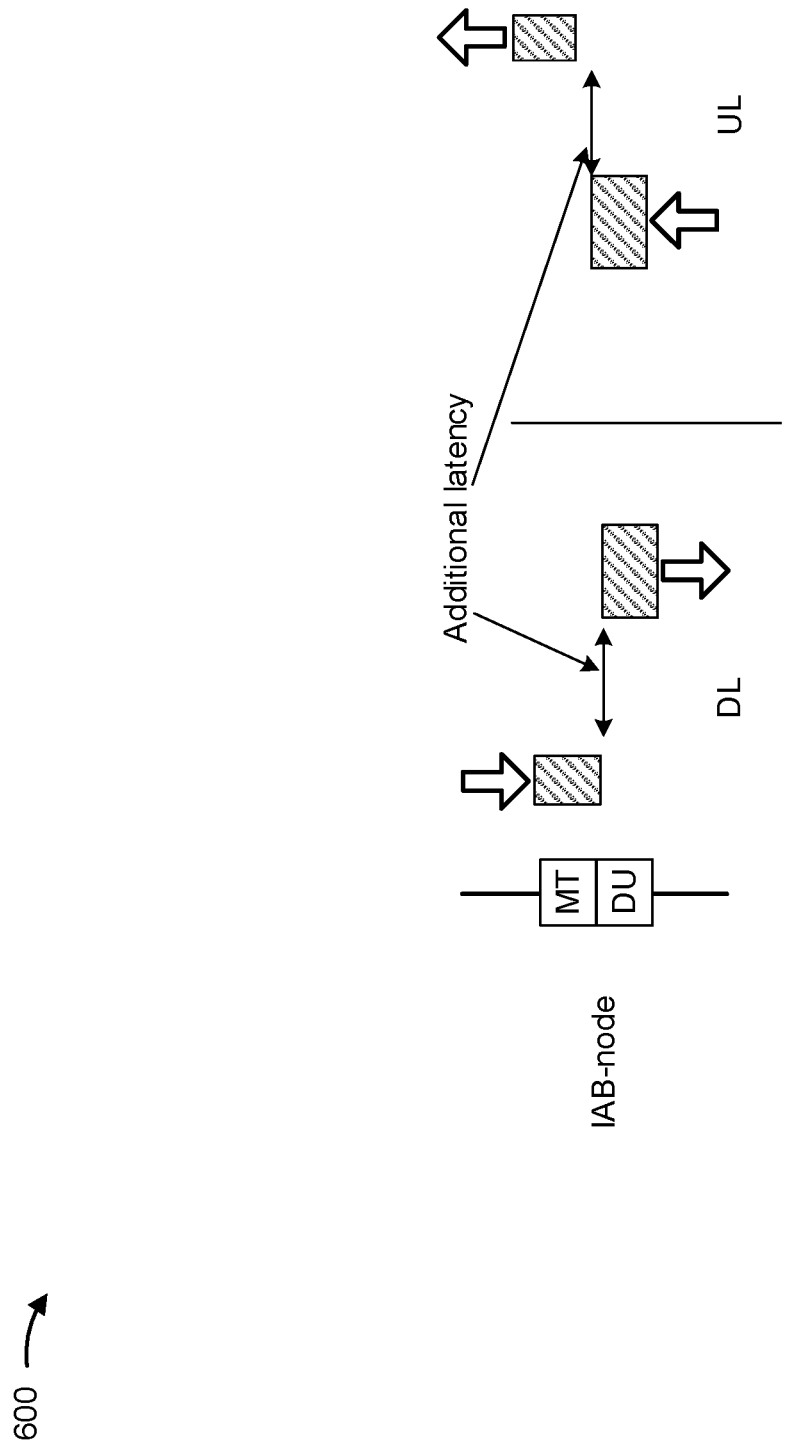
FIG. 6 is a diagram illustrating an example of latency due to resources in an TAB network, in accordance with the disclosure.
Figure 7:
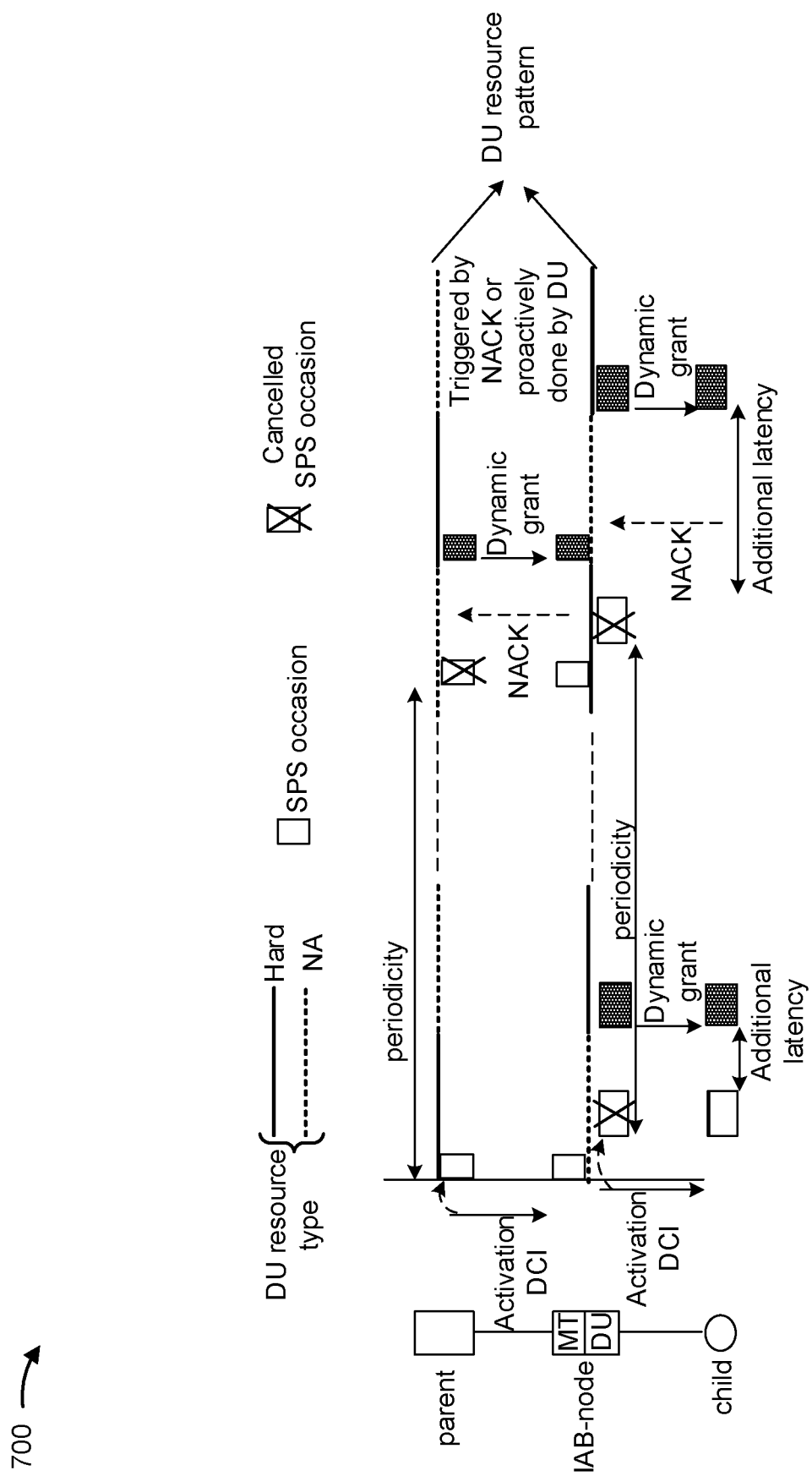
FIG. 7 is a diagram illustrating an example of latency due to resources in an TAB network, in accordance with the disclosure.

FIG. 6 is a diagram illustrating an example of latency due to resources in an IAB network 600, in accordance with the disclosure. As shown in FIG. 7, an IAB node may receive data in a downlink (for example, from an IAB donor or a parent node) and forward the data in the downlink (for example, to a child node). The IAB node may receive data in an uplink (for example, from a child node) and forward the data in the uplink (for example, to an IAB donor or a parent node). The IAB node may experience latency in the downlink or the uplink depending on a DU resource type. The DU resource type may be an NA (not available) resource type, a soft resource type associated with an explicit indication or an implicit determination, or a hard resource type.

For the NA resource type, latency may result at the IAB node from an IAB node DU skipping NA resources. For the soft resource type associated with the explicit indication, coordination latency may result at the IAB node depending on a PDCCH resource allocation for downlink control information (DCI). For the soft resource type associated with the implicit determination, latency may result at the IAB node due to a use of resources being blocked by a parent node with an allocation for an IAB node MT. For the soft resource type associated with the implicit determination, latency may result at the IAB node due to the IAB node DU not being able to perform the implicit determination, such as a determination of a PDCCH configuration or a minimum scheduling gap. For example, the IAB node may be unable to perform the implicit determination on overlapped soft resources within a PDCCH decoding time (for example, when a PDCCH occasion overlaps with the soft resources). For the hard resource type, latency may result at the IAB node MT when a co-located IAB node DU uses hard resources.

FIG. 7 is a diagram illustrating an example of latency due to resources in an IAB network 700, in accordance with the disclosure. As shown in FIG. 7, a parent node may transmit an activation DCI to an IAB node. The parent node may be a parent of the IAB node. The activation DCI may configure an SPS occasion for the parent node, where a DU resource type corresponding to the SPS occasion may be a hard resource type. The IAB node may transmit an activation DCI to a child node. The child node may be a child of the IAB node. However, the activation DCI transmitted by the IAB node may configure an SPS occasion for the IAB node that becomes cancelled, due to a DU resource type corresponding to the SPS occasion being an NA resource type. As a result, the SPS occasion that becomes canceled may not be used by the IAB node to transmit data to the child node. The IAB node may configure a dynamic grant to transmit the data to the child node. However, transmitting the data using the dynamic grant may result in additional latency as compared to a case where the IAB node was able to use the SPS occasion to transmit the data to the child node. In other words, if the SPS occasion were not canceled, the IAB could transmit the data to the child node with reduced latency, as the IAB node would not have to configure the dynamic grant.

As further shown in FIG. 7, an SPS occasion for the parent node may become canceled, due to a DU resource type corresponding to the SPS occasion being an NA resource type. Due to the cancelled SPS occasion for the parent node, the parent node may be unable to transmit data to the IAB node. The IAB node may send a negative acknowledgement (NACK) to the parent node, and the parent node may configure a dynamic grant to transmit the data to the IAB node based at least in part on receipt of the NACK. However, because the parent node was unable to transmit the data to the IAB due to the cancelled SPS occasion, an SPS occasion for the IAB node may also become canceled, even when a DU resource type corresponding to the SPS occasion is a hard resource type. Due to the cancelled SPS occasion for the IAB node, the IAB node may be unable to transmit data to the child node. The child node may send a NACK to the IAB node, and the IAB node may configure a dynamic grant to transmit the data to the child node based at least in part on a receipt of the NACK. However, transmitting the data using the dynamic grant may result in additional latency as compared to a case where the IAB node was able to use the SPS occasion to transmit the data to the child node.

Figure 8:
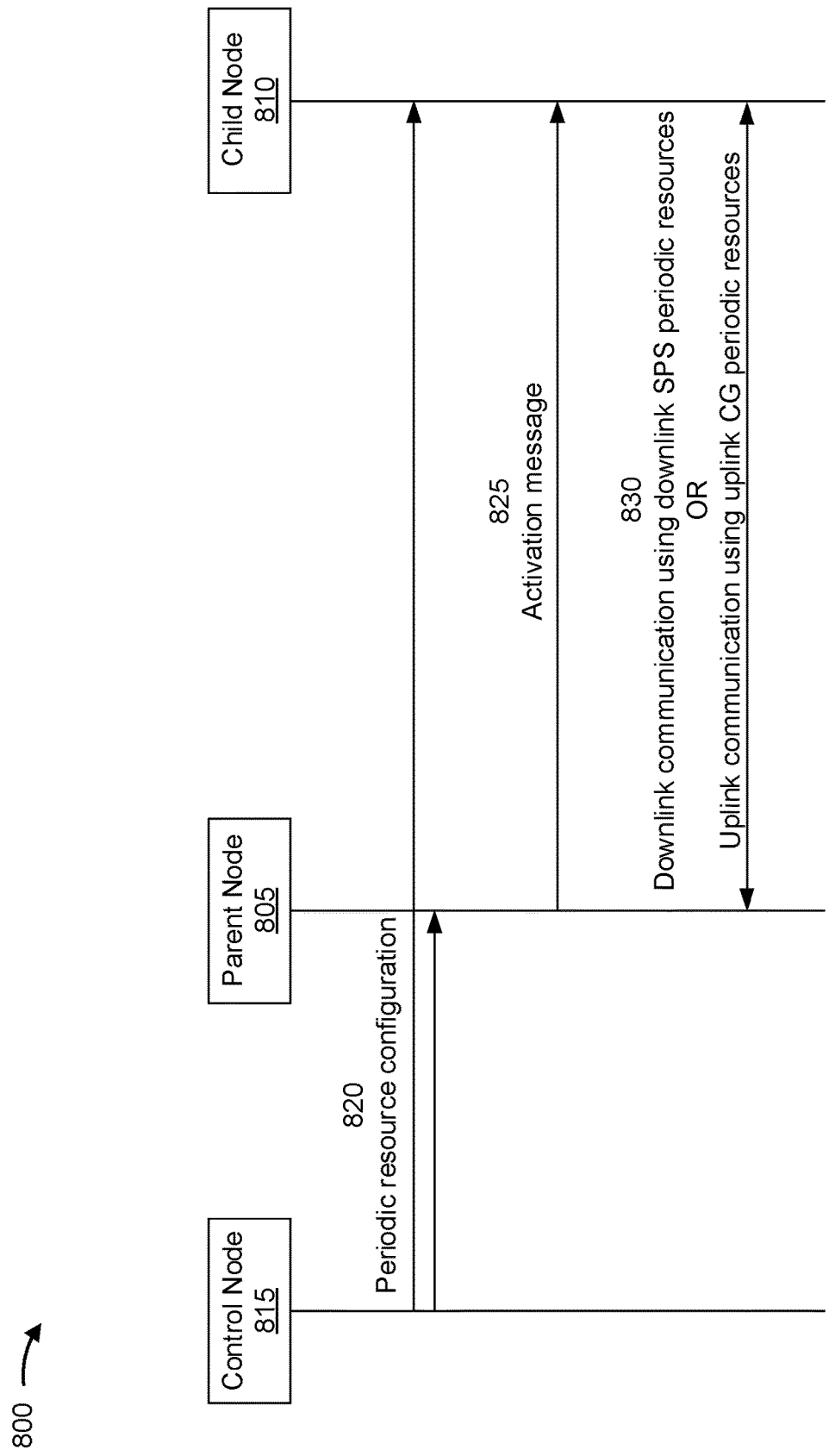
FIG. 8 is a diagram illustrating an example of periodic resource communication, in accordance with the present disclosure.

FIG. 8 is a diagram illustrating an example of periodic resource communication 800, in accordance with the present disclosure. As shown, periodic resource communication 800 includes a parent node 805 (for example, a DU of an IAB node), a child node 810 (for example, an MT component of an IAB node or a UE), and a control node 815 (for example, a CU of an IAB donor). In some aspects, periodic resource communication 800 may include downlink SPS resources (for example, for downlink communications from the parent node 805, or another wireless node, to the child node 810) or uplink configured grant (CG) resources (for example, for uplink communications from the child node 810 to the parent node 805, or to another wireless node). Therefore, if used herein, "periodic resource" may refer to a downlink SPS resource or an uplink CG resource.

As shown in FIG. 8, in a first operation 820, the control node 815 may transmit a periodic resource configuration to the parent node 805 and the child node 810. For example, the control node 815 may transmit configuration information (for example, in an RRC message) that identifies the periodic resource configuration. In some aspects, the configuration information identifying the periodic resource configuration may indicate a periodicity associated with periodic resources or hybrid automatic repeat request (HARQ) feedback information associated with the periodic resources (for example, a quantity of HARQ processes), among other examples.

In a second operation 825, the parent node 805 may transmit an activation message associated with the periodic resource configuration. For example, the second operation 825 may include the parent node 805 transmitting a DCI activation grant that activates the periodic resources. In some aspects, the DCI activation grant may indicate a resource allocation (for example, in a time domain, frequency domain, spatial domain, or code domain) associated with the periodic resources, an MCS associated with the periodic resources, an antenna port associated with the periodic resources, or a redundancy version (RV) pattern or configuration associated with the periodic resources, among other examples. In some aspects, the DCI activation grant may indicate a resource or set of resources available to the child node 810 for transmission of an uplink communication (for example, where the periodic resources are uplink CG periodic resources). In some aspects, the DCI activation grant may indicate a resource or set of resources available to the child node 810 for reception of a downlink communication (for example, where the periodic resources are downlink SPS periodic resources).

In some aspects, the parent node 805 may scramble the DCI activation grant using a configured scheduling-radio network temporary identifier (CS-RNTI). As shown in FIG. 8, the first operation 820 and the second operation 825 may be performed by separate devices. For example, the control node 815 may perform the first operation 820 and the parent node 805 may perform the second operation 825.

In some aspects, the periodic resource configuration may be a downlink SPS configuration that configures periodic downlink resources for the child node 810 to receive downlink communications. In some aspects, the periodic resource configuration may be an uplink CG configuration that configures uplink periodic resources for the child node 810 to transmit uplink communications. In some aspects, an uplink CG configuration may be configured using only an RRC configuration (for example, with no accompanying DCI activation grant). For example, a periodic resource configuration, transmitted in the first operation 820 by the control node 815, for an uplink CG configuration may indicate a resource allocation (for example, in a time domain, frequency domain, spatial domain, or code domain) associated with the uplink periodic resources, an MCS associated with the uplink periodic resources, an antenna port associated with the periodic resources, or an RV pattern or configuration associated with the uplink periodic resources, among other examples. As a result, the child node 810 may be enabled to transmit uplink communications using the periodic uplink resources without receiving a DCI activation grant associated with the periodic uplink resources. An uplink CG configuration that is fully configured by an RRC configuration may be referred to herein as a type 1 uplink CG. An uplink CG configuration that is partially configured by an RRC configuration and is activated by a DCI activation grant may be referred to herein as a type 2 uplink CG.

In a third operation 830, the parent node 805 and the child node 810 may communicate using the periodic resources. For example, if the periodic resources are downlink SPS periodic resources, the third operation 830 may include the parent node 805 transmitting a downlink communication, using a downlink periodic resource, to the child node 810. If the periodic resources are uplink CG periodic resources, the third operation 830 may include the child node 810 transmitting an uplink communication, using an uplink CG periodic resource, to the parent node 805.

Configuring periodic resources in a similar manner as described above may be beneficial for periodic or deterministic traffic. For example, a parent node 805 may allocate or activate periodic resources that align with a periodic pattern of traffic to reduce a signaling overhead associated with allocating resources for the traffic. In some aspects, such as in an IAB network, periodic or deterministic traffic may occur over multiple hops. For example, for downlink communications, periodic traffic may be transmitted from a first IAB node to a second IAB node (for example, a child node of the first IAB node). The second IAB node may relay or forward the traffic to another wireless node (for example, a child node of the second IAB node). Similarly, for uplink communications, periodic traffic may be transmitted from a wireless node (for example, a UE or an MT component for an IAB node) to a first IAB node (for example, a parent node of the wireless node). The first IAB node may relay or forward the traffic to a second IAB node (for example, a parent node of the first IAB node). A parent node or a control node (for example, a CU of an IAB donor or a DU of an IAB node) may configure one or more other wireless nodes with periodic resources for communicating the periodic or deterministic traffic over multiple hops.

For periodic or deterministic low latency traffic, such as TSC traffic, a wireless node may be required to satisfy strict latency requirements when forwarding or relaying traffic between a parent node of the wireless node and a child node of the wireless node. For periodic traffic, one approach may be to allocate periodic resources in advance, such as via downlink SPS or uplink CG, so that a dynamic DCI grant may not be required for each data transmission of the periodic traffic. For downlink SPS and some uplink configured grant types, the allocation includes an RRC configuration of basic parameters, such as a periodicity and a quantity of HARQ processes, by a CU of an IAB donor, and an activation DCI grant with detailed allocation information (for example, time and frequency resource allocation, a MCS, or an antenna port, among other examples) by a scheduling node.

A wireless node may be an IAB node that includes an MT component and a DU component. In some cases, a MT component of the wireless node may be allocated with periodic resources for the TSC traffic by a DU component of a parent node of the wireless node (for example, a scheduling node) via an activation DCI grant. A DU component of the wireless node may allocate corresponding periodic resources for the MT component of a child node of the wireless node via an activation DCI grant. However, as the periodic resources associated with the MT component of the wireless node may be determined or allocated by the parent node of the wireless node, and the periodic resources associated with the DU of the wireless node may be determined or allocated by the DU of the wireless node, it may be difficult to ensure that the periodic resources associated with the MT component and the periodic resources associated with the DU are configured such that the strict latency requirements associated with forwarding or relaying TSC traffic are satisfied.

In some cases, the low latency traffic may be transmitted from an originating IAB node to a first IAB node to a second IAB node and to a destination node (such as a child node or a UE), where the first IAB node and the second IAB node act as relay nodes that forward the low latency traffic to a next hop in a communication path. However, as described above, for downlink SPS resources, the resource location of downlink periodic resources may be determined and indicated by a parent node. For example, the resource location of downlink periodic resources used by the first IAB node may be determined and indicated (for example, in an activation message) by the originating IAB node. Similarly, the resource location of downlink periodic resources used by the second IAB node may be determined and indicated (for example, in an activation message) by the first IAB node.

However, the IAB nodes in the communication path of the low latency traffic (for example, the originating IAB node, the first IAB node, the second IAB node, or the destination node) may be unaware of information associated with the entire IAB network, such as a traffic arrival pattern across multiple IAB nodes, a duplex communication capability (for example, half-duplex or full-duplex) of each IAB node in the IAB network, or an average link quality of each IAB node in the IAB network, among other examples. Therefore, the IAB nodes in the communication path may be unable to coordinate resource locations of downlink periodic resources across multiple hops for low latency traffic. As a result, for downlink periodic resources for periodic low latency traffic across multiple hops, the resource locations of the downlink periodic resources may increase latency associated with communicating the periodic low latency traffic across multiple hops. Moreover, as each IAB node in the communication path may be unaware of resource locations at other IAB nodes in the communication path, there may be confliction among downlink periodic resources in the communication path.

Various aspects relate generally to periodic resource coordination in an IAB network. Some aspects more specifically relate to coordinating periodic resources associated with an MT component of an IAB node with periodic resources associated with a DU of the IAB node. In some aspects, the IAB node may identify (for example, determine or receive an indication of) one or more parameters for coordinating periodic resources that are associated with the MT component of the IAB node with periodic resources that are associated with the DU of the IAB node. For example, the one or more parameters may indicate a time gap, or a range of time gaps, between periodic resources that are associated with the MT component of the IAB node and periodic resources that are associated with the DU of the IAB node.

In some aspects, the IAB node may receive an activation message for activating a first periodic resource that is associated with the MT component of the IAB node. In some aspects, the IAB node may determine whether a second periodic resource, that corresponds to the first periodic resource and is associated with the DU of the IAB node, satisfies the one or more parameters. For example, the IAB node may be a relay node that forwards periodic communications between a parent node of the IAB node and a child node of the IAB node. In some aspects, the first periodic resource may be a downlink periodic resource for receiving downlink communications from the parent node. The second periodic resource may be a corresponding downlink periodic resource that is used to forward the downlink communications, that are received from the parent node using the first periodic resource, to the child node. In some aspects, the first periodic resource may be an uplink periodic resource for transmitting uplink communications to the parent node. The second periodic resource may be a corresponding uplink periodic resource that is used to receive uplink communications, from the child node, that are to be forwarded to the parent node using the first periodic resource.

If the IAB node determines that the second periodic resource does not satisfy the one or more parameters, the IAB node may modify a resource allocation associated with the second periodic resource. In some aspects, the IAB node may transmit, to the child node associated with the IAB node, an activation message associated with the second periodic resource that indicates the modified resource allocation associated with the second periodic resource. The IAB node may communicate periodic communications (downlink communications or uplink communications) using the first periodic resource and the second periodic resource.

Some other aspects relate generally to a CU of an IAB donor configuring downlink configured grant in an IAB network. In some aspects, a CU of an IAB donor determining resource locations for downlink periodic resources in an IAB network. In some aspects, the CU of the IAB donor may determine full grant information for downlink periodic resources in the IAB network, such that IAB nodes within the IAB network may communicate using the downlink periodic resources without an activation message. In some examples, the CU of the IAB donor may determine partial grant information for downlink periodic resources in the IAB network that includes a resource location of the downlink periodic resources. In some examples, if the CU of the IAB donor determines partial grant information, remaining grant information (for example, information required for an IAB node to communicate using the downlink periodic resources that is not indicated in the partial grant information) may be indicated in an activation message.

In some aspects, the CU of the IAB donor may determine the resource locations of the downlink periodic resources based at least in part on a traffic pattern within the IAB network, a duplex communication mode capability of IAB nodes within the communication path, an IAB resource type pattern of IAB nodes within the communication path, an average link quality across the communication path, a processing capability of IAB nodes within the communication path, or a latency requirement of IAB nodes within the communication path, among other examples. In some aspects, the CU of the IAB node may configure resource locations of downlink periodic resources via a periodicity and offset values associated with the downlink periodic resources.

Particular aspects of the subject matter described in this disclosure can be implemented to realize one or more of the following potential advantages. In some examples, the described techniques can be used to coordinate periodic resources between a DU of an IAB node and an MT component of the IAB node for periodic low latency traffic. Therefore, a resource allocation of a periodic resource associated with the DU of the IAB node may be based at least in part on a resource allocation of a periodic resource associated with the MT component of the wireless node. As a result, traffic may be forwarded by the IAB node to a next-hop wireless node at an earliest possible time, thereby reducing the latency associated with forwarding the traffic.

Particular aspects of the subject matter described in this disclosure can be implemented to realize one or more of the following potential advantages. In some examples, the described techniques can be used to optimize resource locations for downlink periodic resources for periodic low latency traffic across multiple hops in an IAB network. For example, the CU of the IAB donor may utilize information available to the CU that relates to the entire IAB network to coordinate resource locations for downlink periodic resources across a communication path for periodic low latency traffic. As a result, the CU of the IAB donor may reduce latency associated with communicating the periodic low latency traffic across a communication path that includes multiple hops or multiple wireless nodes. Moreover, the CU of the IAB donor may optimize a downlink periodic resource pattern across multiple hops to reduce a resource confliction among the multiple wireless nodes included in the communication path.

Figure 9:
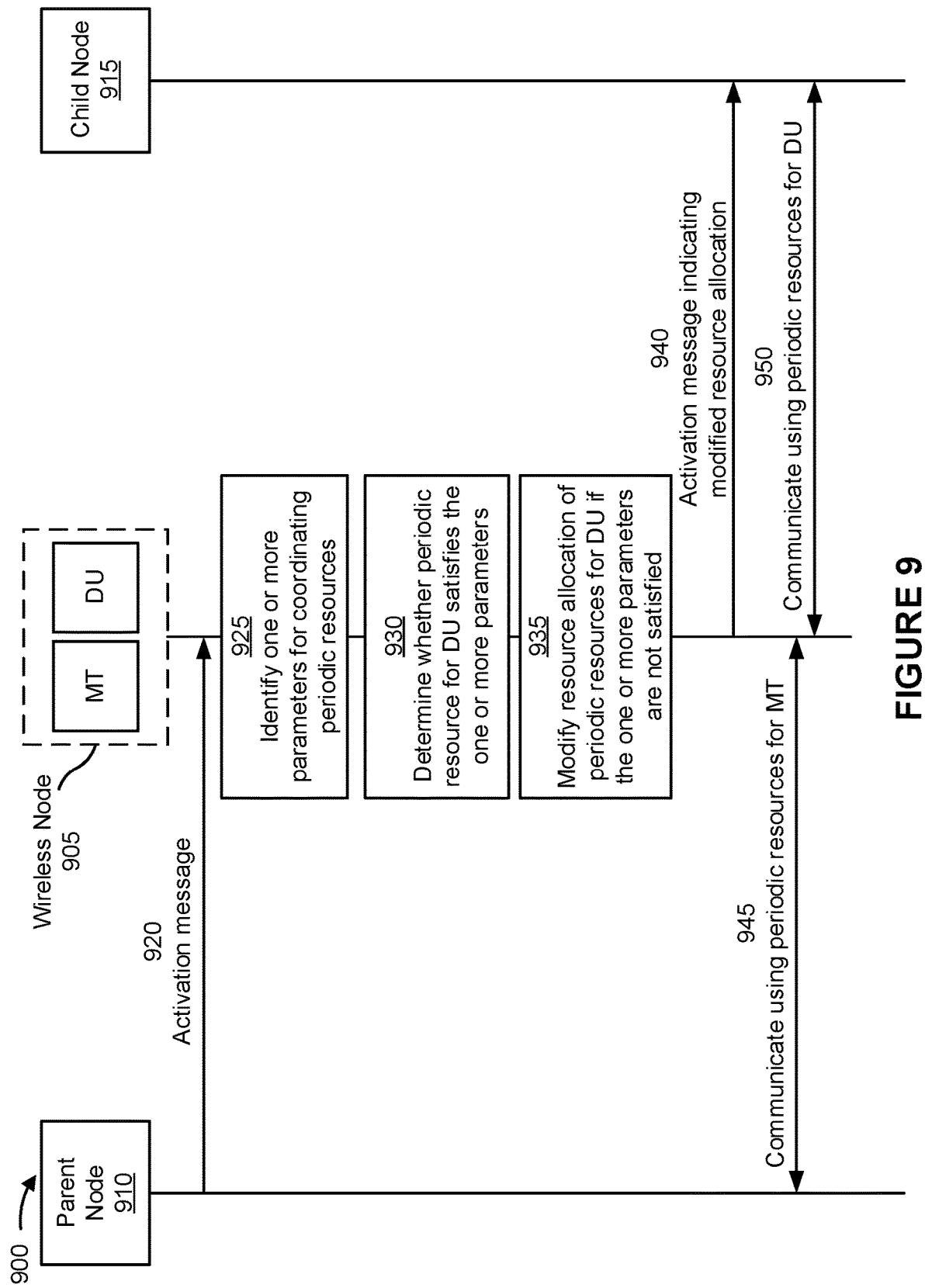
FIG. 9 is a diagram illustrating an example associated with periodic resource coordination in an TAB network, in accordance with the present disclosure.

FIG. 9 is a diagram illustrating an example associated with periodic resource coordination 900 in an IAB network, in accordance with the present disclosure. As shown in FIG. 9, a wireless node 905 (for example, an IAB node) may communicate with a parent node 910 (for example, a parent node of the wireless node 905, or a DU of an IAB node) and a child node 915 (for example, an MT component of an IAB node or a UE). The wireless node 905 may include an MT component and a DU, in a similar manner as the IAB node 410 described above in connection with FIG. 4. In some aspects, the wireless node 905 may communicate with a CU of an IAB donor (not shown in FIG. 9). In some aspects, the wireless node 905 may perform functions similar to a layer 2 relay node.

In a first operation 920, the wireless node 905 may receive an activation message for activating a first periodic resource that is associated with the MT component of the wireless node 905. The first operation 920 may include the parent node transmitting the activation message to the wireless node 905. In some aspects, the activation message may activate a first periodic resource that is at least partially configured by an RRC configuration. In some aspects, the wireless node 905 may receive the RRC configuration from a CU of an IAB donor. In some aspects, the wireless node 905 may receive the RRC configuration from a CU of an IAB donor and may receive the activation message from the parent node 910.

In some aspects, the activation message may be a DCI activation grant (for example, similar to the DCI activation grant described above in connection with FIG. 8). For example, the activation message may indicate a resource allocation (such as in a time domain, frequency domain, spatial domain, or code domain) associated with the first periodic resource, an MCS associated with the first periodic resource, an antenna port associated with the first periodic resource, or an RV pattern or configuration associated with the first periodic resource, among other examples.

In some aspects, the activation message may be associated with a scheduling gap indicating an amount of time between the activation message and the first periodic resource. The amount of time between the activation message and the first periodic resource may be based at least in part on a processing capability or a processing time associated with the wireless node 905 (for example, a processing capability or a processing time associated with the wireless node 905 modifying a periodic resource, associated with the DU, that corresponds to the first periodic resource, as described herein). In some aspects, the wireless node 905 may receive an indication of the scheduling gap associated with the activation message from a CU of an IAB donor, such as via an RRC message or an F1-AP message, among other examples. In some aspects, the wireless node 905 may receive an indication of the scheduling gap associated with the activation message from the parent node 910, such as via a medium access control (MAC) control element (MAC-CE) message or a DCI message, among other examples.

In some aspects, the first periodic resource that is associated with the MT component of the wireless node 905 may be a downlink SPS periodic resource that is to be used to receive downlink communications from the parent node 910. In some aspects, the first periodic resource that is associated with the MT component of the wireless node 905 may be an uplink CG periodic resource (for example, a type 2 uplink CG) that is to be used to transmit uplink communications to the parent node 910. In some aspects, the first periodic resource may be associated with an RLC channel, between the parent node 910 and the wireless node 905, that is associated with low latency traffic (for example, TSC traffic).

In a second operation 925, the wireless node 905 may identify one or more parameters for coordinating periodic resources that are associated with the MT component of the wireless node 905 with periodic resources that are associated with the DU of the wireless node 905. In some aspects, the second operation 925 may be performed by the DU of the wireless node 905. The one or more parameters may include a time gap between periodic resources that are associated with the MT component and periodic resources that are associated with the DU. In some aspects, the one or more parameters may include a range of time gaps between periodic resources that are associated with the MT component and periodic resources that are associated with the DU.

In some aspects, the time gap, or the range of time gaps, between periodic resources that are associated with the MT component and periodic resources that are associated with the DU may be based at least in part on a processing capability of the wireless node. For example, the amount of time indicated by the time gap may be based at least in part on an amount of time required for the wireless node 905 to process communications (for example, communications received by the MT component of the wireless node 905).

In some aspects, the range of time gaps may span from a first time gap to a second time gap. An amount of time indicated by the first time gap may be based at least in part on an amount of time required for the wireless node 905 to process a communication for forwarding to a next hop, such as the child node 915. For example, the amount of time required for the wireless node 905 to process a communication for forwarding to a next hop may include an amount of time associated with decoding the communication, performing layer 2 processing of the communication, and re-encoding the communication. An amount of time indicated by the second time gap may be based at least in part on a PDB associated with the traffic being carried using the periodic resources of the wireless node 905. In some aspects, the PDB may be a PDB for one hop (for example, a PDB for communications between the parent node 910 and the wireless node 905, or a PDB for communication between the wireless node 905 and the child node 915). In some aspects, the PDB may be an end-to-end PDB (for example, a PDB associated with multiple hops of communication from the originating device, such as the parent node 910, to the destination device, such as the child node 915).

In some aspects, the second operation 925 may include a CU of an IAB donor transmitting, and the wireless node 905 receiving, an indication of the one or more parameters. For example, the CU of the IAB donor may determine the one or more parameters. In some aspects, the CU of the IAB donor may transmit the indication of the one or more parameters via an RRC message or an F1-AP message, among other examples. In some aspects, where the CU of the IAB donor determines the one or more parameters, the CU of the IAB donor may transmit, to the parent node 910, an indication of the one or more parameters. As a result, the parent node 910 may be enabled to determine a set of resources that the DU of the wireless node 905 may use for low latency communications, as described herein. In some aspects, the parent node 910 may not schedule the MT component of the wireless node 905 using the set of resources in order to avoid potential collisions with the communications of the DU. As a result, scheduling decisions made by the parent node 910 for the MT component of the wireless node 905 may be improved.

In some aspects, the second operation 925 may include the parent node 910 transmitting, and the wireless node 905 receiving, an indication of the one or more parameters. For example, the parent node 910 may determine the one or more parameters. In some aspects, a DU of the parent node 910 may transmit the indication of the one or more parameters. In some aspects, the parent node 910 may transmit the indication of the one or more parameters via a DCI message or a MAC-CE message, among other examples. In some aspects, the parent node 910 may indicate the one or more parameters in the activation message transmitted in the first operation 920.

In some aspects, where the CU of the IAB donor or the parent node 910 determines the one or more parameters, the wireless node 905 may transmit, to the CU of the IAB donor or the parent node 910, an indication of information to be used to determine the one or more parameters. For example, the wireless node 905 may transmit an indication of a processing capability of the wireless node (for example, a PDSCH processing capability or a PUSCH processing capability), a latency requirement associated with the wireless node (for example, a latency requirement associated with an amount of time from reception of a communication to forwarding the communication by the wireless node 905), or a PDB of an RLC channel associated with the periodic resources of the wireless node 905, among other examples. The CU of the IAB donor or the parent node 910 may determine the one or more parameters based at least in part on the information indicated by the wireless node 905.

In some aspects, the second operation 925 may include the wireless node 905 determining the one or more parameters (for example, without receiving an indication of the one or more parameters from another wireless communication device). For example, the wireless node 905 may autonomously determine the one or more parameters. In some aspects, the wireless node 905 may determine the one or more parameters based at least in part on a processing capability of the wireless node (for example, a PDSCH processing capability or a PUSCH processing capability), a latency requirement associated with the wireless node, or a PDB of an RLC channel associated with the periodic resources of the wireless node 905, among other examples.

In some aspects, where the wireless node 905 determines the one or more parameters, the wireless node 905 may transmit, and the parent node 910 may receive, an indication of the one or more parameters. The wireless node 905 may transmit the indication of the one or more parameters via a MAC-CE message or an uplink control information (UCI) message, among other examples. The parent node 910 may use the one or more parameters to make improved scheduling decisions for the MT component of the wireless node 905, as described above.

In a third operation 930, the wireless node 905 may determine whether a second periodic resource, that corresponds to the first periodic resource and is associated with the DU of the wireless node 905, satisfies the one or more parameters. In some aspects, the third operation 930 may be performed by the DU of the wireless node 905. For example, the DU of the wireless node 905 may identify the second periodic resource that corresponds to the first periodic resource. For example, if the first periodic resource is a downlink SPS resource, the second periodic resource may be a downlink SPS resource that is used by the DU of the wireless node 905 to forward a downlink communication, that is received from the parent node 910, to the child node 915. If the first periodic resource is an uplink CG resource, the second periodic resource may be an uplink CG resource that is used by the DU of the wireless node 905 to forward an uplink communication, that is received from the child node 915, to the parent node 910.

The wireless node 905 may determine whether the second periodic resource satisfies the one or more parameters based at least in part on a resource allocation associated with the second periodic resource. For example, as described above, the one or more parameters may indicate a time gap, or a range of time gaps, between periodic resources that are associated with the MT component and periodic resources that are associated with the DU. The wireless node 905 may determine whether a resource allocation associated with the second periodic resource, in the time domain, satisfies the time gap, or a range of time gaps.

For example, the one or more parameters may indicate an amount of time that is permitted between periodic resources that are associated with the MT component and periodic resources that are associated with the DU. If the second periodic resource is scheduled to occur, in the time domain, more than the permitted amount of time from the first periodic resource, the wireless node 905 may determine that the one or more parameters are not satisfied. Similarly, the one or more parameters may indicate a range of time (for example, from a first amount of time to a second amount of time) that is permitted between periodic resources that are associated with the MT component and periodic resources that are associated with the DU. If the second periodic resource is scheduled to occur, in the time domain, outside of the range of time (for example, not between the first amount of time and the second amount of time) from the first periodic resource, the wireless node 905 may determine that the one or more parameters are not satisfied.

In a fourth operation 935, the wireless node 905 may modify a resource allocation of the second periodic resource that is associated with the DU of the wireless node 905 based at least in part on determining that the second periodic resource does not satisfy at least one parameter of the one or more parameters. For example, the wireless node 905 may modify a time domain resource allocation of the second periodic resource such that the modified time domain resource allocation satisfies the one or more parameters. In some aspects, the wireless node 905 may modify a time domain resource allocation of the second periodic resource such that the modified time domain resource allocation begins an amount of time from the first periodic resource (for example, before the first periodic resource for uplink CG resources or after the first periodic resource for downlink SPS resources) that is indicated by the one or more parameters. In some aspects, the wireless node 905 may modify a time domain resource allocation of the second periodic resource such that the modified time domain resource allocation occurs within a range of time from the first periodic resource that is indicated by the one or more parameters.

In some aspects, the wireless node 905 may perform the fourth operation 935 during the scheduling gap that is associated with the activation message received from the parent node 910 during the first operation 920. For example, the wireless node may perform the fourth operation 935 during an amount of time between receiving the activation message and a start of the time domain resource allocation associated with the first periodic resource. In some aspects, if the wireless node 905 determines that the second periodic resource satisfies the one or more parameters, the wireless node 905 may not perform the fourth operation 935. For example, if the wireless node 905 determines that the second periodic resource satisfies the one or more parameters, the wireless node 905 may not modify a resource allocation of the second periodic resource.

In a fifth operation 940, the wireless node 905 may transmit, and the child node 915 may receive, an activation message indicating the modified resource allocation associated with the second periodic resource. The fifth operation 940 may be performed by the DU of the wireless node 905. The activation message may be a DCI activation grant (for example, similar to the DCI activation grant described above in connection with FIG. 8). For example, the activation message may indicate the modified resource allocation (such as in a time domain, frequency domain, spatial domain, or code domain) associated with the second periodic resource, an MCS associated with the second periodic resource, an antenna port of the child node 915 associated with the second periodic resource, or an RV pattern or configuration associated with the second periodic resource, among other examples.

In some aspects, if the wireless node 905 determines that the second periodic resource satisfies the one or more parameters, the wireless node 905 may not perform the fifth operation 940. For example, if the wireless node 905 determines that the second periodic resource satisfies the one or more parameters, the wireless node 905 may not transmit an activation message associated with the second periodic resource. For example, the wireless node 905 may have previously transmitted an activation message for activating the second periodic resource. Therefore, the child node 915 may be enabled to utilize the second periodic resource based at least in part on the previously transmitted activation message.

In some aspects, if the wireless node 905 determines that the second periodic resource satisfies the one or more parameters, the activation message may indicate the original resource allocation (for example, not modified) associated with the second periodic resource. For example, if the wireless node 905 determines that the second periodic resource satisfies the one or more parameters, the wireless node 905 may not perform the fourth operation 935, but the wireless node 905 may perform the fifth operation 940 by transmitting an activation message that indicates the original resource allocation associated with the second periodic resource.

In a sixth operation 945, the parent node 910 and the wireless node 905 may communicate using the first periodic resource that is associated with the MT component of the wireless node 905. In a seventh operation 950, the wireless node 905 and the child node 915 may communicate using the second periodic resource that is associated with the DU of the wireless node 905.

For example, if the first periodic resource and the second periodic resource are downlink SPS resources, the sixth operation 945 may include the parent node 910 transmitting, and the wireless node 905 receiving, a downlink communication using the first periodic resource. The seventh operation 950 may include the wireless node 905 forwarding (for example, transmitting) the downlink communication to the child node 915 using the second periodic resource.

If the first periodic resource and the second periodic resource are uplink CG resources, the seventh operation 950 may include the child node 915 transmitting, and the wireless node 905 receiving, an uplink communication using the second periodic resource. The sixth operation 945 may include the wireless node 905 forwarding (for example, transmitting) the uplink communication to the parent node 910 using the first periodic resource.

Figure 10:
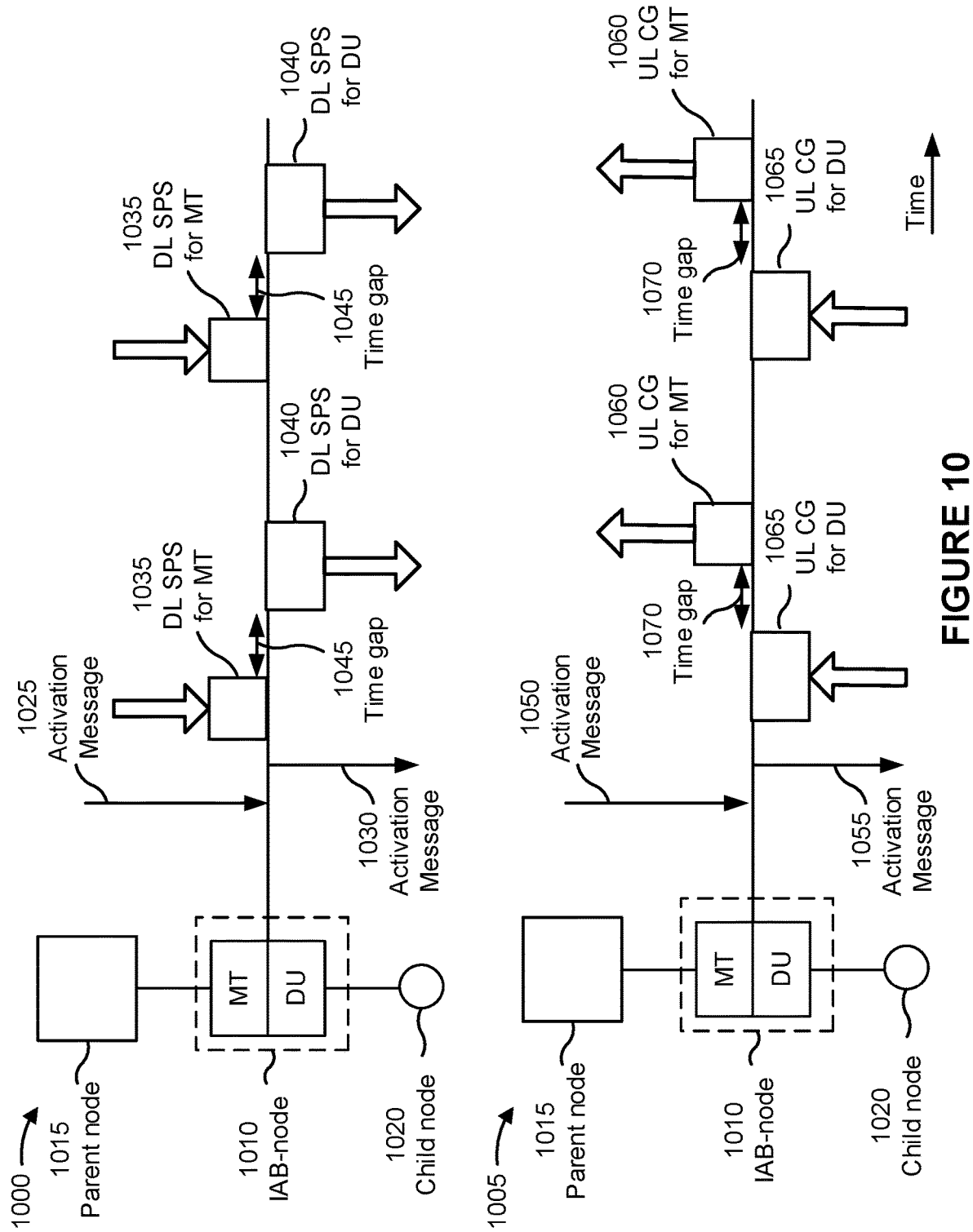
FIG. 10 is a diagram illustrating examples associated with downlink semi-persistent scheduling (SPS) periodic resource coordination and uplink configured grant (CG) periodic resource coordination in an TAB network, in accordance with the present disclosure.

FIG. 10 is a diagram illustrating examples associated with downlink SPS periodic resource coordination 1000 and uplink CG periodic resource coordination 1005 in an IAB network, in accordance with the present disclosure. As shown in FIG. 10, an IAB node 1010 (for example, the wireless node 905) may communicate with a parent node 1015 (for example, a parent node of the IAB node 1010, or a DU of an IAB node, or the parent node 910) and a child node 1020 (for example, an MT component of an IAB node, a UE, or the child node 915). The IAB node 1010 may include an MT component and a DU, in a similar manner as the IAB node 410 described above in connection with FIG. 4. In some aspects, the IAB node 1010 may communicate with a CU of an IAB donor (not shown in FIG. 10). In some aspects, the IAB node 1010 may perform functions similar to a layer 2 relay node.

As shown in the example associated with downlink SPS periodic resource coordination 1000, the IAB node 1010 may receive, from the parent node 1015, an activation message 1025. The activation message 1025 may activate a downlink SPS resource 1035 that is associated with the MT component of the IAB node 1010. For example, the activation message 1025 may indicate a resource allocation associated with the downlink SPS resource 1035.

As described above in connection with FIG. 9, the IAB node 1010 may identify (for example, determine or receive an indication of) one or more parameters for coordinating periodic resources that are associated with the MT component of the IAB node 1010 with periodic resources that are associated with the DU of the IAB node 1010. The one or more parameters for coordinating periodic resources that are associated with the MT component of the IAB node 1010 with periodic resources that are associated with the DU of the IAB node 1010 may be identified as described above in connection with FIG. 9.

The IAB node 1010 (for example, the DU of the IAB node 1010) may identify a downlink SPS resource 1040 that is associated with the DU of the IAB node 1010 and corresponds to the downlink SPS resource 1035. For example, the IAB node 1010 may determine or identify a resource allocation associated with the downlink SPS resource 1040. As described above in connection with FIG. 9, the IAB node 1010 may determine whether a time gap 1045 between the downlink SPS resource 1035 and the downlink SPS resource 1040 satisfies the one or more parameters for coordinating periodic resources that are associated with the MT component of the IAB node 1010 with periodic resources that are associated with the DU of the IAB node 1010.

If the IAB node 1010 determines that the time gap 1045 between the downlink SPS resource 1035 and the downlink SPS resource 1040 does not satisfy the one or more parameters, the IAB node 1010 may modify the resource allocation associated with the downlink SPS resource 1040. For example, the IAB node 1010 may modify the resource allocation associated with the downlink SPS resource 1040 such that the time gap 1045 satisfies the one or more parameters.

The IAB node 1010 may transmit, to the child node 1020, an activation message 1030 for activating the downlink SPS resource 1040. If the IAB node 1010 has modified the resource allocation associated with the downlink SPS resource 1040, the activation message 1030 may indicate the modified resource allocation associated with the downlink SPS resource 1040.

As described above, the one or more parameters may be based at least in part on a processing capability of the IAB node 1010, a PDB of an RLC channel between the IAB node 1010 and the parent node 1015 or between the IAB node 1010 and the child node 1020, or a latency requirement of the IAB node 1010, among other examples. As a result, the time gap 1045 between the downlink SPS resource 1035 and the downlink SPS resource 1040 may be reduced by coordinating the downlink SPS resource 1035 and the downlink SPS resource 1040. Therefore, the IAB node 1010 may reduce a latency associated with forwarding a downlink communication, received from the parent node 1015 using the downlink SPS resource 1035, to the child node 1020 using the downlink SPS resource 1040.

As shown in the example associated with uplink CG periodic resource coordination 1005, the IAB node 1010 may receive, from the parent node 1015, an activation message 1050. The activation message 1050 may activate an uplink (UL) CG resource 1060 that is associated with the MT component of the IAB node 1010. For example, the activation message 1050 may indicate a resource allocation associated with the uplink CG resource 1060.

The IAB node 1010 (for example, the DU of the IAB node 1010) may identify an uplink CG resource 1065 that is associated with the DU of the IAB node 1010 and corresponds to the uplink CG resource 1060. For example, the IAB node 1010 may determine or identify a resource allocation associated with the uplink CG resource 1065. As described above in connection with FIG. 9, the IAB node 1010 may determine whether a time gap 1070 between the uplink CG resource 1060 and the uplink CG resource 1065 satisfies the one or more parameters for coordinating periodic resources that are associated with the MT component of the IAB node 1010 with periodic resources that are associated with the DU of the IAB node 1010.

If the IAB node 1010 determines that the time gap 1070 between the uplink CG resource 1060 and the uplink CG resource 1065 does not satisfy the one or more parameters, the IAB node 1010 may modify the resource allocation associated with the uplink CG resource 1065. For example, the IAB node 1010 may modify the resource allocation associated with the uplink CG resource 1065 such that the time gap 1070 satisfies the one or more parameters.

The IAB node 1010 may transmit, to the child node 1020, an activation message 1055 for activating the uplink CG resource 1065. If the IAB node 1010 has modified the resource allocation associated with the uplink CG resource 1065, the activation message 1055 may indicate the modified resource allocation associated with the uplink CG resource 1065.

As described above, the one or more parameters may be based at least in part on a processing capability of the IAB node 1010, a PDB of an RLC channel between the IAB node 1010 and the parent node 1015 or between the IAB node 1010 and the child node 1020, or a latency requirement of the IAB node 1010, among other examples. As a result, the time gap 1070 between the uplink CG resource 1060 and the uplink CG resource 1065 may be reduced by coordinating the uplink CG resource 1060 and the uplink CG resource 1065. Therefore, the IAB node 1010 may reduce a latency associated with forwarding an uplink communication, received from the child node 1020 using the uplink CG resource 1065, to the parent node 1015 using the uplink CG resource 1060.

A node (for example, a parent node or an IAB node) may be unable to transmit data in a downlink during an SPS occasion when the SPS occasion corresponds to an NA resource type. The SPS occasion may be a periodic SPS occasion that is configured using an activation DCI. When the node is unable to transmit using an SPS occasion that becomes canceled due to a DU resource type corresponding to the SPS occasion being an NA resource type, the node may configure a dynamic grant to transmit the data in the downlink. However, the configuration of the dynamic grant may result in additional latency, which may be problematic for periodic low-latency data.

Various aspects relate generally to a priority flag that may be assigned to a resource to indicate that the resource is available to an IAB node, irrespective of a resource type associated with the resource. Some aspects more specifically relate to assigning a priority flag to the resource may enable the resource to be used by the IAB node, even when the resource corresponds to the NA resource type. In some aspects, the resource may correspond to a downlink SPS occasion or an uplink configured grant, and the resource may correspond to an NA resource type. The priority flag assigned to the resource may enable the resource to be used by the IAB node, even when the resource corresponds to the NA resource type. In other words, the priority flag assigned to the resource may override the resource type associated with the resource.

Particular aspects of the subject matter described in this disclosure can be implemented to realize one or more of the following potential advantages. In some examples, the described techniques can be used to reduce latency associated with communications in an IAB network. For example, a downlink SPS occasion or an uplink configured grant corresponding to the resource may not be canceled, which may allow a communication involving the IAB node to occur with reduced latency, in part because a dynamic grant may not be configured for the communication, which would increase the latency.

Figure 11:
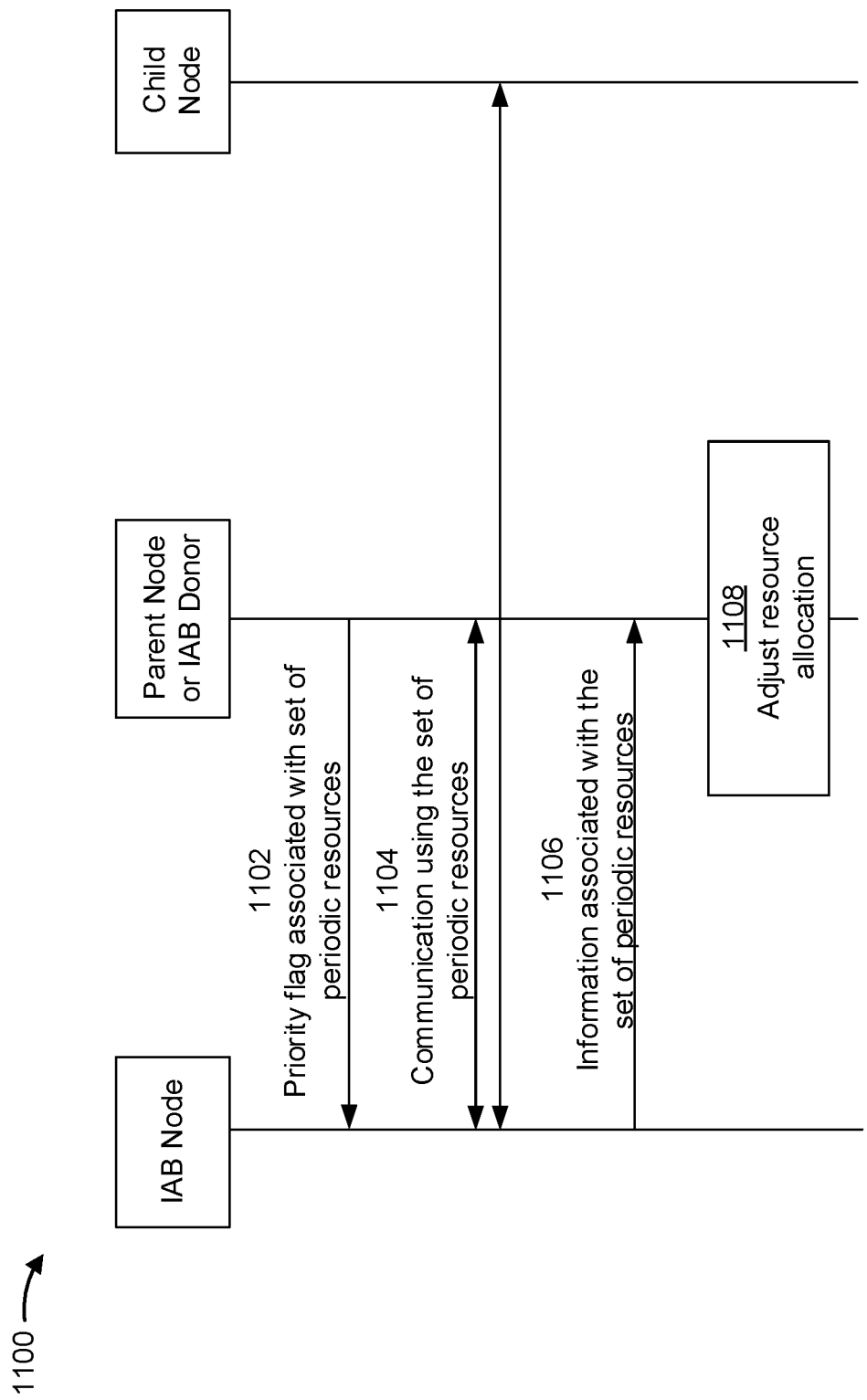
FIGS. 11-15 are diagrams illustrating examples associated with priority flag signaling for periodic resources, in accordance with the present disclosure.

FIG. 11 is a diagram illustrating an example associated with priority flag signaling 1100 for periodic resources, in accordance with the present disclosure. As shown in FIG. 11, the priority flag signaling 1100 includes communication between an IAB node (for example, IAB node 345), a parent node or an IAB donor (for example, IAB donor 335) and a child node (for example, UE 120). In some aspects, the IAB node, the parent node or the IAB donor, and the child node may be included in a wireless network such as wireless network 100. The IAB node, the parent node or the IAB donor, and the child node may communicate on a wireless sidelink.

In some aspects, the IAB node, the parent node or the IAB donor, and the child node may be included in a multi-hop IAB network. A message that is originated at an IAB donor may be delivered to an IAB node via a routing path from the IAB donor to the IAB node. The routing path may include one or more intermediate IAB nodes, which may include a parent node of the IAB node.

In a first operation 1102, the IAB node may receive, from the parent node or the IAB donor, a priority flag associated with a set of periodic resources. In some aspects, the priority flag may be received from an IAB donor CU associated with the IAB donor. In some cases, the priority flag may be received from a parent node DU associated with a parent node of the IAB node. The priority flag may indicate that the set of periodic resources are available to the IAB node irrespective of a resource type associated with individual resources included in the set of periodic resources. The set of periodic resources may be available to an MT or a DU of the IAB node. The resource type associated with the individual resources may be a configured DU resource type.

In some aspects, the resource type associated with the individual resources included in the set of periodic resources may be an NA resource type, a hard resource type, or a soft resource type. In some aspects, when the resource type associated with the individual resources included in the set of periodic resources is the NA resource type, the priority flag may indicate that the individual resources associated with the NA resource type are to be overridden and made available to the IAB node. In other words, the individual resources associated with the NA resource type may be used by the IAB node when the set of periodic resources including the individual resources is assigned the priority flag.

In past solutions, a DU resource type of a resource defined which entity of the IAB node (for example, a DU or an MT of the IAB node) had priority to use the resource. For a resource with a DU type of "hard", the DU had higher priority to use the resource as compared to the MT. For a resource with a DU type of "NA", the DU could not use the resource except for a set of cell-defined signals. For a resource with a DU type of "soft", a priority was controlled by a parent node via an explicit indication or based at least in part on an implicit determination.

In some aspects, a resource type associated with a periodic resource allocated for an entity of the IAB node (for example, a DU or an MT of the IAB node) may be overridden when the periodic resource is indicated with a priority flag. The priority flag may be a high priority flag assigned to the periodic resource, which may indicate that the resource type associated with the periodic resource is to be overridden and made available to the IAB node.

In some aspects, the priority flag may provide the IAB node (for example, the DU or the MT of the IAB node) with priority to use the periodic resource for periodic low-latency traffic, regardless of a configured DU resource type associated with the periodic resource. The periodic resource assigned with the priority flag may be associated with a downlink SPS or an uplink configured grant for periodic low-latency traffic. When the priority flag for the periodic resource is indicated, the priority flag may be applied to allocated periodic resources that conflict with the configured DU resource type. Periodic resource locations may be previously known to parent and child nodes, which may enable the parent and child nodes to coordinate periodic resource usage based at least in part on known conflict locations.

In some cases, a resource type associated with the periodic resource may be overridden and made available to the IAB node based at least in part on a dynamic DCI grant. However, transmitting the dynamic DCI grant in time may involve using an available PDCCH resource, which is not applicable when the priority flag is used to give the IAB node priority to use the periodic resource(s).

In some aspects, the IAB node may receive the priority flag via an RRC message from the IAB donor CU associated with the IAB node. In some aspects, the IAB node may receive the priority flag via an F1-AP message from the IAB donor CU associated with the IAB node. In some aspects, the IAB node may receive the priority flag via a MAC-CE from a DU of the parent node. In some aspects, the IAB node may receive the priority flag via an activation downlink control information from the DU of the parent node.

In some aspects, the set of periodic resources may include downlink resources allocated via downlink SPS or uplink resources allocated via an uplink configured grant (Type 1 or Type 2). Downlink SPS and uplink configured grant(s) may be used to allocate periodic resources for downlink or uplink data communications. A downlink SPS approach may include an RRC configuration and a DCI activation grant. The RRC configuration may be used to convey parameters, such as a periodicity, a quantity of HARQ processes, or the like. The DCI activation grant may be an allocation grant to allocate periodic resources for downlink transmissions. Dynamic grants for the downlink transmissions may not be used when the DCI activation grant is used to allocate the periodic resources. An uplink configured grant (Type 1) approach may include an RRC configuration. An uplink configured grant (Type 2) approach may include an RRC configuration and a DCI activation grant.

In some aspects, priority rules may be defined for resolving resource confliction between allocations. For example, in a downlink, a dynamic DCI grant may have a higher priority than an SPS associated with a reduced index, and the SPS associated with the reduced index may have a higher priority than an SPS associated with an increased index. In another example, in an uplink, a dynamic DCI grant and a configured grant may be indicated with a priority level. A dynamic DCI grant associated with an increased priority may have a higher priority than an SPS associated with an increased priority, the SPS associated with the increased priority may have a higher priority than a dynamic DCI grant associated with a reduced priority, and the dynamic DCI grant associated with the reduced priority may have a higher priority than an SPS associated with a reduced priority. For a same priority level, an SPS associated with a reduced index may have a higher priority than an SPS associated with an increased index.

In a second operation 1104, the IAB node may perform a communication with the child node (for example, a child IAB node or a UE) of the IAB node or the parent node of the IAB node, using the set of periodic resources based at least in part on the priority flag associated with the set of periodic resources. In some aspects, when the set of periodic resources is allocated for a DU of the IAB node, the IAB node may perform the communication with the child node of the IAB node. In some aspects, when the set of periodic resources is allocated for an MT of the IAB node, the IAB node may perform the communication with the parent node of the IAB node.

In some aspects, the set of periodic resources may be allocated for the MT of the IAB node or the DU of the IAB node. When the set of periodic resources is allocated for the MT of the IAB node, the set of periodic resources may be used by the MT of the IAB node to communicate with the parent node of the IAB node. When the set of periodic resources is allocated for the DU of the IAB node, the set of periodic resources may be used by the DU of the IAB node to communicate with the child node of the IAB node.

In some aspects, the communication may be associated with periodic reduced latency traffic (or periodic low-latency traffic). In other words, the set of periodic resources associated with the priority flag may be targeted for periodic reduced latency traffic, such as TSC traffic.

In some aspects, TSC traffic may follow a traffic pattern that is periodic or deterministic. The TSC traffic may be enabled by assistance information, which may be transmitted by a session management function (SMF) to a base station via AMF during a QoS flow establishment for efficient scheduling of the TSC traffic. The assistance information may include a flow direction of the TSC traffic (for example, uplink or downlink), a periodicity, or a burst arrival time. A TSC QoS flow may use a delay critical GBR type.

In some aspects, a channel associated with the IAB node that carries a type of traffic may use the set of periodic resources associated with the priority flag. For example, an RLC channel associated with the IAB node that carries periodic reduced latency traffic may use the set of periodic resources associated with the priority flag. In some aspects, other channels (for example, a PDCP channel, or a MAC channel) associated with the IAB node that carries the periodic reduced latency traffic may use the set of periodic resources associated with the priority flag.

In a third operation 1106, the IAB node may transmit, to the parent node, information associated with the set of periodic resources that is available to the IAB node irrespective of the resource type. For example, the information may describe a downlink SPS or an uplink configured grant of the IAB node associated with the set of periodic resources, where the downlink SPS or the uplink configured grant may be associated with the priority flag. In some aspects, the IAB node may transmit the information to the parent node via a MAC-CE.

In a fourth operation 1108, the parent node may adjust a resource allocation based at least in part on the information received from the IAB node. For example, the parent node may detect that a resource overlaps with the downlink SPS or the uplink configured grant of the IAB node, where the downlink SPS or the uplink configured grant may be associated with the priority flag. In such examples, the parent node may avoid scheduling a child node with the resource, and the parent node may instead schedule another node to use the resource.

In some aspects, the parent node may receive information, from the IAB donor, associated with the set of periodic resources allocated to the IAB node with the priority flag, and the parent node may adjust the resource allocation based at least in part on the information received from the IAB donor. For example, the parent node may receive the information via an F1-AP message or an RRC message from an IAB donor CU of the IAB donor.

Figure 12:
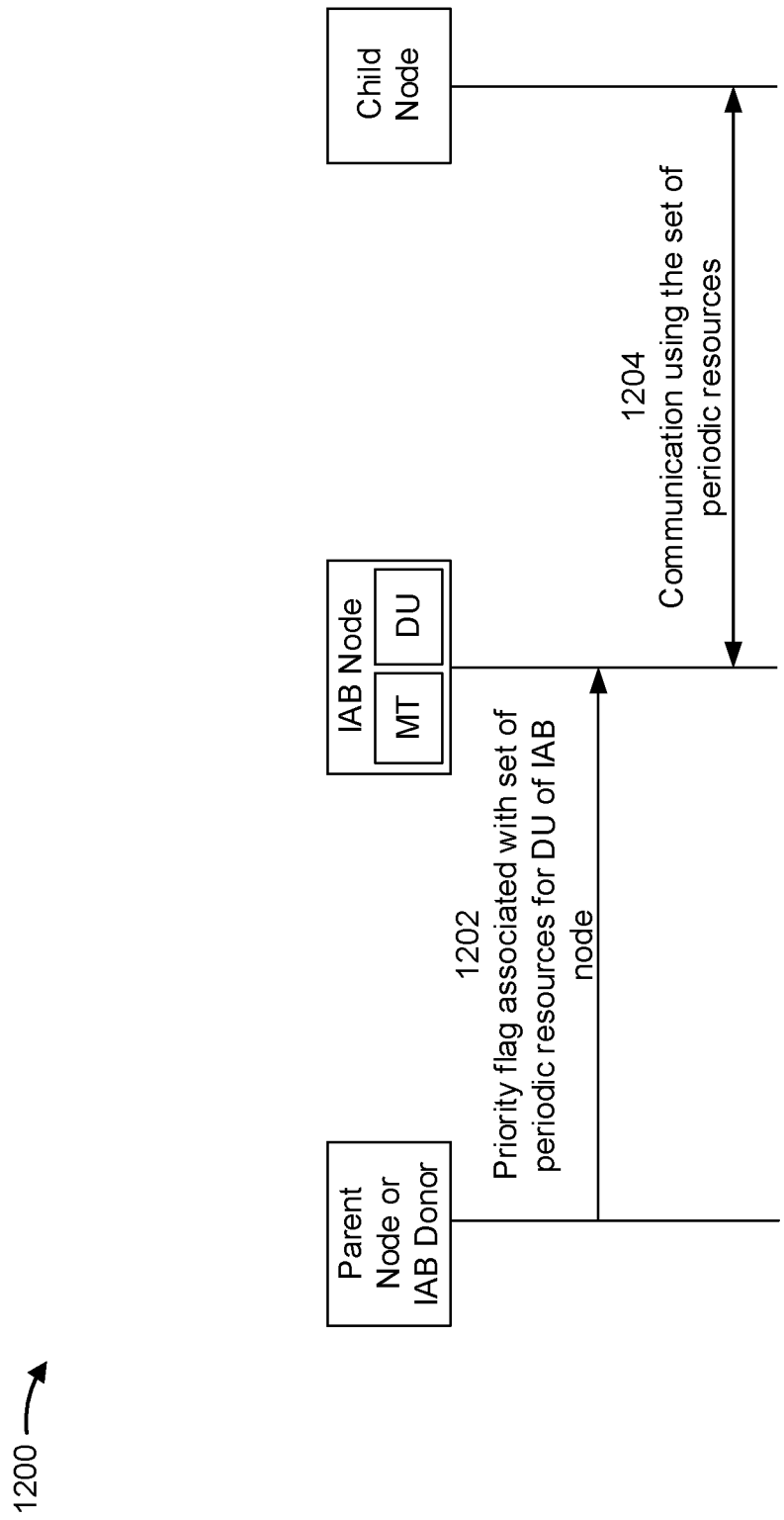

FIG. 12 is a diagram illustrating an example associated with priority flag signaling 1200 for periodic resources, in accordance with the present disclosure. As shown in FIG. 12, priority flag signaling 1200 includes communication between a parent node or an IAB donor (for example, IAB donor 335), an IAB node (for example, IAB node 345), and a child node (for example, UE 120). In some aspects, the parent node or the IAB donor, the IAB node, and the child node may be included in a wireless network such as wireless network 100. The parent node or the IAB donor, the IAB node, and the child node may communicate on a wireless sidelink.

In a first operation 1202, the IAB node may receive, from the parent node or the IAB donor, a priority flag associated with a set of periodic resources. The priority flag may be associated with the set of periodic resources for a DU of the IAB node. The priority flag may indicate that the set of periodic resources are available to the DU of the IAB node irrespective of a resource type associated with individual resources included in the set of periodic resources.

In a second operation 1204, the IAB node may perform a communication with the child node (for example, a child IAB node or a UE) of the IAB node, using the set of periodic resources associated with the priority flag. In other words, when the set of periodic resources is allocated for the DU of the IAB node, the IAB node may perform the communication with the child node of the IAB node.

Figure 13:
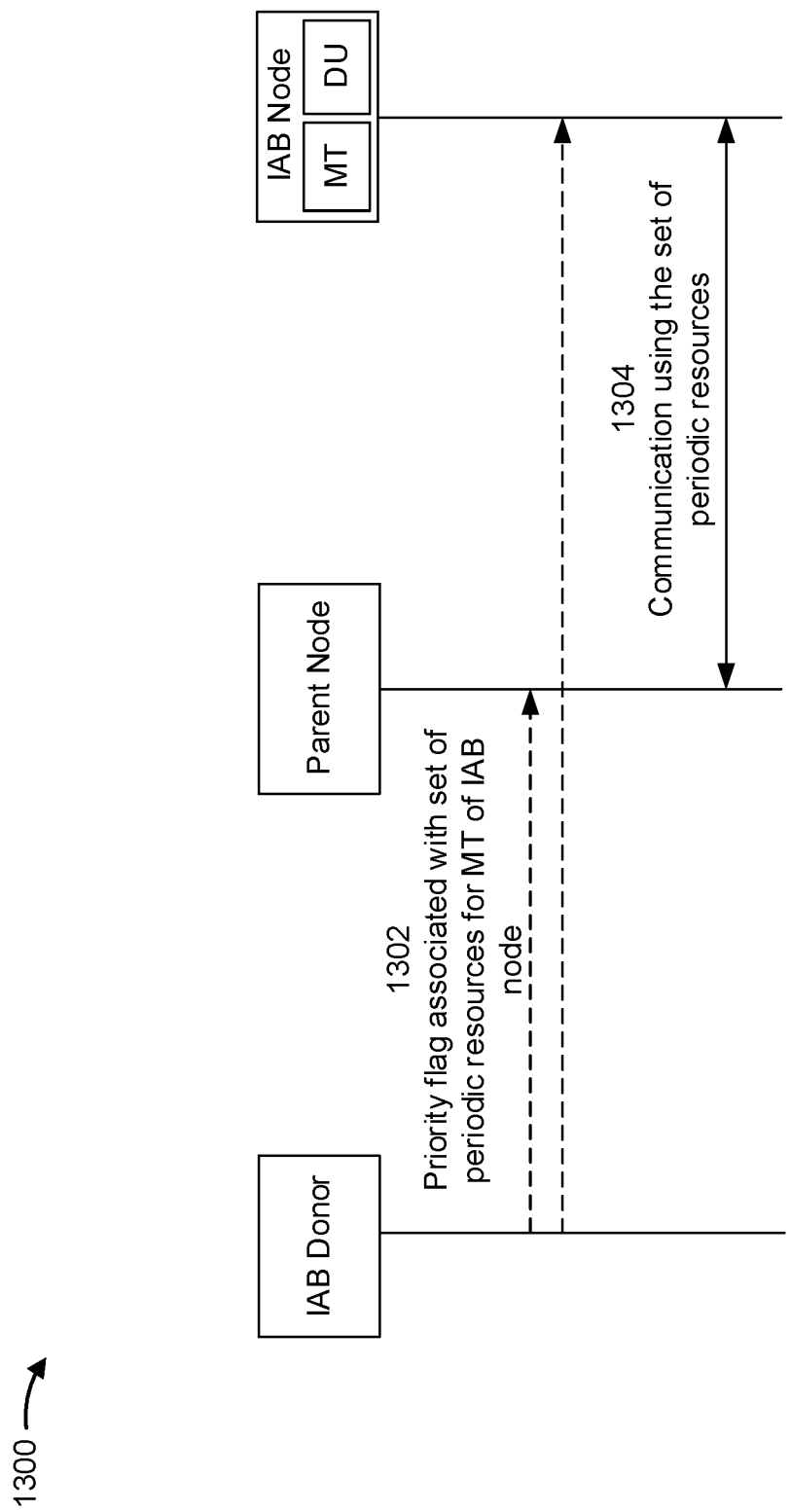

FIG. 13 is a diagram illustrating an example associated with priority flag signaling 1300 for periodic resources, in accordance with the present disclosure. As shown in FIG. 13, example 1300 includes communication between an IAB donor (for example, IAB donor 335), a parent node, and an IAB node (for example, IAB node 345). In some aspects, the IAB donor, the parent node, and the IAB node may be included in a wireless network such as wireless network 100. The IAB donor, the parent node, and the IAB node may communicate on a wireless sidelink.

In a first operation 1302, the IAB node may receive, from the IAB donor or the parent node, a priority flag associated with a set of periodic resources. The priority flag may be associated with the set of periodic resources for an MT of the IAB node. The priority flag may indicate that the set of periodic resources are available to the MT of the IAB node irrespective of a resource type associated with individual resources included in the set of periodic resources.

In a second operation 1304, the IAB node may perform a communication with the parent node of the IAB node, using the set of periodic resources associated with the priority flag. In other words, when the set of periodic resources is allocated for the MT of the IAB node, the IAB node may perform the communication with the parent node of the IAB node.

Figure 14:
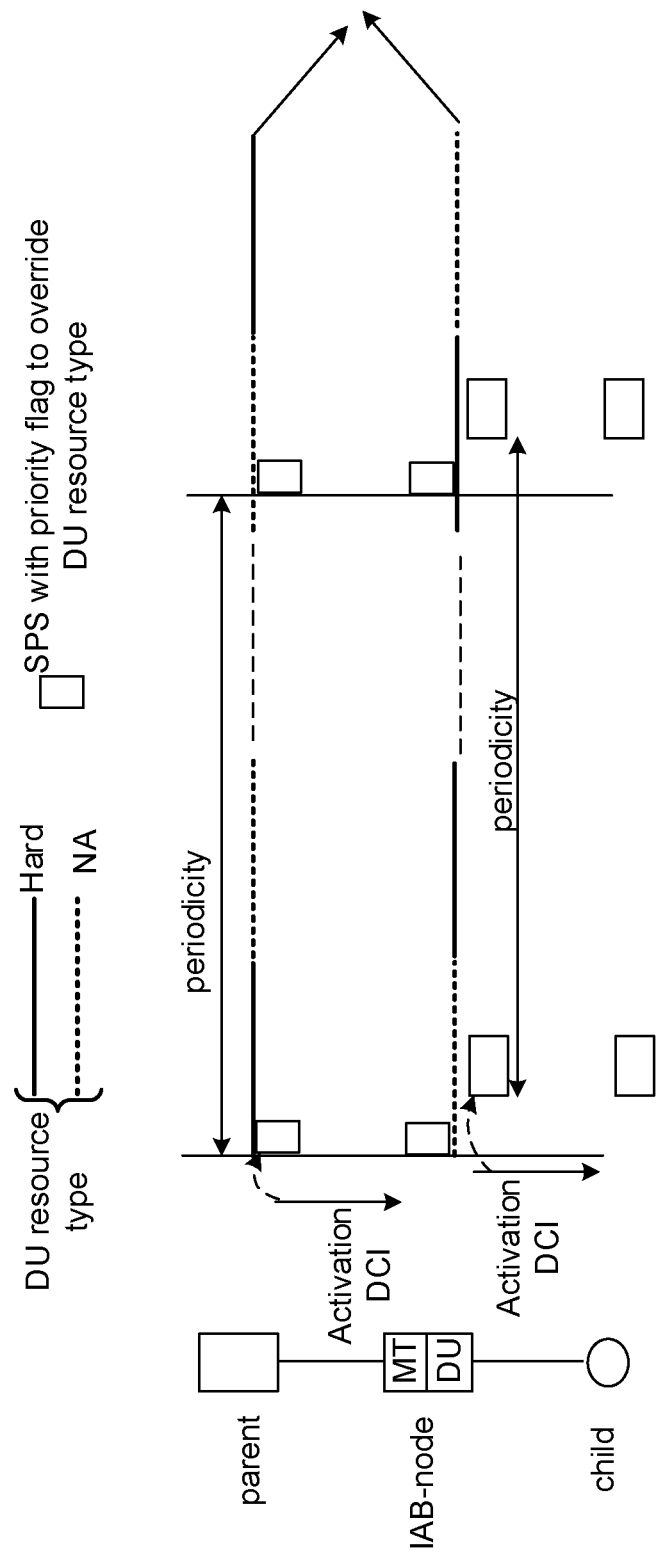

FIG. 14 is a diagram illustrating an example associated with priority flag signaling 1400 for periodic resources, in accordance with the present disclosure. As shown in FIG. 14, a parent node may transmit an activation DCI to an IAB node. The parent node may be a parent of the IAB node. The activation DCI may configure an SPS occasion for the parent node. The SPS occasion may be associated with a priority flag to override a DU resource type of a periodic resource associated with the SPS occasion. In such examples, the DU resource type corresponding to the SPS occasion may be a hard resource type. The IAB node may transmit an activation DCI to a child node. The child node may be a child of the IAB node. The activation DCI transmitted by the IAB node may configure an SPS occasion for the IAB node. The SPS occasion may be associated with the priority flag to override the DU resource type of a periodic resource associated with the SPS occasion. In such examples, the DU resource type corresponding to the SPS occasion may be an NA resource type, but the periodic resource may be available to the IAB node based at least in part on the priority flag. In other words, the NA resource type associated with the periodic resource corresponding to the SPS occasion may be overridden and the SPS occasion may be made available to the IAB node. The IAB node may use the SPS occasion to transmit data to the child node, and the IAB node may not have to configure a dynamic grant to transmit the data, thereby reducing latency when communicating with the child node.

Figure 15:
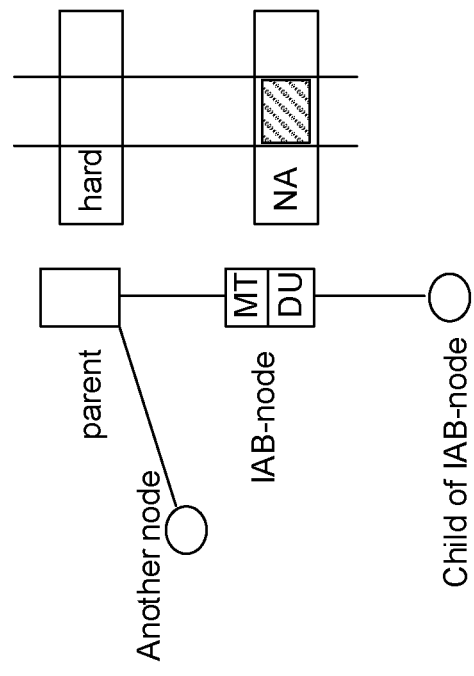

FIG. 15 is a diagram illustrating an example associated with priority flag signaling 1500 for periodic resources, in accordance with the present disclosure. In some aspects, a parent node may receive information associated with resources that are available to an IAB node irrespective of a resource type associated with the resources, based at least in part on a priority flag associated with the resources. The resources may correspond to a downlink SPS or an uplink configured grant. The parent node may determine, based at least in part on the information, an instance of an SPS allocation (for example, a high priority DU SPS allocation) that overrides a corresponding NA resource. In such examples, the parent node may schedule an overlapping resource of the parent node (for example, a hard resource) to another node, because the overlapping resource cannot be used by the parent node to communicate with the IAB node. In other words, when a resource associated with the priority flag overlaps with the downlink SPS or the uplink configured grant of the IAB node, the parent node may avoid scheduling a child node with the resource, and the parent node may instead schedule another node to use the resource.

Figure 16:
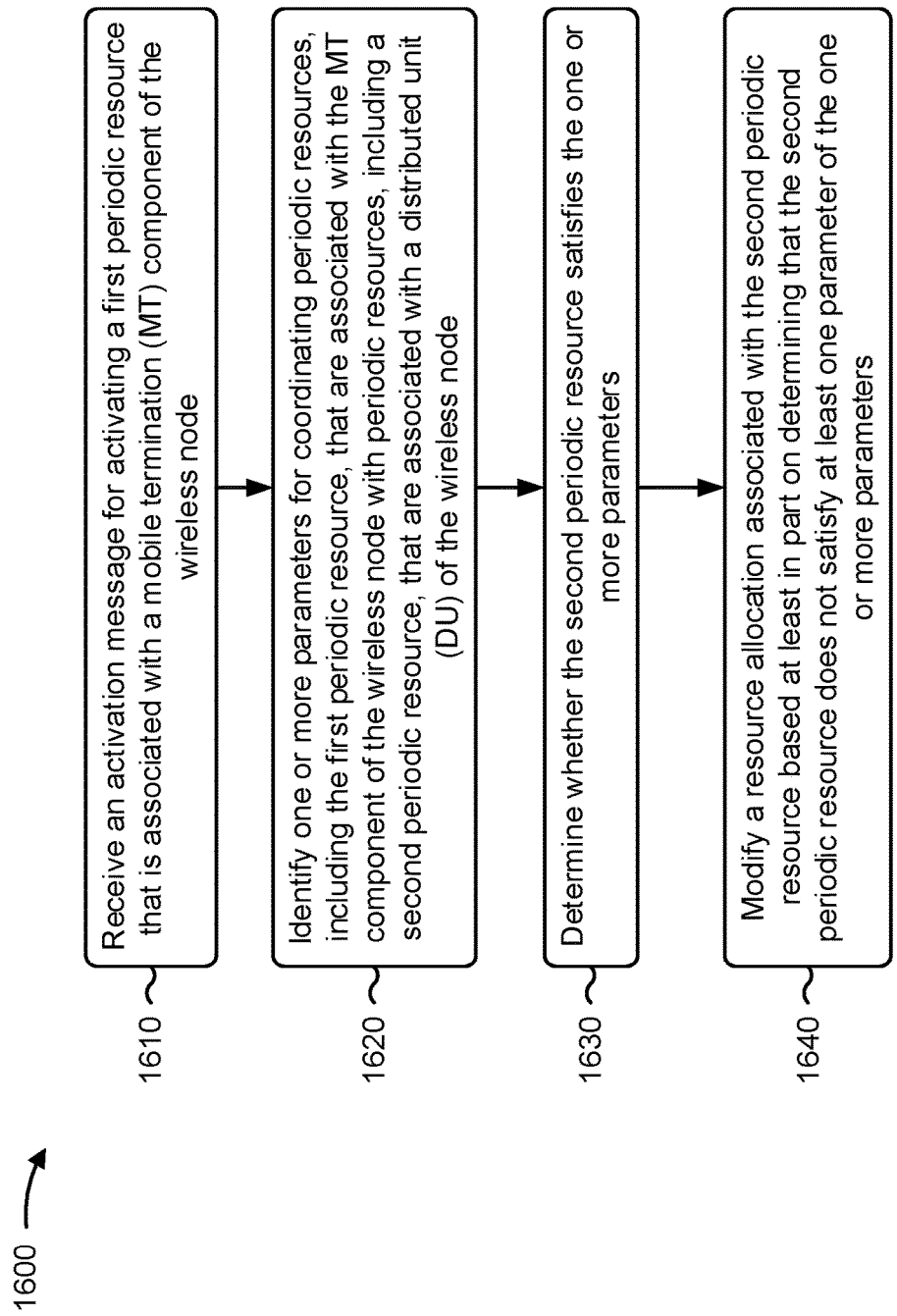
FIGS. 16-18 are flowcharts illustrating example processes performed, for example, by a wireless node, in accordance with the present disclosure.

FIG. 16 is a flowchart illustrating an example process 1600 performed, for example, by a wireless node in accordance with the present disclosure. Example process 1600 is an example where the wireless node (for example, wireless node 905, IAB node 1010, or an IAB node 410) performs operations associated with periodic resource coordination in an IAB network.

As shown in FIG. 16, in some aspects, process 1600 may include receiving an activation message for activating a first periodic resource that is associated with an MT component of the wireless node (block 1610). For example, the wireless node (such as by using reception component 2402, depicted in FIG. 24) may receive an activation message for activating a first periodic resource that is associated with an MT component of the wireless node, as described above.

As further shown in FIG. 16, in some aspects, process 1600 may include identifying one or more parameters for coordinating periodic resources, including the first periodic resource, that are associated with the MT component of the wireless node with periodic resources, including a second periodic resource, that are associated with a DU of the wireless node (block 1620). For example, the wireless node (such as by using parameter identification component 2410, depicted in FIG. 24) may identify one or more parameters for coordinating periodic resources, including the first periodic resource, that are associated with the MT component of the wireless node with periodic resources, including a second periodic resource, that are associated with a DU of the wireless node, as described above.

As further shown in FIG. 16, in some aspects, process 1600 may include determining whether the second periodic resource satisfies the one or more parameters (block 1630). For example, the wireless node (such as by using determination component 2412, depicted in FIG. 24) may determine whether the second periodic resource satisfies the one or more parameters, as described above.

As further shown in FIG. 16, in some aspects, process 1600 may include modifying a resource allocation associated with the second periodic resource based at least in part on determining that the second periodic resource does not satisfy at least one parameter of the one or more parameters (block 1640). For example, the wireless node (such as by using resource allocation modification component 2414, depicted in FIG. 24) may modify a resource allocation associated with the second periodic resource based at least in part on determining that the second periodic resource does not satisfy at least one parameter of the one or more parameters, as described above.

Process 1600 may include additional aspects, such as any single aspect or any combination of aspects described below or in connection with one or more other processes described elsewhere herein.

In a first additional aspect, process 1600 includes transmitting, to a child node, an activation message associated with the second periodic resource that indicates the modified resource allocation associated with the second periodic resource.

In a second additional aspect, alone or in combination with the first aspect, the first periodic resource and the second periodic resource are both downlink SPS resources or are both uplink configured grant resources.

In a third additional aspect, alone or in combination with one or more of the first and second aspects, the first periodic resource or the second periodic resource are associated with an RLC channel that carries low-latency traffic.

In a fourth additional aspect, alone or in combination with one or more of the first through third aspects, the one or more parameters include at least one of a time gap between periodic resources that are associated with the MT component and periodic resources that are associated with the DU, or a range of time gaps between periodic resources that are associated with the MT component and periodic resources that are associated with the DU.

In a fifth additional aspect, alone or in combination with one or more of the first through fourth aspects, the time gap is based at least in part on a processing capability of the wireless node.

In a sixth additional aspect, alone or in combination with one or more of the first through fifth aspects, identifying the one or more parameters for coordinating periodic resources that are associated with the MT component of the wireless node with periodic resources that are associated with the DU of the wireless node comprises receiving, from a control node, an indication of the one or more parameters.

In a seventh additional aspect, alone or in combination with one or more of the first through sixth aspects, receiving, from the control node, the indication of the one or more parameters comprises receiving the indication of the one or more parameters via a RRC message or an F1-AP message.

In an eighth additional aspect, alone or in combination with one or more of the first through seventh aspects, the control node is a CU of an IAB donor.

In a ninth additional aspect, alone or in combination with one or more of the first through eighth aspects, identifying the one or more parameters for coordinating periodic resources that are associated with the MT component of the wireless node with periodic resources that are associated with the DU of the wireless node comprises receiving, from a parent node, an indication of the one or more parameters.

In a tenth additional aspect, alone or in combination with one or more of the first through ninth aspects, receiving, from the parent node, the indication of the one or more parameters comprises receiving the indication of the one or more parameters via a DCI message or a MAC-CE message.

In an eleventh additional aspect, alone or in combination with one or more of the first through tenth aspects, receiving, from the parent node, the indication of the one or more parameters comprises receiving the indication of the one or more parameters in the activation message.

In a twelfth additional aspect, alone or in combination with one or more of the first through eleventh aspects, the parent node is a DU of an IAB node.

In a thirteenth additional aspect, alone or in combination with one or more of the first through twelfth aspects, identifying the one or more parameters for coordinating periodic resources that are associated with the MT component of the wireless node with periodic resources that are associated with the DU of the wireless node comprises determining the one or more parameters.

In a fourteenth additional aspect, alone or in combination with one or more of the first through thirteenth aspects, process 1600 includes transmitting, to a parent node associated with the wireless node, an indication of the one or more parameters.

In a fifteenth additional aspect, alone or in combination with one or more of the first through fourteenth aspects, transmitting, to the parent node associated with the wireless node, the indication of the one or more parameters, comprises transmitting the indication of the one or more parameters via a MAC-CE message or a UCI message.

In a sixteenth additional aspect, alone or in combination with one or more of the first through fifteenth aspects, determining the one or more parameters comprises determining the one or more parameters based at least in part on at least one of a processing capability of the wireless node, a latency requirement associated with the wireless node, or a PDB of an RLC channel associated with the first periodic resource or the second periodic resource.

In a seventeenth additional aspect, alone or in combination with one or more of the first through sixteenth aspects, process 1600 includes transmitting, to a control node or a parent node, an indication of information to be used to determine the one or more parameters.

In an eighteenth additional aspect, alone or in combination with one or more of the first through seventeenth aspects, the information to be used to determine the one or more parameters includes at least one of a processing capability of the wireless node, a latency requirement associated with the wireless node, or a PDB of an RLC channel associated with the first periodic resource or the second periodic resource.

In a nineteenth additional aspect, alone or in combination with one or more of the first through eighteenth aspects, process 1600 includes receiving, from the control node or the parent node, an indication of the one or more parameters that are based at least in part on the information to be used to determine the one or more parameters.

In a twentieth additional aspect, alone or in combination with one or more of the first through nineteenth aspects, receiving the activation message for activating the first periodic resource that is associated with the MT component of the wireless node comprises identifying the second periodic resource that corresponds with the first periodic resource.

In a twenty-first additional aspect, alone or in combination with one or more of the first through twentieth aspects, determining whether the second periodic resource satisfies the one or more parameters comprises determining whether a resource allocation associated with the second periodic resource satisfies the one or more parameters.

In a twenty-second additional aspect, alone or in combination with one or more of the first through twenty-first aspects, process 1600 includes receiving an indication of a scheduling gap indicating an amount of time between the activation message and the first periodic resource.

In a twenty-third additional aspect, alone or in combination with one or more of the first through twenty-second aspects, determining whether the second periodic resource satisfies the one or more parameters comprises determining, during the scheduling gap, whether the second periodic resource satisfies the one or more parameters.

In a twenty-fourth additional aspect, alone or in combination with one or more of the first through twenty-third aspects, receiving the indication of the scheduling gap indicating the amount of time between the activation message and the first periodic resource comprises receiving, from a control node, the indication of the scheduling gap via an RRC message or an F1-AP message.

In a twenty-fifth additional aspect, alone or in combination with one or more of the first through twenty-fourth aspects, receiving the indication of the scheduling gap indicating the amount of time between the activation message and the first periodic resource comprises receiving, from a parent node, the indication of the scheduling gap via a DCI message or a MAC-CE message.

In a twenty-sixth additional aspect, alone or in combination with one or more of the first through twenty-fifth aspects, process 1600 includes receiving, by the MT component from a parent node using the first periodic resource, a first communication, and transmitting, by the DU to a child node using the second periodic resource, a second communication that is associated with the first communication.

In a twenty-seventh additional aspect, alone or in combination with one or more of the first through twenty-sixth aspects, process 1600 includes receiving, by the DU from a child node using the second periodic resource, a first communication, and transmitting, by the MT component to a parent node using the first periodic resource, a second communication that is associated with the first communication.

Although FIG. 16 shows example blocks of process 1600, in some aspects, process 1600 may include additional blocks, fewer blocks, different blocks, or differently arranged blocks than those depicted in FIG. 16. Additionally or alternatively, two or more of the blocks of process 1600 may be performed in parallel.

Figure 17:
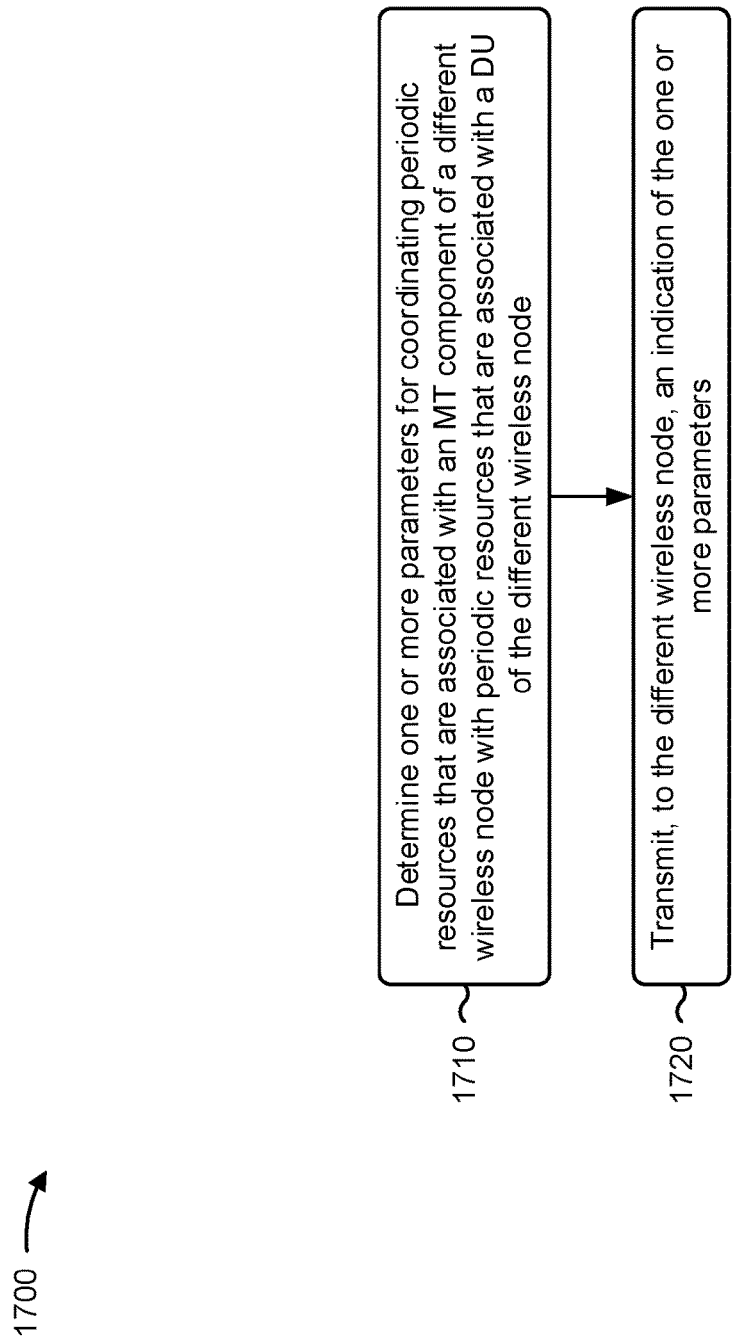

FIG. 17 is a flowchart illustrating an example process 1700 performed, for example, by a wireless node in accordance with the present disclosure. Example process 1700 is an example where the wireless node (for example, the parent node 910, the parent node 1015, a CU of an IAB donor 405, or a DU of an IAB node 410) performs operations associated with periodic resource coordination in an IAB network.

As shown in FIG. 17, in some aspects, process 1700 may include determining one or more parameters for coordinating periodic resources that are associated with an MT component of a different wireless node with periodic resources that are associated with a DU of the different wireless node (block 1710). For example, the wireless node (such as by using parameter determination component 2510, depicted in FIG. 25) may determine one or more parameters for coordinating periodic resources that are associated with an MT component of a different wireless node with periodic resources that are associated with a DU of the different wireless node, as described above.

As further shown in FIG. 17, in some aspects, process 1700 may include transmitting, to the different wireless node, an indication of the one or more parameters (block 1720). For example, the wireless node (such as by using transmission component 2506, depicted in FIG. 25) may transmit, to the different wireless node, an indication of the one or more parameters, as described above.

Process 1700 may include additional aspects, such as any single aspect or any combination of aspects described below or in connection with one or more other processes described elsewhere herein.

In a first additional aspect, the wireless node is a CU of an IAB donor or a DU of an IAB node.

In a second additional aspect, alone or in combination with the first aspect, determining the one or more parameters for coordinating periodic resources that are associated with the MT component of the different wireless node with periodic resources that are associated with the DU of the different wireless node comprises determining at least one of a time gap between periodic resources that are associated with the MT component of the different wireless node and periodic resources that are associated with the DU of the different wireless node, or a range of time gaps between periodic resources that are associated with the MT component of the different wireless node and periodic resources that are associated with the DU of the different wireless node.

In a third additional aspect, alone or in combination with one or more of the first and second aspects, determining the one or more parameters for coordinating periodic resources that are associated with the MT component of the different wireless node with periodic resources that are associated with the DU of the different wireless node comprises determining the one or more parameters based at least in part on information that includes at least one of a processing capability of the different wireless node, a latency requirement associated with the different wireless node, or a PDB of an RLC channel associated with the periodic resources that are associated with the MT component of the different wireless node or the periodic resources that are associated with the DU of the different wireless node.

In a fourth additional aspect, alone or in combination with one or more of the first through third aspects, process 1700 includes receiving, from the different wireless node, an indication of at least one of the processing capability of the different wireless node, or the latency requirement associated with the different wireless node.

In a fifth additional aspect, alone or in combination with one or more of the first through fourth aspects, transmitting the indication of the one or more parameters comprises transmitting the indication of the one or more parameters via an RRC message or an F1-AP message.

In a sixth additional aspect, alone or in combination with one or more of the first through fifth aspects, transmitting the indication of the one or more parameters comprises transmitting the indication of the one or more parameters via a DCI message or a MAC-CE message.

In a seventh additional aspect, alone or in combination with one or more of the first through sixth aspects, process 1700 includes determining a scheduling gap indicating an amount of time between an activation message for activating a periodic resource associated with the MT component of the different wireless node and the periodic resource, and transmitting, to the different wireless node, an indication of the scheduling gap.

In an eighth additional aspect, alone or in combination with one or more of the first through seventh aspects, process 1700 includes transmitting, to the different wireless node, an activation message for activating a periodic resource associated with the MT component of the different wireless node.

In a ninth additional aspect, alone or in combination with one or more of the first through eighth aspects, process 1700 includes transmitting, to the different wireless node during the periodic resource, a communication, where the communication is to be forwarded by the different wireless node to a child node associated with the different wireless node.

In a tenth additional aspect, alone or in combination with one or more of the first through ninth aspects, process 1700 includes receiving, from the different wireless node during the periodic resource, a communication, where the communication is associated with a communication to be forwarded by the different wireless node from a child node associated with the different wireless node to the wireless node.

In an eleventh additional aspect, alone or in combination with one or more of the first through tenth aspects, transmitting, to the different wireless node, the indication of the one or more parameters comprises transmitting, to a parent node associated with the different wireless node, the indication of the one or more parameters.

Although FIG. 17 shows example blocks of process 1700, in some aspects, process 1700 may include additional blocks, fewer blocks, different blocks, or differently arranged blocks than those depicted in FIG. 17. Additionally or alternatively, two or more of the blocks of process 1700 may be performed in parallel.

Figure 18:
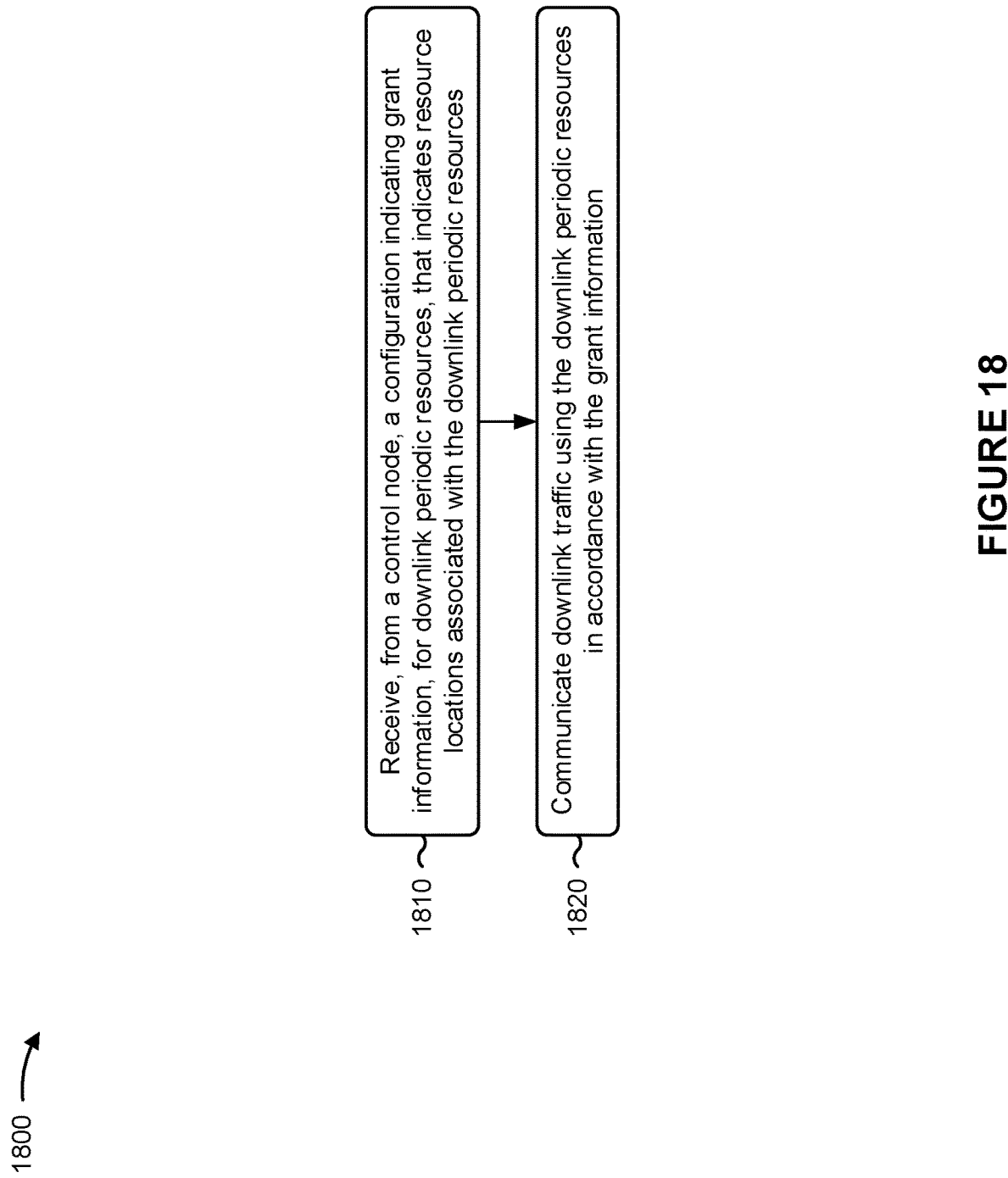

FIG. 18 is a flowchart illustrating an example process 1800 performed, for example, by a wireless node, in accordance with the present disclosure. Example process 1800 is an example where the wireless node (for example, an IAB node 410, a child node 810, or a UE 120) performs operations associated with configuring a downlink configured grant in an IAB network.

As shown in FIG. 18, in some aspects, process 1800 may include receiving, from a control node, a configuration indicating grant information, for downlink periodic resources, that indicates resource locations associated with the downlink periodic resources (block 1810). For example, the wireless node (such as by using reception component 2602, depicted in FIG. 26) may receive, from a control node, a configuration indicating grant information, for downlink periodic resources, that indicates resource locations associated with the downlink periodic resources, as described above.

As further shown in FIG. 18, in some aspects, process 1800 may include communicating downlink traffic using the downlink periodic resources in accordance with the grant information (block 1820). For example, the wireless node (such as by using reception component 2602 or transmission component 2506, depicted in FIG. 26) may communicate downlink traffic using the downlink periodic resources in accordance with the grant information, as described above.

Process 1800 may include additional aspects, such as any single aspect or any combination of aspects described below or in connection with one or more other processes described elsewhere herein.

In a first additional aspect, receiving the configuration indicating grant information, for downlink periodic resources, that indicates resource locations associated with the downlink periodic resources includes receiving the configuration indicating full grant information, and wherein communicating the downlink traffic using the downlink periodic resources in accordance with the grant information includes communicating the downlink traffic using the downlink periodic resources without receiving or transmitting an activation message associated with the downlink periodic resources.

In a second additional aspect, alone or in combination with the first aspect, the full grant information at least indicates the resource locations associated with the downlink periodic resources, an MCS associated with the downlink periodic resources, a frequency domain resource block (RB) allocation associated with the downlink periodic resources, and an antenna port of the wireless node associated with the downlink periodic resources.

In a third additional aspect, alone or in combination with one or more of the first and second aspects, receiving the configuration indicating grant information, for downlink periodic resources, that indicates resource locations associated with the downlink periodic resources includes receiving the configuration indicating partial grant information that at least indicated the resource locations associated with the downlink periodic resources.

In a fourth additional aspect, alone or in combination with one or more of the first through third aspects, communicating the downlink traffic using the downlink periodic resources in accordance with the grant information includes transmitting or receiving an activation message indicating remaining grant information associated with the downlink periodic resources, and communicating the downlink traffic using the downlink periodic resources in accordance with the partial grant information and the remaining grant information.

In a fifth additional aspect, alone or in combination with one or more of the first through fourth aspects, the remaining grant information associated with downlink periodic resources indicates at least one of an MCS associated with the downlink periodic resources, a frequency domain RB allocation associated with the downlink periodic resources, an antenna port of the wireless node associated with the downlink periodic resources, or a RV associated with the downlink periodic resources.

In a sixth additional aspect, alone or in combination with one or more of the first through fifth aspects, the control node is a CU of an IAB donor.

In a seventh additional aspect, alone or in combination with one or more of the first through sixth aspects, the wireless node is an IAB node and the downlink periodic resources are associated with an MT component of the IAB node, and wherein communicating the downlink traffic using the downlink periodic resources in accordance with the grant information includes receiving, from a parent node associated with the IAB node, the downlink traffic using the downlink periodic resources.

In an eighth additional aspect, alone or in combination with one or more of the first through seventh aspects, the wireless node is an IAB node and the downlink periodic resources are associated with a DU of the IAB node, and wherein communicating the downlink traffic using the downlink periodic resources in accordance with the grant information includes transmitting, to a child node associated with the IAB node, the downlink traffic using the downlink periodic resources.

In a ninth additional aspect, alone or in combination with one or more of the first through eighth aspects, receiving the configuration indicating the grant information includes receiving an indication of a periodicity associated with the downlink periodic resources and offset values associated with the downlink periodic resources.

In a tenth additional aspect, alone or in combination with one or more of the first through ninth aspects, process 1800 includes transmitting, to the control node, an indication of a processing capability associated with wireless node.

Although FIG. 18 shows example blocks of process 1800, in some aspects, process 1800 may include additional blocks, fewer blocks, different blocks, or differently arranged blocks than those depicted in FIG. 18. Additionally or alternatively, two or more of the blocks of process 1800 may be performed in parallel.

Figure 19:
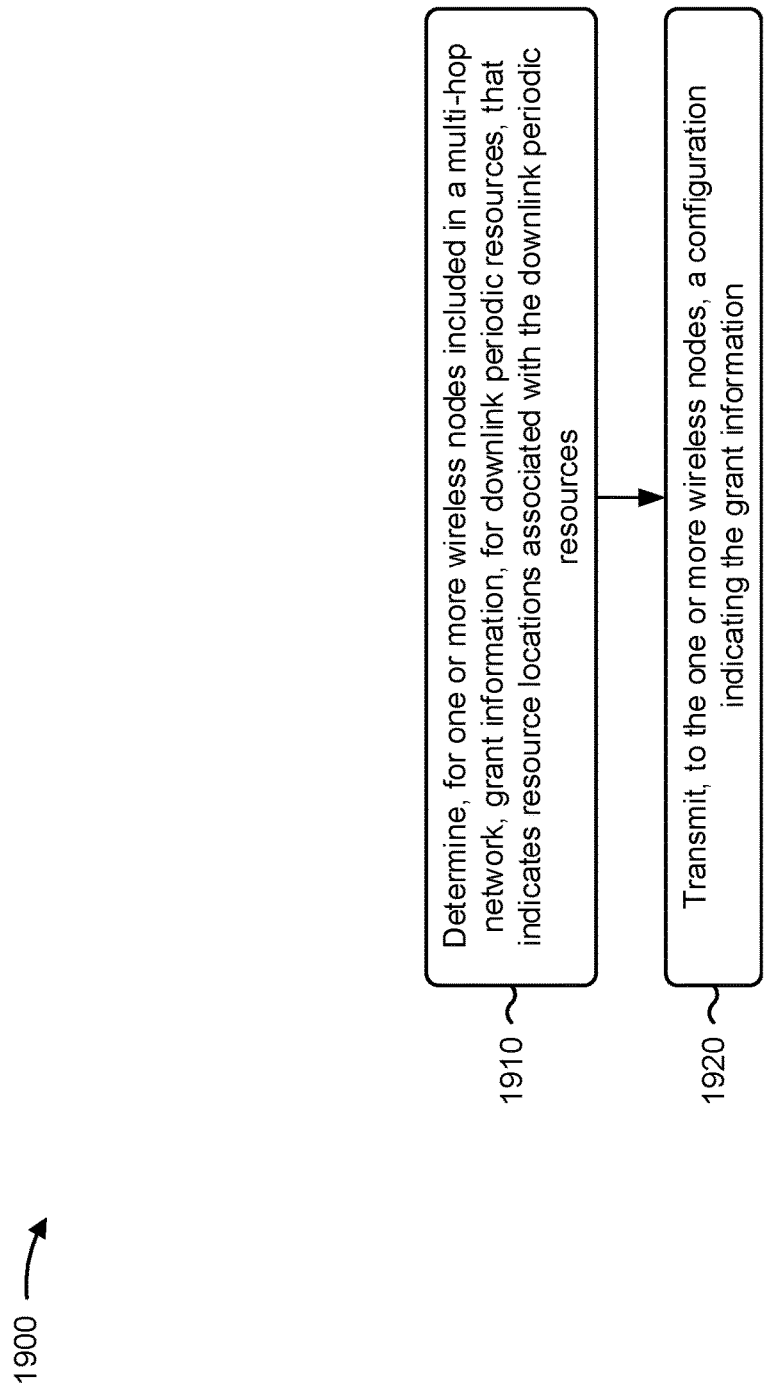
FIG. 19 is a flowchart illustrating example processes performed, for example, by a control node, in accordance with the present disclosure.

FIG. 19 is a flowchart illustrating an example process 1900 performed, for example, by a control node in accordance with the present disclosure. Example process 1900 is an example where the control node (for example, an IAB donor 405, a CU of an IAB donor 405, or a base station 110) performs operations associated with configuring a downlink configured grant in an IAB network.

As shown in FIG. 19, in some aspects, process 1900 may include determining, for one or more wireless nodes included in a multi-hop network, grant information, for downlink periodic resources, that indicates resource locations associated with the downlink periodic resources (block 1910). For example, the control node (such as by using grant information determination component 2710, depicted in FIG. 27) may determine, for one or more wireless nodes included in a multi-hop network, grant information, for downlink periodic resources, that indicates resource locations associated with the downlink periodic resources, as described above.

As further shown in FIG. 19, in some aspects, process 1900 may include transmitting, to the one or more wireless nodes, a configuration indicating the grant information (block 1920). For example, the control node (such as by using transmission component 2706, depicted in FIG. 27) may transmit, to the one or more wireless nodes, a configuration indicating the grant information, as described above.

Process 1900 may include additional aspects, such as any single aspect or any combination of aspects described below or in connection with one or more other processes described elsewhere herein.

In a first additional aspect, transmitting the configuration indicating the grant information includes transmitting, to each wireless node of the one or more wireless nodes, full grant information that enables the wireless node to communicate periodic downlink communications, using the downlink periodic resources, without an activation message.

In a second additional aspect, alone or in combination with the first aspect, determining, for one or more wireless nodes included in a multi-hop network, grant information, for downlink periodic resources, that indicates resource locations associated with the downlink periodic resources includes determining, for each wireless node of the one or more wireless nodes, the full grant information.

In a third additional aspect, alone or in combination with one or more of the first and second aspects, transmitting the configuration indicating the grant information includes transmitting, to each wireless node of the one or more wireless nodes, partial grant information that at least indicates the resource locations associated with the downlink periodic resources.

In a fourth additional aspect, alone or in combination with one or more of the first through third aspects, determining, for the one or more wireless nodes included in a multi-hop network, grant information, for downlink periodic resources, that indicates resource locations associated with the downlink periodic resources includes determining, for each wireless node of the one or more wireless nodes, the partial grant information.

In a fifth additional aspect, alone or in combination with one or more of the first through fourth aspects, determining, for each wireless node of the one or more wireless nodes, the partial grant information includes determining at least one of an MCS associated with the downlink periodic resources, a frequency domain RB allocation associated with the downlink periodic resources, an antenna port of the wireless node associated with the downlink periodic resources, or a RV associated with the downlink periodic resources.

In a sixth additional aspect, alone or in combination with one or more of the first through fifth aspects, determining, for the one or more wireless nodes included in a multi-hop network, grant information, for downlink periodic resources, that indicates resource locations associated with the downlink periodic resources includes determining, for each wireless node of the one or more wireless nodes, grant information for downlink periodic resources to be used by the wireless node.

In a seventh additional aspect, alone or in combination with one or more of the first through sixth aspects, the one or more wireless nodes are included in a communication path for periodic multi-hop downlink communications.

In an eighth additional aspect, alone or in combination with one or more of the first through seventh aspects, the communication path includes one or more RLC channels that are associated with low latency traffic.

In a ninth additional aspect, alone or in combination with one or more of the first through eighth aspects, determining, for the one or more wireless nodes included in a multi-hop network, grant information, for downlink periodic resources, that indicates resource locations associated with the downlink periodic resources includes determining, for each wireless node of the one or more wireless nodes, the resource locations associated with the downlink periodic resources for the wireless node.

In a tenth additional aspect, alone or in combination with one or more of the first through ninth aspects, determining, for each wireless node of the one or more wireless nodes, the resource locations associated with the downlink periodic resources for the wireless node includes determining a periodicity associated with the downlink periodic resources, and determining offset values associated with the downlink periodic resources.

In an eleventh additional aspect, alone or in combination with one or more of the first through tenth aspects, transmitting the configuration indicating the grant information includes transmitting, to a wireless node of the one or more wireless nodes, an indication of the periodicity associated with the downlink periodic resources and the offset values associated with the downlink periodic resources.

In a twelfth additional aspect, alone or in combination with one or more of the first through eleventh aspects, determining, for the one or more wireless nodes included in a multi-hop network, grant information, for downlink periodic resources, that indicates resource locations associated with the downlink periodic resources includes determining, for each wireless node of the one or more wireless nodes, the grant information based at least in part on at least one of a traffic pattern of the wireless node, a duplex communication mode capability of the wireless node, an IAB resource type pattern of the wireless node, an average link quality associated with the wireless node, a processing capability of the wireless node, or a latency requirement of the wireless node.

In a thirteenth additional aspect, alone or in combination with one or more of the first through twelfth aspects, process 1900 includes receiving, from a wireless node of the one or more wireless nodes, an indication of the processing capability of the wireless node.

In a fourteenth additional aspect, alone or in combination with one or more of the first through thirteenth aspects, the control node is a CU of an IAB donor.

In a fifteenth additional aspect, alone or in combination with one or more of the first through fourteenth aspects, determining, for the one or more wireless nodes included in a multi-hop network, grant information, for downlink periodic resources, that indicates resource locations associated with the downlink periodic resources includes determining, for a wireless node of the one or more wireless nodes, grant information that indicates a resource location for a downlink periodic resource that is associated with an MT component of the wireless node and that is to be used by the wireless node to receive periodic downlink communications.

In a sixteenth additional aspect, alone or in combination with one or more of the first through fifteenth aspects, determining, for the one or more wireless nodes included in a multi-hop network, grant information, for downlink periodic resources, that indicates resource locations associated with the downlink periodic resources includes determining, for a wireless node of the one or more wireless nodes, grant information that indicates a resource location for a downlink periodic resource that is associated with a DU of the wireless node and that is to be used by the wireless node to transmit periodic downlink communications.

Although FIG. 19 shows example blocks of process 1900, in some aspects, process 1900 may include additional blocks, fewer blocks, different blocks, or differently arranged blocks than those depicted in FIG. 19. Additionally or alternatively, two or more of the blocks of process 1900 may be performed in parallel.

Figure 20:
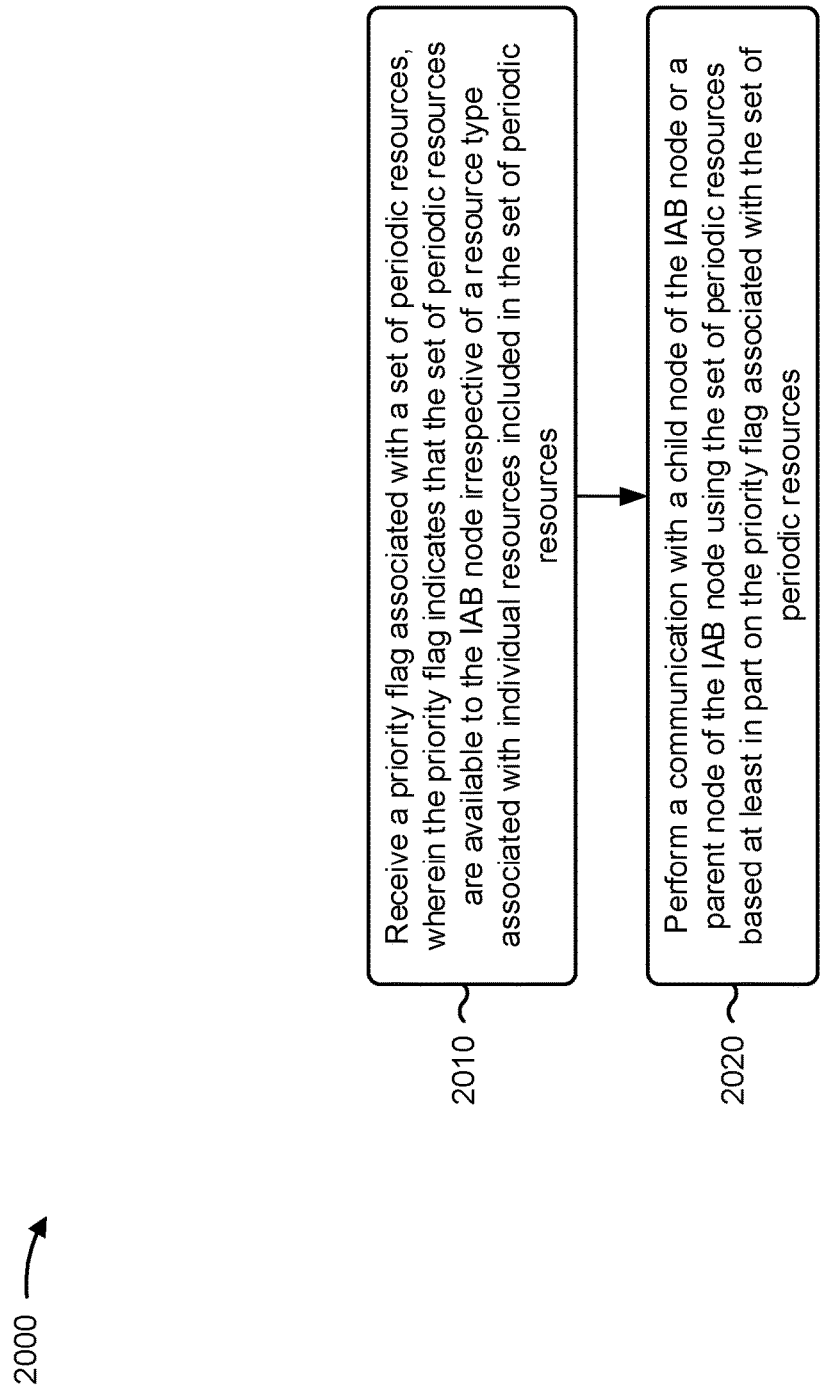
FIG. 20 is a flowchart illustrating example processes performed, for example, by a wireless node, in accordance with the present disclosure.

FIG. 20 is a flowchart illustrating an example process 2000 performed, for example, by a wireless node, in accordance with the present disclosure. Example process 2000 is an example where the wireless node (for example, an IAB node 410, a child node 810, or a UE 120) performs operations associated with priority flag signaling for periodic resources.

As shown in FIG. 20, in some aspects, process 2000 may include receiving a priority flag associated with a set of periodic resources, wherein the priority flag indicates that the set of periodic resources are available to the IAB node irrespective of a resource type associated with individual resources included in the set of periodic resources (block 2010). For example, the IAB node (such as by using reception component 2802 depicted in FIG. 28 antenna 234, demodulator 232, MIMO detector 236, receive processor 238, controller/processor 240, memory 242; r using antenna 252, demodulator 254, MIMO detector 256, receive processor 258, controller/processor 280, or memory 282) may receive a priority flag associated with a set of periodic resources, wherein the priority flag indicates that the set of periodic resources are available to the IAB node irrespective of a resource type associated with individual resources included in the set of periodic resources, as described above.

As further shown in FIG. 20, in some aspects, process 2000 may include performing a communication with a child node of the IAB node or a parent node of the IAB node using the set of periodic resources based at least in part on the priority flag associated with the set of periodic resources (block 2020). For example, the IAB node (such as by using reception component 2802 or transmission component 2806 depicted in FIG. 28, transmit processor 220, TX MIMO processor 230, modulator 232, antenna 234, demodulator 232, MIMO detector 236, receive processor 238, controller/processor 240, memory 242, scheduler 246; using antenna 252, demodulator 254, MIMO detector 256, receive processor 258, transmit processor 264, TX MIMO processor 266, modulator 254, controller/processor 280, or memory 282) may perform a communication with a child node of the IAB node or a parent node of the IAB node using the set of periodic resources based at least in part on the priority flag associated with the set of periodic resources, as described above.

Process 2000 may include additional aspects, such as any single aspect or any combination of aspects described below or in connection with one or more other processes described elsewhere herein.

In a first additional aspect, receiving the priority flag comprises receiving the priority flag via a radio resource control message from a central unit of an IAB donor associated with the IAB node.

In a second additional aspect, alone or in combination with the first aspect, receiving the priority flag comprises receiving the priority flag via an F1 application protocol message from a central unit of an IAB donor associated with the IAB node.

In a third additional aspect, alone or in combination with one or more of the first and second aspects, receiving the priority flag comprises receiving the priority flag via a medium access control-control element from a distributed unit of the parent node of the IAB node.

In a fourth additional aspect, alone or in combination with one or more of the first through third aspects, receiving the priority flag comprises receiving the priority flag via an activation downlink control information from a distributed unit of the parent node of the IAB node.

In a fifth additional aspect, alone or in combination with one or more of the first through fourth aspects, the set of periodic resources include downlink resources allocated via downlink semi-persistent scheduling.

In a sixth additional aspect, alone or in combination with one or more of the first through fifth aspects, the set of periodic resources include uplink resources allocated via an uplink configured grant.

In a seventh additional aspect, alone or in combination with one or more of the first through sixth aspects, the set of periodic resources are available to a mobile termination or a distributed unit of the IAB node.

In an eighth additional aspect, alone or in combination with one or more of the first through seventh aspects, the resource type associated with the individual resources is a configured distributed unit resource type.

In a ninth additional aspect, alone or in combination with one or more of the first through eighth aspects, the resource type associated with the individual resources is an NA resource type, a hard resource type, or a soft resource type.

In a tenth additional aspect, alone or in combination with one or more of the first through ninth aspects, the communication is associated with periodic low-latency traffic.

In an eleventh additional aspect, alone or in combination with one or more of the first through tenth aspects, performing the communication comprises performing, at a radio link control channel associated with the IAB node, the communication using the set of periodic resources.

In a twelfth additional aspect, alone or in combination with one or more of the first through eleventh aspects, process 2000 includes transmitting, to the parent node, information associated with the set of periodic resources that is available to the IAB node irrespective of the resource type, to enable an adjustment to a resource allocation at the parent node.

Although FIG. 20 shows example blocks of process 2000, in some aspects, process 2000 may include additional blocks, fewer blocks, different blocks, or differently arranged blocks than those depicted in FIG. 20. Additionally or alternatively, two or more of the blocks of process 2000 may be performed in parallel.

Figure 21:
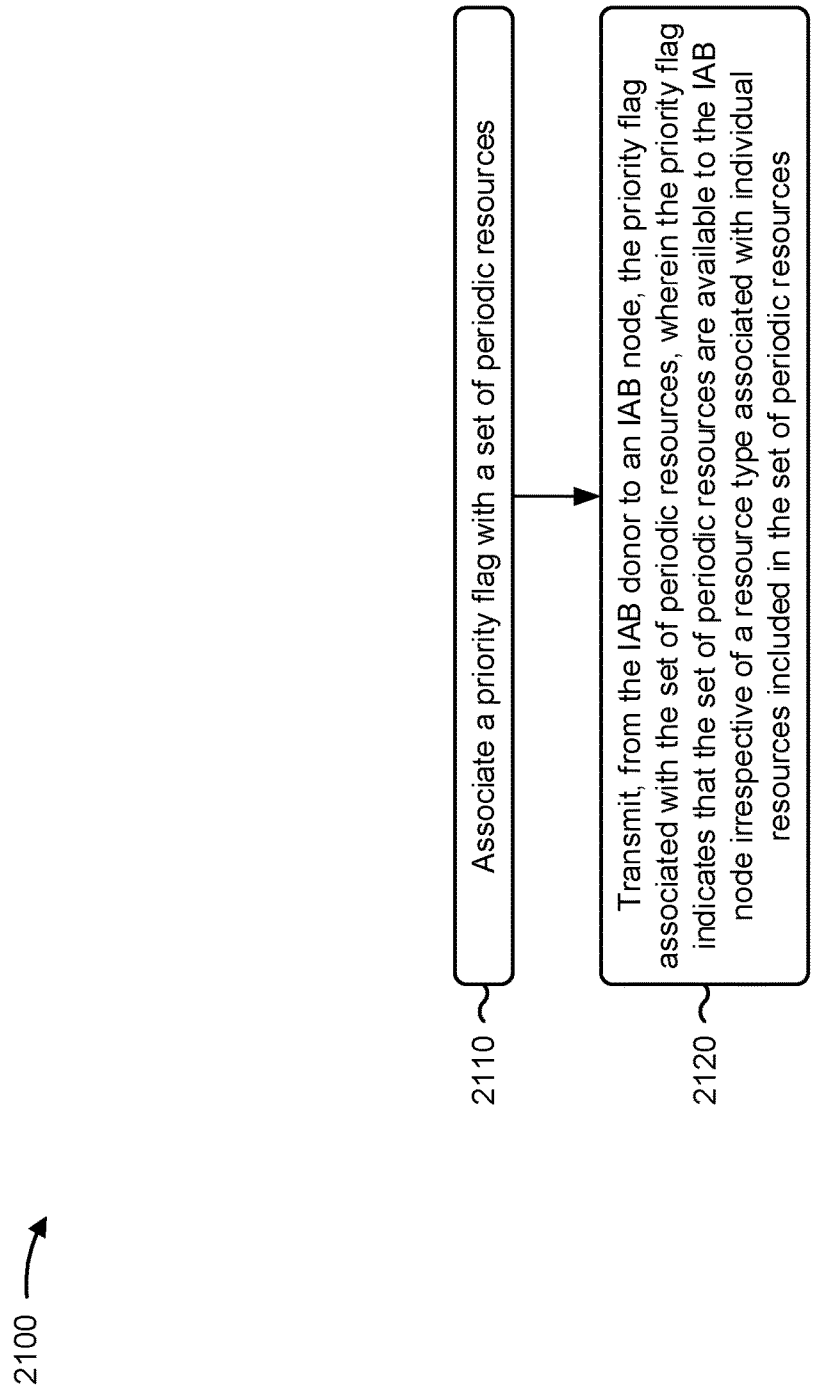
FIG. 21 is a flowchart illustrating example processes performed, for example, by a control node, in accordance with the present disclosure.

FIG. 21 is a flowchart illustrating an example process 2100 performed, for example, by a control node in accordance with the present disclosure. Example process 2100 is an example where the control node (for example, an IAB donor) performs operations associated with priority flag signaling for periodic resources.

As shown in FIG. 21, in some aspects, process 2100 may include associating a priority flag with a set of periodic resources (block 2110). For example, the IAB donor (such as by using association component 2810 depicted in FIG. 28, using antenna 234, demodulator 232, MIMO detector 236, receive processor 238, controller/processor 240, or memory 242; or using antenna 252, demodulator 254, MIMO detector 256, receive processor 258, controller/processor 280, or memory 282) may associate a priority flag with a set of periodic resources, as described above.

As further shown in FIG. 21, in some aspects, process 2100 may include transmitting, from the IAB donor to an IAB node, the priority flag associated with the set of periodic resources, wherein the priority flag indicates that the set of periodic resources are available to the IAB node irrespective of a resource type associated with individual resources included in the set of periodic resources (block 2120). For example, the IAB donor (such as by using transmission component 2806 depicted in FIG. 28, using transmit processor 220, TX MIMO processor 230, modulator 232, antenna 234, controller/processor 240, memory 242, or scheduler 246; or using antenna 252, transmit processor 264, TX MIMO processor 266, modulator 254, controller/processor 280, or memory 282) may transmit, from the IAB donor to an IAB node, the priority flag associated with the set of periodic resources, wherein the priority flag indicates that the set of periodic resources are available to the IAB node irrespective of a resource type associated with individual resources included in the set of periodic resources, as described above.

Process 2100 may include additional aspects, such as any single aspect or any combination of aspects described below or in connection with one or more other processes described elsewhere herein.

In a first additional aspect, transmitting the priority flag comprises transmitting the priority flag via a radio resource control message from a central unit of the IAB donor.

In a second additional aspect, alone or in combination with the first aspect, transmitting the priority flag comprises transmitting the priority flag via an F1 application protocol message from a central unit of the IAB donor.

In a third additional aspect, alone or in combination with one or more of the first and second aspects, the set of periodic resources include downlink resources allocated via downlink semi-persistent scheduling.

In a fourth additional aspect, alone or in combination with one or more of the first through third aspects, the set of periodic resources include uplink resources allocated via an uplink configured grant.

In a fifth additional aspect, alone or in combination with one or more of the first through fourth aspects, the set of periodic resources are available to a mobile termination or a distributed unit of the IAB node.

In a sixth additional aspect, alone or in combination with one or more of the first through fifth aspects, the resource type associated with the individual resources is a configured distributed unit resource type.

In a seventh additional aspect, alone or in combination with one or more of the first through sixth aspects, the resource type associated with the individual resources is an NA resource type, a hard resource type, or a soft resource type.

In an eighth additional aspect, alone or in combination with one or more of the first through seventh aspects, process 2100 includes transmitting, to a parent node of the IAB node, information associated with the set of periodic resources allocated to the IAB node with the priority flag.

Although FIG. 21 shows example blocks of process 2100, in some aspects, process 2100 may include additional blocks, fewer blocks, different blocks, or differently arranged blocks than those depicted in FIG. 21. Additionally or alternatively, two or more of the blocks of process 2100 may be performed in parallel.

Figure 22:
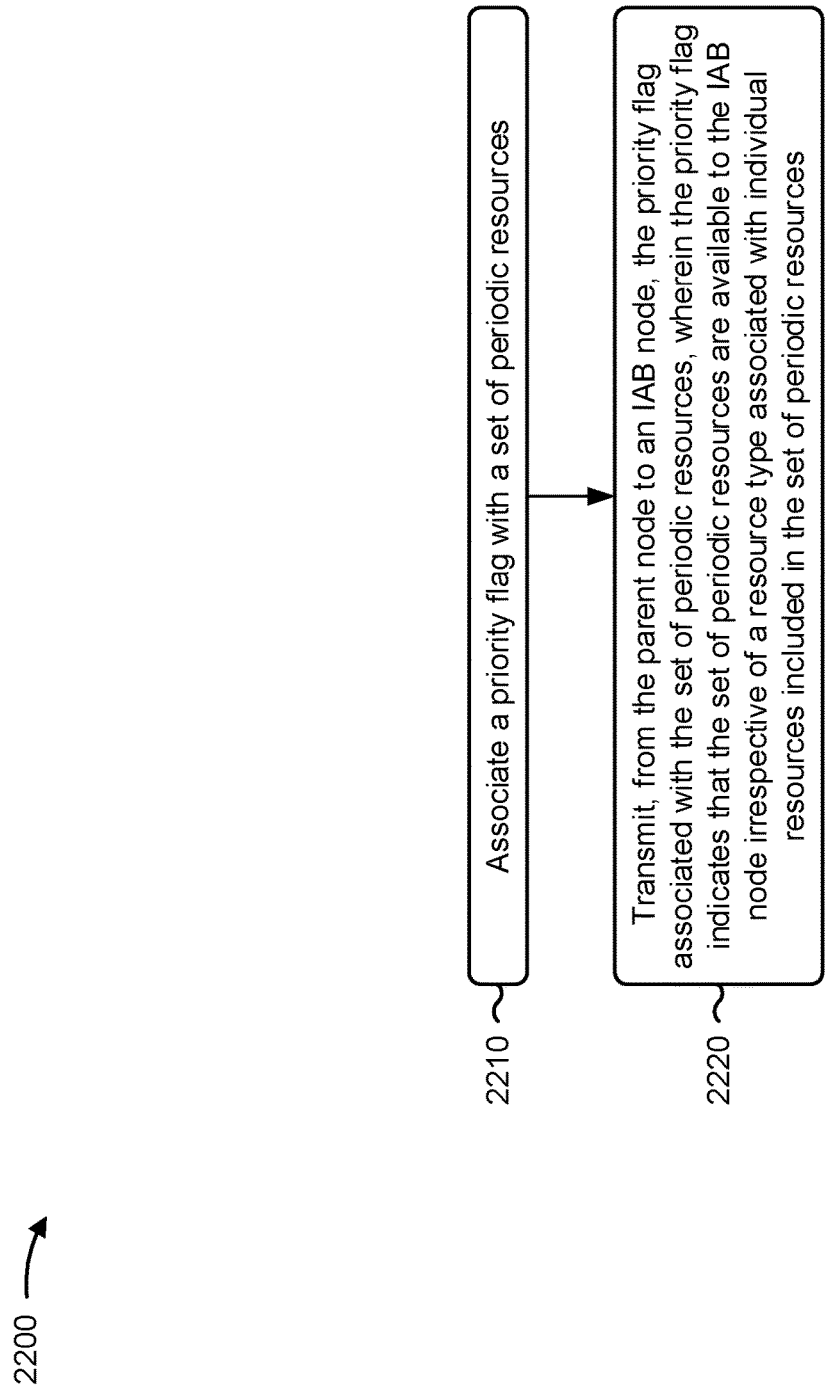
FIG. 22 is a flowchart illustrating example processes performed, for example, by a parent node, in accordance with the present disclosure.

FIG. 22 is a flowchart illustrating an example process 2200 performed, for example, by a parent node in accordance with the present disclosure. Example process 2200 is an example where the control node (for example, an IAB node) performs operations associated with priority flag signaling for periodic resources.

As shown in FIG. 22, in some aspects, process 2200 may include associating a priority flag with a set of periodic resources (block 2210). For example, the parent node (such as by using association component 2810 depicted in FIG. 28, using antenna 234, demodulator 232, MIMO detector 236, receive processor 238, controller/processor 240, or memory 242; or using antenna 252, demodulator 254, MIMO detector 256, receive processor 258, controller/processor 280, or memory 282) may associate a priority flag with a set of periodic resources, as described above.

As further shown in FIG. 22, in some aspects, process 2200 may include transmitting, from the parent node to an IAB node, the priority flag associated with the set of periodic resources, wherein the priority flag indicates that the set of periodic resources are available to the IAB node irrespective of a resource type associated with individual resources included in the set of periodic resources (block 2220). For example, the parent node (such as by using transmission component 2806 depicted in FIG. 28, using transmit processor 220, TX MIMO processor 230, modulator 232, antenna 234, controller/processor 240, memory 242, or scheduler 246; or using antenna 252, transmit processor 264, TX MIMO processor 266, modulator 254, controller/processor 280, or memory 282) may transmit, from the parent node to an IAB node, the priority flag associated with the set of periodic resources, wherein the priority flag indicates that the set of periodic resources are available to the IAB node irrespective of a resource type associated with individual resources included in the set of periodic resources, as described above.

Process 2200 may include additional aspects, such as any single aspect or any combination of aspects described below or in connection with one or more other processes described elsewhere herein.

In a first additional aspect, transmitting the priority flag comprises transmitting the priority flag via a medium access control-control element from a distributed unit of the parent node.

In a second additional aspect, alone or in combination with the first aspect, transmitting the priority flag comprises transmitting the priority flag via an activation downlink control information from a distributed unit of the parent node.

In a third additional aspect, alone or in combination with one or more of the first and second aspects, process 2200 includes receiving, from the IAB node, information associated with the set of periodic resources that is available to the IAB node irrespective of the resource type, and adjusting a resource allocation based at least in part on the information received from the IAB node.

In a fourth additional aspect, alone or in combination with one or more of the first through third aspects, receiving the information comprises receiving, from the IAB node, the information via a medium access control-control element.

In a fifth additional aspect, alone or in combination with one or more of the first through fourth aspects, receiving the information comprises receiving, from a central unit of an IAB donor, the information via an F1 application protocol message or a radio resource control message.

Although FIG. 22 shows example blocks of process 2200, in some aspects, process 2200 may include additional blocks, fewer blocks, different blocks, or differently arranged blocks than those depicted in FIG. 22. Additionally or alternatively, two or more of the blocks of process 2200 may be performed in parallel.

Figure 23:
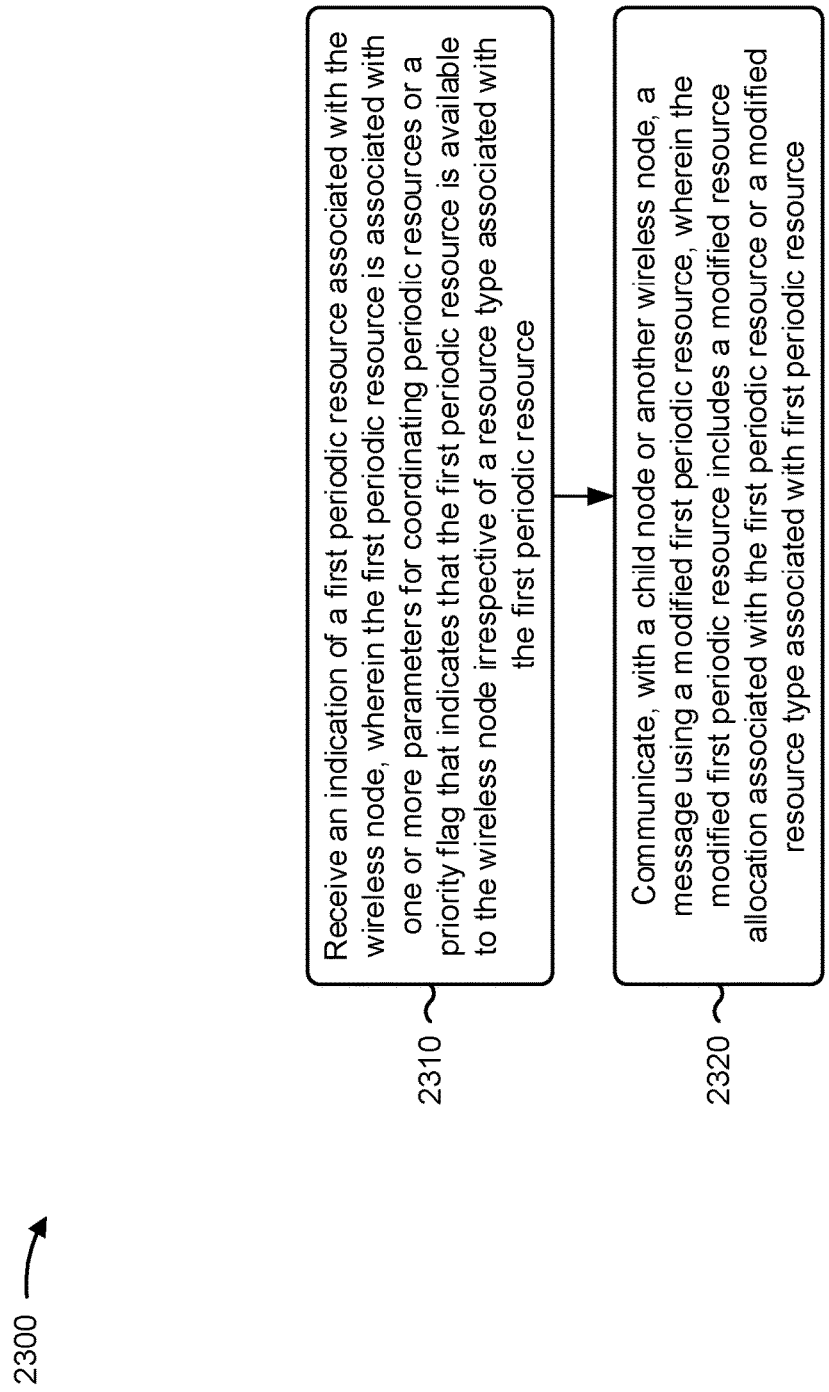
FIG. 23 is a flowchart illustrating example processes performed, for example, by a wireless node, in accordance with the present disclosure.

FIG. 23 is a flowchart illustrating an example process 2300 performed, for example, by a wireless node, in accordance with the present disclosure. Example process 2300 is an example where the wireless node (for example, an IAB node 410, a child node 810, or a UE 120) performs operations associated with enhancements for periodic resources in an IAB network.

As shown in FIG. 23, in some aspects, process 2300 may include receiving an indication of a first periodic resource associated with the wireless node, wherein the first periodic resource is associated with one or more parameters for coordinating periodic resources or a priority flag that indicates that the first periodic resource is available to the wireless node irrespective of a resource type associated with the first periodic resource (block 2310). For example, the wireless node (such as by using communication manager 2904 or reception component 2902, depicted in FIG. 29) may receive an indication of a first periodic resource associated with the wireless node, wherein the first periodic resource is associated with one or more parameters for coordinating periodic resources or a priority flag that indicates that the first periodic resource is available to the wireless node irrespective of a resource type associated with the first periodic resource, as described above.

As further shown in FIG. 23, in some aspects, process 2300 may include communicating, with a child node or another wireless node, a message using a modified first periodic resource, wherein the modified first periodic resource includes a modified resource allocation associated with the first periodic resource or a modified resource type associated with first periodic resource (block 2320). For example, the wireless node (such as by using communication manager 2904, reception component 2902, or transmission component 2906, depicted in FIG. 29) may communicate, with a child node or another wireless node, a message using a modified first periodic resource, wherein the modified first periodic resource includes a modified resource allocation associated with the first periodic resource or a modified resource type associated with first periodic resource, as described above.

Process 2300 may include additional aspects, such as any single aspect or any combination of aspects described below or in connection with one or more other processes described elsewhere herein.

In a first additional aspect, process 2300 includes transmitting, to the child node, an activation message associated with the first periodic resource that indicates the modified resource allocation associated with the first periodic resource.

In a second additional aspect, alone or in combination with the first aspect, the first periodic resource is associated with a DU of the wireless node, and wherein the one or more parameters for coordinating periodic resources are associated with coordinating the first periodic resource with a second periodic resource that is associated with an MT component of the wireless node and that corresponds to the first periodic resource, and wherein communicating using the modified first periodic resource is based at least in part on the first periodic resource not satisfying at least one parameter of the one or more parameters.

In a third additional aspect, alone or in combination with one or more of the first and second aspects, the one or more parameters include at least one of a time gap between periodic resources that are associated with an MT component of the wireless node and periodic resources that are associated with a DU of the wireless node, or a range of time gaps between periodic resources that are associated with the MT component and periodic resources that are associated with the DU.

In a fourth additional aspect, alone or in combination with one or more of the first through third aspects, process 2300 includes receiving, from a control node or a parent node, an indication of the one or more parameters, or determining the one or more parameters.

In a fifth additional aspect, alone or in combination with one or more of the first through fourth aspects, the one or more parameters are based at least in part on at least one of a processing capability of the wireless node, a latency requirement associated with the wireless node, or a PDB of an RLC channel associated with the first periodic resource or a second periodic resource.

In a sixth additional aspect, alone or in combination with one or more of the first through fifth aspects, process 2300 includes transmitting, to a control node or a parent node, an indication of information to be used to determine the one or more parameters, and receiving, from the control node or the parent node, an indication of the one or more parameters based at least in part on transmitting the indication of information to be used to determine the one or more parameters.

In a seventh additional aspect, alone or in combination with one or more of the first through sixth aspects, process 2300 includes receiving, from a control node or a parent node, the priority flag via at least one of a radio resource control message, an F1 application protocol message, a MAC-CE, or an activation downlink control information.

In an eighth additional aspect, alone or in combination with one or more of the first through seventh aspects, the first periodic resource includes one or more downlink resources allocated via downlink semi-persistent scheduling or one or more uplink resources allocated via an uplink configured grant.

In a ninth additional aspect, alone or in combination with one or more of the first through eighth aspects, the resource type includes a configured distributed unit resource type, an NA resource type, a hard resource type, or a soft resource type.

In a tenth additional aspect, alone or in combination with one or more of the first through ninth aspects, process 2300 includes transmitting, to a control node or a parent node, information associated with the first periodic resource that is available to the wireless node irrespective of the resource type to enable an adjustment to the resource allocation at the control node or the parent node.

In an eleventh additional aspect, alone or in combination with one or more of the first through tenth aspects, receiving the indication of the first periodic resource comprises receiving, from a control node, a configuration indicating grant information, for the first periodic resource, that indicates resource locations associated with the first periodic resource.

In a twelfth additional aspect, alone or in combination with one or more of the first through eleventh aspects, receiving the configuration indicating grant information, for the first periodic resource, that indicates resource locations associated with the first periodic resource comprises receiving the configuration indicating full grant information.

In a thirteenth additional aspect, alone or in combination with one or more of the first through twelfth aspects, the full grant information at least indicates the resource locations associated with the first periodic resource, an MCS associated with the first periodic resource, a frequency domain RB allocation associated with the first periodic resource, and an antenna port of the wireless node associated with the first periodic resource.

In a fourteenth additional aspect, alone or in combination with one or more of the first through thirteenth aspects, receiving the configuration indicating grant information, for the first periodic resource, that indicates resource locations associated with the first periodic resource comprises receiving the configuration indicating partial grant information that at least indicates the resource locations associated with the first periodic resource.

Although FIG. 23 shows example blocks of process 2300, in some aspects, process 2300 may include additional blocks, fewer blocks, different blocks, or differently arranged blocks than those depicted in FIG. 23. Additionally or alternatively, two or more of the blocks of process 2300 may be performed in parallel.

Figure 24:
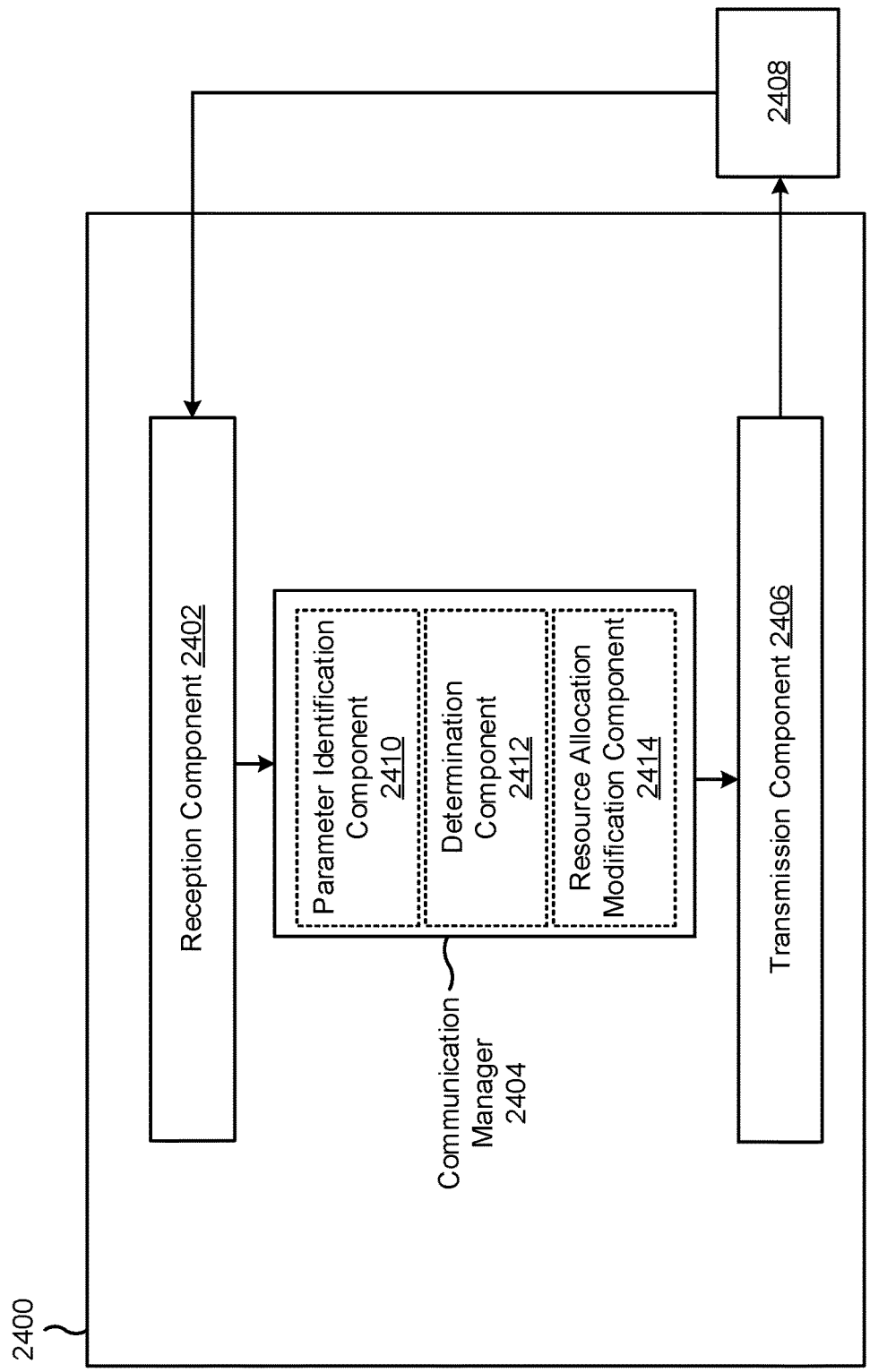
FIGS. 24-29 are block diagrams of example apparatuses for wireless communication in accordance with the present disclosure.

FIG. 24 is a block diagram of an example apparatus 2400 for wireless communication in accordance with the present disclosure. The apparatus 2400 may be a wireless node, or a wireless node may include the apparatus 2400. In some aspects, the apparatus 2400 includes a reception component 2402, a communication manager 2404, and a transmission component 2406, which may be in communication with one another (for example, via one or more buses). As shown, the apparatus 2400 may communicate with another apparatus 2408 (such as a UE, a base station, an IAB node, an IAB donor, or another wireless communication device) using the reception component 2402 and the transmission component 2406.

In some aspects, the apparatus 2400 may be configured to perform one or more operations described herein in connection with FIGS. 9-15. Additionally or alternatively, the apparatus 2400 may be configured to perform one or more processes described herein, such as process 1600 of FIG. 16, or a combination thereof. In some aspects, the apparatus 2400 may include one or more components of the wireless node described above in connection with FIG. 2.

The reception component 2402 may receive communications, such as reference signals, control information, data communications, or a combination thereof, from the apparatus 2408. The reception component 2402 may provide received communications to one or more other components of the apparatus 2400, such as the communication manager 2404. In some aspects, the reception component 2402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 2402 may include one or more antennas, a demodulator, a MIMO detector, a receive processor, a controller/processor, a memory, or a combination thereof, of the wireless node described above in connection with FIG. 2.

The transmission component 2406 may transmit communications, such as reference signals, control information, data communications, or a combination thereof, to the apparatus 2408. In some aspects, the communication manager 2404 may generate communications and may transmit the generated communications to the transmission component 2406 for transmission to the apparatus 2408. In some aspects, the transmission component 2406 may perform signal processing on the generated communications (such as filtering, amplification, modulation, digital-to-analog conversion, multiplexing, interleaving, mapping, or encoding, among other examples), and may transmit the processed signals to the apparatus 2408. In some aspects, the transmission component 2406 may include one or more antennas, a modulator, a transmit MIMO processor, a transmit processor, a controller/processor, a memory, or a combination thereof, of the wireless node described above in connection with FIG. 2. In some aspects, the transmission component 2406 may be co-located with the reception component 2402 in a transceiver.

The communication manager 2404 may receive, or may cause the reception component 2402 to receive, an activation message for activating a first periodic resource that is associated with an MT component of the wireless node. The communication manager 2404 may identify one or more parameters for coordinating periodic resources, including the first periodic resource, that are associated with the MT component of the wireless node with periodic resources, including a second periodic resource, that are associated with a DU of the wireless node. The communication manager 2404 may determine whether the second periodic resource satisfies the one or more parameters. The communication manager 2404 may modify a resource allocation associated with the second periodic resource based at least in part on a determination that the second periodic resource does not satisfy at least one parameter of the one or more parameters. In some aspects, the communication manager 2404 may include a controller/processor, a memory, a scheduler, a communication unit, or a combination thereof, of the wireless node described above in connection with FIG. 2.

In some aspects, the communication manager 2404 may include a set of components, such as a parameter identification component 2410, a determination component 2412, a resource allocation modification component 2414, or a combination thereof. Alternatively, the set of components may be separate and distinct from the communication manager 2404. In some aspects, one or more components of the set of components may include or may be implemented within a controller/processor, a memory, a scheduler, a communication unit, or a combination thereof, of the wireless node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The parameter identification component 2410 may identify one or more parameters for coordinating periodic resources, including the first periodic resource, that are associated with the MT component of the wireless node with periodic resources, including a second periodic resource, that are associated with a DU of the wireless node. In some aspects, the parameter identification component 2410 may cause the reception component 2402 to receive, from a control node, an indication of the one or more parameters. In some aspects, the parameter identification component 2410 may cause the reception component 2402 to receive, from a parent node, an indication of the one or more parameters. In some aspects, the parameter identification component 2410 may cause the determination component 2412 to determine the one or more parameters.

The determination component 2412 may determine whether the second periodic resource satisfies the one or more parameters. The resource allocation modification component 2414 may modify a resource allocation associated with the second periodic resource based at least in part on a determination that the second periodic resource does not satisfy at least one parameter of the one or more parameters.

The transmission component 2406 may transmit, to a child node, an activation message associated with the second periodic resource that indicates the modified resource allocation associated with the second periodic resource. The transmission component 2406 may transmit, to a parent node associated with the wireless node, an indication of the one or more parameters. The transmission component 2406 may transmit, to a control node or a parent node, an indication of information to be used to determine the one or more parameters.

The reception component 2402 may receive, from the control node or the parent node, an indication of the one or more parameters that are based at least in part on the information to be used to determine the one or more parameters. The reception component 2402 may receive an indication of a scheduling gap indicating an amount of time between the activation message and the first periodic resource.

The reception component 2402 may receive, by the MT component from a parent node using the first periodic resource, a first communication. The transmission component 2406 may transmit, by the DU to a child node using the second periodic resource, a second communication that is associated with the first communication.

The reception component 2402 may receive, by the DU from a child node using the second periodic resource, a first communication. The transmission component 2406 may transmit, by the MT component to a parent node using the first periodic resource, a second communication that is associated with the first communication.

The quantity and arrangement of components shown in FIG. 24 are provided as an example. In practice, there may be additional components, fewer components, different components, or differently arranged components than those shown in FIG. 24. Furthermore, two or more components shown in FIG. 24 may be implemented within a single component, or a single component shown in FIG. 24 may be implemented as multiple, distributed components. Additionally or alternatively, a set of (one or more) components shown in FIG. 24 may perform one or more functions described as being performed by another set of components shown in FIG. 24.

Figure 25:
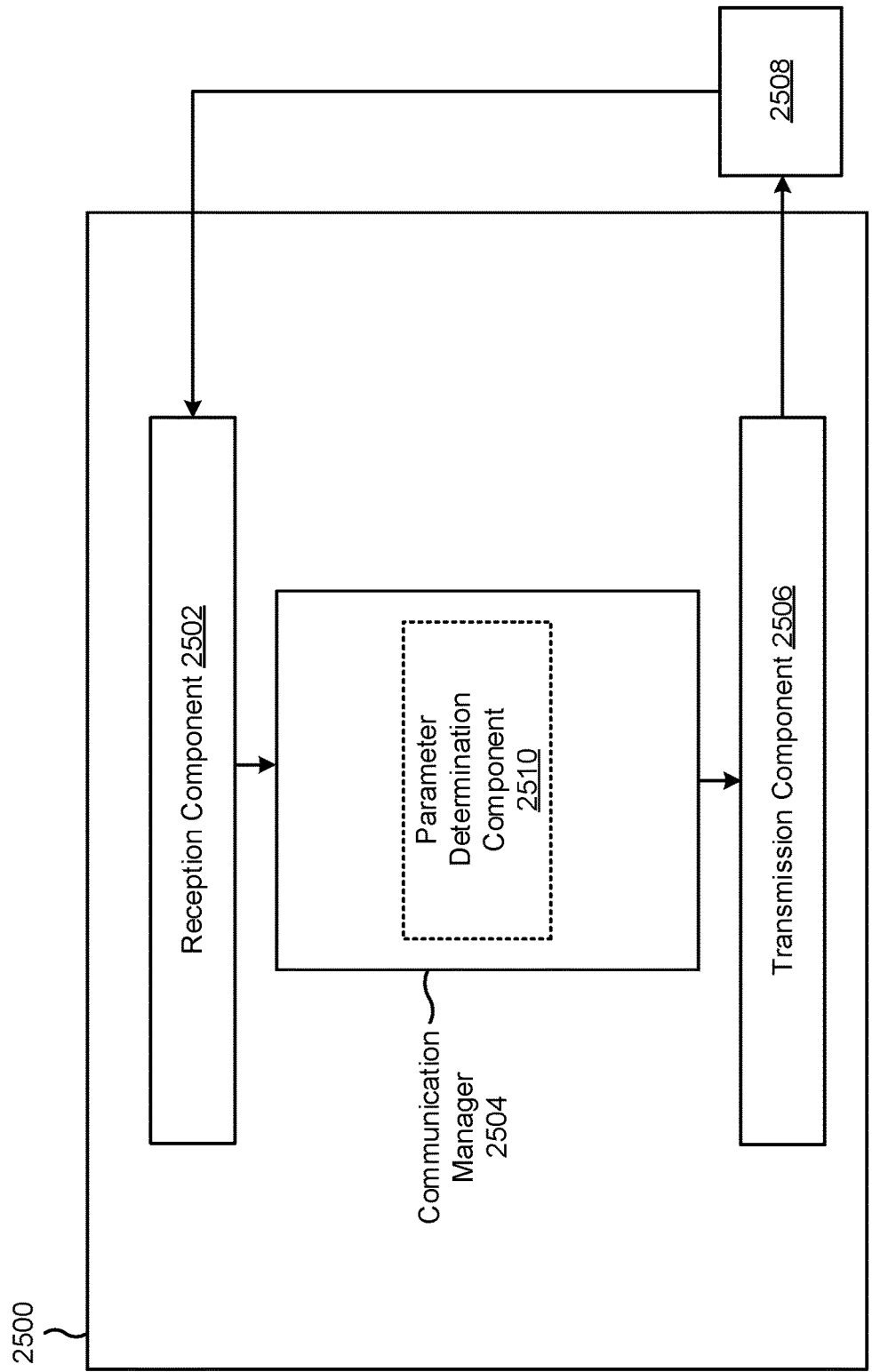

FIG. 25 is a block diagram of an example apparatus 2500 for wireless communication in accordance with the present disclosure. The apparatus 2500 may be a wireless node, or a wireless node may include the apparatus 2500. In some aspects, the apparatus 2500 includes a reception component 2502, a communication manager 2504, and a transmission component 2506, which may be in communication with one another (for example, via one or more buses). As shown, the apparatus 2500 may communicate with another apparatus 2508 (such as a UE, a base station, an IAB node, an IAB donor, or another wireless communication device) using the reception component 2502 and the transmission component 2506.

In some aspects, the apparatus 2500 may be configured to perform one or more operations described herein in connection with FIGS. 9-15. Additionally or alternatively, the apparatus 2500 may be configured to perform one or more processes described herein, such as process 1700 of FIG. 17, or a combination thereof. In some aspects, the apparatus 2500 may include one or more components of the wireless node described above in connection with FIG. 2.

The reception component 2502 may receive communications, such as reference signals, control information, data communications, or a combination thereof, from the apparatus 2508. The reception component 2502 may provide received communications to one or more other components of the apparatus 2500, such as the communication manager 2504. In some aspects, the reception component 2502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 2502 may include one or more antennas, a demodulator, a MIMO detector, a receive processor, a controller/processor, a memory, or a combination thereof, of the wireless node described above in connection with FIG. 2.

The transmission component 2506 may transmit communications, such as reference signals, control information, data communications, or a combination thereof, to the apparatus 2508. In some aspects, the communication manager 2504 may generate communications and may transmit the generated communications to the transmission component 2506 for transmission to the apparatus 2508. In some aspects, the transmission component 2506 may perform signal processing on the generated communications (such as filtering, amplification, modulation, digital-to-analog conversion, multiplexing, interleaving, mapping, or encoding, among other examples), and may transmit the processed signals to the apparatus 2508. In some aspects, the transmission component 2506 may include one or more antennas, a modulator, a transmit MIMO processor, a transmit processor, a controller/processor, a memory, or a combination thereof, of the wireless node described above in connection with FIG. 2. In some aspects, the transmission component 2506 may be co-located with the reception component 2502 in a transceiver.

The communication manager 2504 may determine one or more parameters for coordinating periodic resources that are associated with an MT component of a different wireless node with periodic resources that are associated with a DU of the different wireless node. The communication manager 2504 may transmit, or may cause the transmission component 2506 to transmit, to the different wireless node, an indication of the one or more parameters. In some aspects, the communication manager 2504 may include a controller/processor, a memory, a scheduler, a communication unit, or a combination thereof, of the wireless node described above in connection with FIG. 2.

In some aspects, the communication manager 2504 may include a set of components, such as a parameter determination component 2510, among other examples. Alternatively, the set of components may be separate and distinct from the communication manager 2504. In some aspects, one or more components of the set of components may include or may be implemented within a controller/processor, a memory, a scheduler, a communication unit, or a combination thereof, of the wireless node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The parameter determination component 2510 may determine one or more parameters for coordinating periodic resources that are associated with an MT component of a different wireless node with periodic resources that are associated with a DU of the different wireless node. In some aspects, the parameter determination component 2510 may determine a time gap between periodic resources that are associated with the MT component of the different wireless node and periodic resources that are associated with the DU of the different wireless node. In some aspects, the parameter determination component 2510 may determine a range of time gaps between periodic resources that are associated with the MT component of the different wireless node and periodic resources that are associated with the DU of the different wireless node.

The parameter determination component 2510 may determine the one or more parameters based at least in part on information that includes at least one of a processing capability of the different wireless node, a latency requirement associated with the different wireless node, or a PDB of an RLC channel associated with the periodic resources that are associated with the MT component of the different wireless node or the periodic resources that are associated with the DU of the different wireless node. The reception component 2502 may receive, from the different wireless node, an indication of the processing capability of the different wireless node, or the latency requirement associated with the different wireless node.

The transmission component 2506 may transmit the indication of the one or more parameters via a DCI message or a MAC-CE message. The parameter determination component 2510 may determine a scheduling gap indicating an amount of time between an activation message for activating a periodic resource associated with the MT component of the different wireless node and the periodic resource. The transmission component 2506 may transmit, to the different wireless node, an indication of the scheduling gap.

The transmission component 2506 may transmit, to the different wireless node during the periodic resource, a communication, where the communication is to be forwarded by the different wireless node to a child node associated with the different wireless node. The reception component 2502 may receive, from the different wireless node during the periodic resource, a communication, where the communication is associated with a communication to be forwarded by the different wireless node from a child node associated with the different wireless node to the wireless node.

The transmission component 2506 may transmit, to a parent node associated with the different wireless node, the indication of the one or more parameters.

The quantity and arrangement of components shown in FIG. 25 are provided as an example. In practice, there may be additional components, fewer components, different components, or differently arranged components than those shown in FIG. 25. Furthermore, two or more components shown in FIG. 25 may be implemented within a single component, or a single component shown in FIG. 25 may be implemented as multiple, distributed components. Additionally or alternatively, a set of (one or more) components shown in FIG. 25 may perform one or more functions described as being performed by another set of components shown in FIG. 25.

Figure 26:
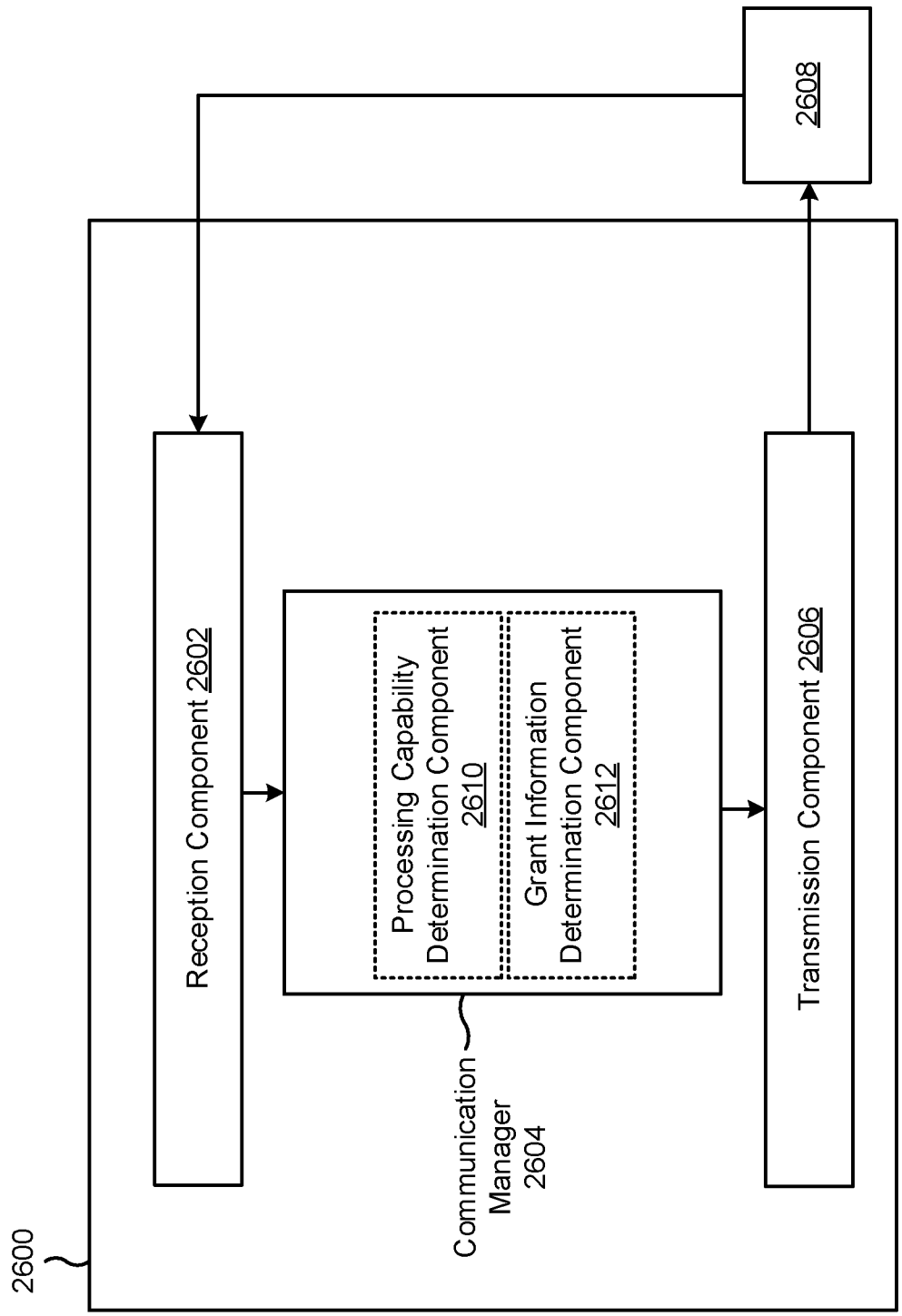

FIG. 26 is a block diagram of an example apparatus 2600 for wireless communication in accordance with the present disclosure. The apparatus 2600 may be a wireless node (such as an IAB node), or a wireless node may include the apparatus 2600. In some aspects, the apparatus 2600 includes a reception component 2602, a communication manager 2604, and a transmission component 2606, which may be in communication with one another (for example, via one or more buses). As shown, the apparatus 2600 may communicate with another apparatus 2608 (such as a UE, a base station, or another wireless communication device) using the reception component 2602 and the transmission component 2606.

In some aspects, the apparatus 2600 may be configured to perform one or more operations described herein in connection with FIGS. 9-15. Additionally or alternatively, the apparatus 2600 may be configured to perform one or more processes described herein, such as process 1800 of FIG. 18, or a combination thereof. In some aspects, the apparatus 2600 may include one or more components of the wireless node described above in connection with FIG. 2.

The reception component 2602 may receive communications, such as reference signals, control information, data communications, or a combination thereof, from the apparatus 2608. The reception component 2602 may provide received communications to one or more other components of the apparatus 2600, such as the communication manager 2604. In some aspects, the reception component 2602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 2602 may include one or more antennas, a demodulator, a MIMO detector, a receive processor, a controller/processor, a memory, or a combination thereof, of the wireless node described above in connection with FIG. 2.

The transmission component 2606 may transmit communications, such as reference signals, control information, data communications, or a combination thereof, to the apparatus 2608. In some aspects, the communication manager 2604 may generate communications and may transmit the generated communications to the transmission component 2606 for transmission to the apparatus 2608. In some aspects, the transmission component 2606 may perform signal processing on the generated communications (such as filtering, amplification, modulation, digital-to-analog conversion, multiplexing, interleaving, mapping, or encoding, among other examples), and may transmit the processed signals to the apparatus 2608. In some aspects, the transmission component 2606 may include one or more antennas, a modulator, a transmit MIMO processor, a transmit processor, a controller/processor, a memory, or a combination thereof, of the wireless node described above in connection with FIG. 2. In some aspects, the transmission component 2606 may be co-located with the reception component 2602 in a transceiver.

The communication manager 2604 may receive, or may cause the reception component 2602 to receive, from a control node, a configuration indicating grant information, for downlink periodic resources, that indicates resource locations associated with the downlink periodic resources. In some aspects, the communication manager 2604 may communicate (for example, transmit or receive), or may cause the reception component 2602 to receive or may cause the transmission component 2606 to transmit, downlink traffic using the downlink periodic resources in accordance with the grant information. In some aspects, the communication manager 2604 may include a controller/processor, a memory, a scheduler, a communication unit, or a combination thereof, of the wireless node described above in connection with FIG. 2.

In some aspects, the communication manager 2604 may include a set of components, such as a processing capability determination component 2610, or a grant information determination component 2612, among other examples. Alternatively, the set of components may be separate and distinct from the communication manager 2604. In some aspects, one or more components of the set of components may include or may be implemented within a controller/processor, a memory, a scheduler, a communication unit, or a combination thereof, of the wireless node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The processing capability determination component 2610 may determine a processing capability of the wireless node associated with processing or forwarding communications to a next hop.

The reception component 2602 may receive the configuration indicating full grant information. The reception component 2602 may receive the downlink traffic using the downlink periodic resources without receiving or transmitting an activation message associated with the downlink periodic resources. The transmission component 2606 may transmit the downlink traffic using the downlink periodic resources without receiving or transmitting an activation message associated with the downlink periodic resources.

The reception component 2602 may receive the configuration indicating partial grant information that at least indicated the resource locations associated with the downlink periodic resources.

The reception component 2602 may receive an activation message indicating remaining grant information associated with downlink periodic resources. The transmission component 2606 may transmit an activation message indicating remaining grant information associated with the downlink periodic resources. The grant information determination component 2612 may determine the remaining grant information associated with the downlink periodic resources. The reception component 2602 may receive the downlink traffic using the downlink periodic resources in accordance with the partial grant information and the remaining grant information. The transmission component 2606 may transmit the downlink traffic using the downlink periodic resources in accordance with the partial grant information and the remaining grant information.

The reception component 2602 may receive, from a parent node associated with the IAB node, the downlink traffic using the downlink periodic resources. The transmission component 2606 may transmit, to a child node associated with the IAB node, the downlink traffic using the downlink periodic resources.

The reception component 2602 may receive an indication of a periodicity associated with the downlink periodic resources and offset values associated with the downlink periodic resources. The transmission component 2606 may transmit, to the control node, an indication of the processing capability associated with wireless node.

The quantity and arrangement of components shown in FIG. 26 are provided as an example. In practice, there may be additional components, fewer components, different components, or differently arranged components than those shown in FIG. 26. Furthermore, two or more components shown in FIG. 26 may be implemented within a single component, or a single component shown in FIG. 26 may be implemented as multiple, distributed components. Additionally or alternatively, a set of (one or more) components shown in FIG. 26 may perform one or more functions described as being performed by another set of components shown in FIG. 26.

Figure 27:
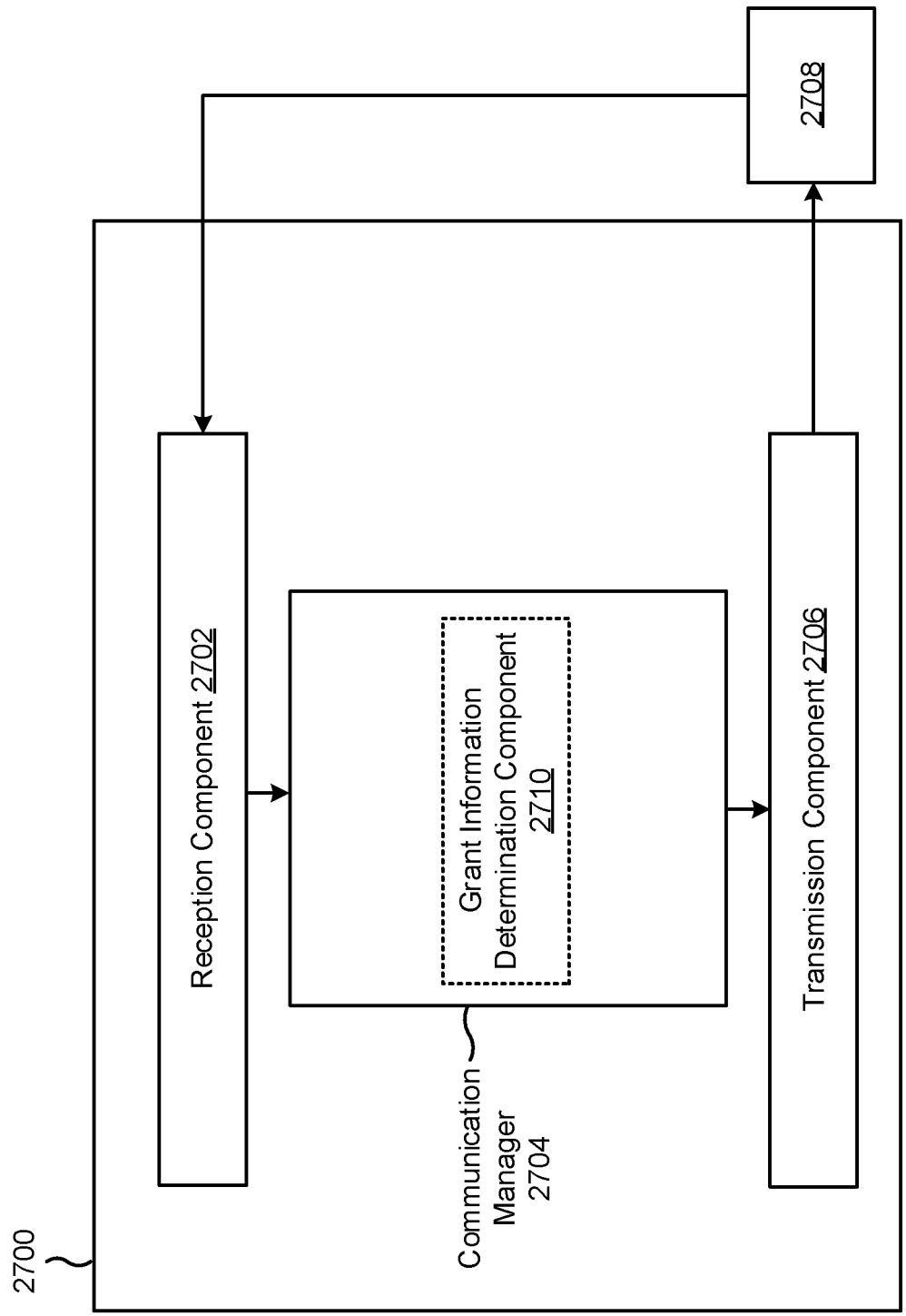

FIG. 27 is a block diagram of an example apparatus 2700 for wireless communication in accordance with the present disclosure. The apparatus 2700 may be a control node (such as an IAB donor or a CU of an IAB donor), or a control node may include the apparatus 2700. In some aspects, the apparatus 2700 includes a reception component 2702, a communication manager 2704, and a transmission component 2706, which may be in communication with one another (for example, via one or more buses). As shown, the apparatus 2700 may communicate with another apparatus 2708 (such as a UE, a base station, or another wireless communication device) using the reception component 2702 and the transmission component 2706.

In some aspects, the apparatus 2700 may be configured to perform one or more operations described herein in connection with FIGS. 9-15. Additionally or alternatively, the apparatus 2700 may be configured to perform one or more processes described herein, such as process 1900 of FIG. 19, or a combination thereof. In some aspects, the apparatus 2700 may include one or more components of the control node described above in connection with FIG. 2.

The reception component 2702 may receive communications, such as reference signals, control information, data communications, or a combination thereof, from the apparatus 2708. The reception component 2702 may provide received communications to one or more other components of the apparatus 2700, such as the communication manager 2704. In some aspects, the reception component 2702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 2702 may include one or more antennas, a demodulator, a MIMO detector, a receive processor, a controller/processor, a memory, or a combination thereof, of the control node described above in connection with FIG. 2.

The transmission component 2706 may transmit communications, such as reference signals, control information, data communications, or a combination thereof, to the apparatus 2708. In some aspects, the communication manager 2704 may generate communications and may transmit the generated communications to the transmission component 2706 for transmission to the apparatus 2708. In some aspects, the transmission component 2706 may perform signal processing on the generated communications (such as filtering, amplification, modulation, digital-to-analog conversion, multiplexing, interleaving, mapping, or encoding, among other examples), and may transmit the processed signals to the apparatus 2708. In some aspects, the transmission component 2706 may include one or more antennas, a modulator, a transmit MIMO processor, a transmit processor, a controller/processor, a memory, or a combination thereof, of the control node described above in connection with FIG. 2. In some aspects, the transmission component 2706 may be co-located with the reception component 2702 in a transceiver.

The communication manager 2704 may determine, for one or more wireless nodes included in a multi-hop network, grant information, for downlink periodic resources, that indicates resource locations associated with the downlink periodic resources. In some aspects, the communication manager 2704 may transmit, or may cause the transmission component 2706 to transmit, to the one or more wireless nodes, a configuration indicating the grant information. In some aspects, the communication manager 2704 may include a controller/processor, a memory, a scheduler, a communication unit, or a combination thereof, of the control node described above in connection with FIG. 2.

In some aspects, the communication manager 2704 may include a set of components, such as a grant information determination component 2710, among other examples. Alternatively, the set of components may be separate and distinct from the communication manager 2704. In some aspects, one or more components of the set of components may include or may be implemented within a controller/processor, a memory, a scheduler, a communication unit, or a combination thereof, of the control node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The grant information determination component 2710 may determine, for the one or more wireless nodes included in a multi-hop network, the grant information, for downlink periodic resources, that indicates resource locations associated with the downlink periodic resources.

The transmission component 2706 may transmit, to each wireless node of the one or more wireless nodes, full grant information that enables the wireless node to communicate periodic downlink communications, using the downlink periodic resources, without an activation message. The grant information determination component 2710 may determine, for each wireless node of the one or more wireless nodes, the full grant information.

The transmission component 2706 may transmit, to each wireless node of the one or more wireless nodes, partial grant information that at least indicates the resource locations associated with the downlink periodic resources. The grant information determination component 2710 may determine, for each wireless node of the one or more wireless nodes, the partial grant information. The grant information determination component 2710 may determine, for each wireless node of the one or more wireless nodes, grant information for downlink periodic resources to be used by the wireless node.

The grant information determination component 2710 may determine, for each wireless node of the one or more wireless nodes, the resource locations associated with the downlink periodic resources for the wireless node. The grant information determination component 2710 may determine a periodicity associated with the downlink periodic resources. The grant information determination component 2710 may determine offset values associated with the downlink periodic resources.

The transmission component 2706 may transmit, to a wireless node of the one or more wireless nodes, an indication of the periodicity associated with the downlink periodic resources and the offset values associated with the downlink periodic resources.

The grant information determination component 2710 may determine, for each wireless node of the one or more wireless nodes, the grant information based at least in part on at least one of a traffic pattern of the wireless node, a duplex communication mode capability of the wireless node, an IAB resource type pattern of the wireless node, an average link quality associated with the wireless node, a processing capability of the wireless node, or a latency requirement of the wireless node. The reception component 2702 may receive, from the wireless node of the one or more wireless nodes, an indication of the processing capability of the wireless node.

The grant information determination component 2710 may determine, for a wireless node of the one or more wireless nodes, grant information that indicates a resource location for a downlink periodic resource that is associated with an MT component of the wireless node and that is to be used by the wireless node to receive periodic downlink communications. The grant information determination component 2710 may determine, for a wireless node of the one or more wireless nodes, grant information that indicates a resource location for a downlink periodic resource that is associated with a DU of the wireless node and that is to be used by the wireless node to transmit periodic downlink communications.

The quantity and arrangement of components shown in FIG. 27 are provided as an example. In practice, there may be additional components, fewer components, different components, or differently arranged components than those shown in FIG. 27. Furthermore, two or more components shown in FIG. 27 may be implemented within a single component, or a single component shown in FIG. 27 may be implemented as multiple, distributed components. Additionally or alternatively, a set of (one or more) components shown in FIG. 27 may perform one or more functions described as being performed by another set of components shown in FIG. 27.

Figure 28:
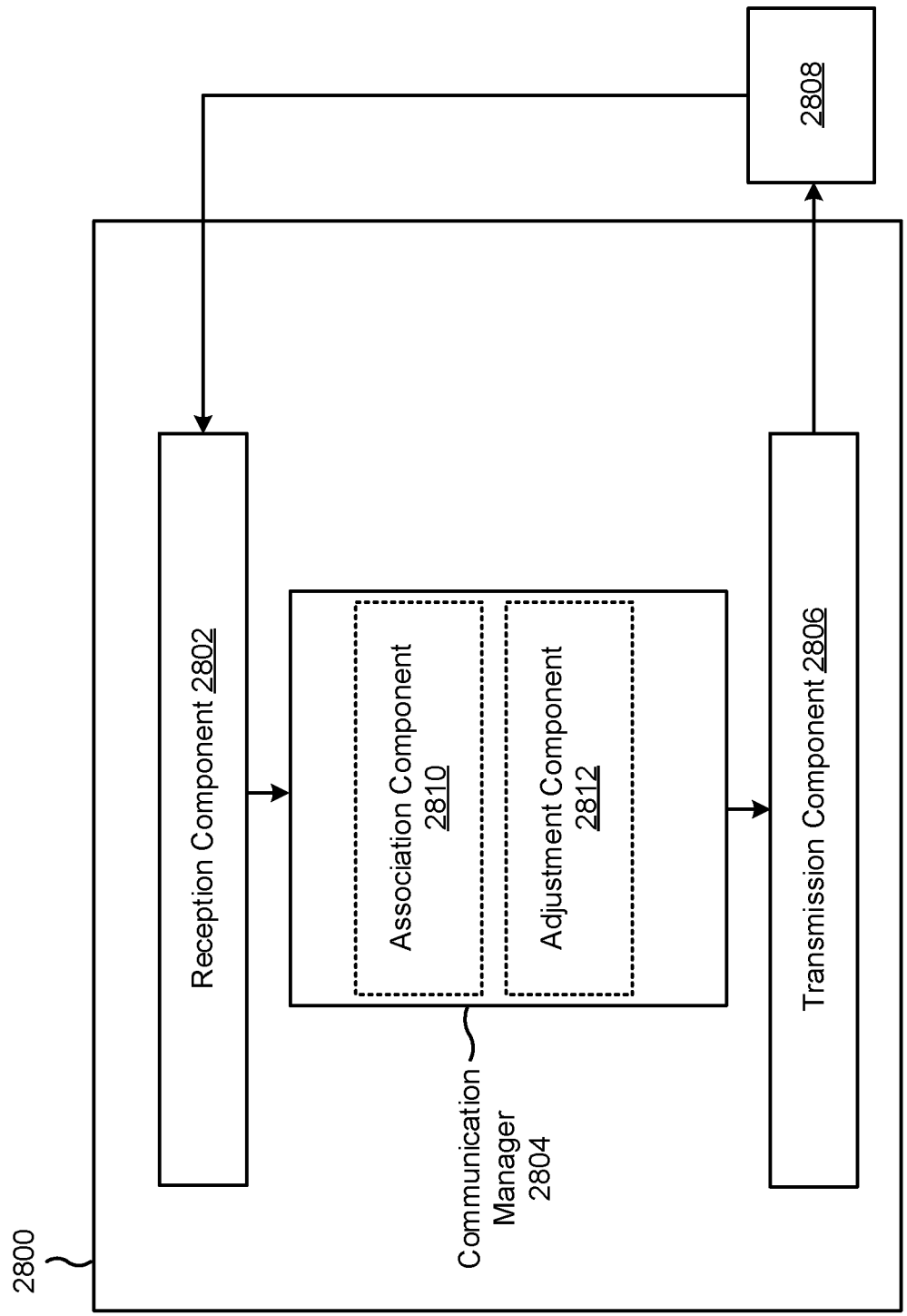

FIG. 28 is a block diagram of an example apparatus 2800 for wireless communication in accordance with the present disclosure. The apparatus 2800 may be a node (such as an IAB node), or a node may include the apparatus 2800. The node may be an IAB node, an IAB donor, or a parent node. In some aspects, the apparatus 2800 includes a reception component 2802, a communication manager 2804, and a transmission component 2806, which may be in communication with one another (for example, via one or more buses). As shown, the apparatus 2800 may communicate with another apparatus 2808 (such as a UE, a base station, or another wireless communication device) using the reception component 2802 and the transmission component 2806.

In some aspects, the apparatus 2800 may be configured to perform one or more operations described herein in connection with FIGS. 9-15. Additionally or alternatively, the apparatus 2800 may be configured to perform one or more processes described herein, such as process 2000 of FIG. 20, process 2100 of FIG. 21, process 2200 of FIG. 22, or a combination thereof. In some aspects, the apparatus 2800 may include one or more components of the wireless node described above in connection with FIG. 2.

The reception component 2802 may receive communications, such as reference signals, control information, data communications, or a combination thereof, from the apparatus 2808. The reception component 2802 may provide received communications to one or more other components of the apparatus 2800, such as the communication manager 2804. In some aspects, the reception component 2802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 2802 may include one or more antennas, a demodulator, a MIMO detector, a receive processor, a controller/processor, a memory, or a combination thereof, of the wireless node described above in connection with FIG. 2.

The transmission component 2806 may transmit communications, such as reference signals, control information, data communications, or a combination thereof, to the apparatus 2808. In some aspects, the communication manager 2804 may generate communications and may transmit the generated communications to the transmission component 2806 for transmission to the apparatus 2808. In some aspects, the transmission component 2806 may perform signal processing on the generated communications (such as filtering, amplification, modulation, digital-to-analog conversion, multiplexing, interleaving, mapping, or encoding, among other examples), and may transmit the processed signals to the apparatus 2808. In some aspects, the transmission component 2806 may include one or more antennas, a modulator, a transmit MIMO processor, a transmit processor, a controller/processor, a memory, or a combination thereof, of the wireless node described above in connection with FIG. 2. In some aspects, the transmission component 2806 may be co-located with the reception component 2802 in a transceiver.

The communication manager 2804 may receive, or may cause the reception component 2802 to receive a priority flag associated with a set of periodic resources, wherein the priority flag indicates that the set of periodic resources are available to the IAB node irrespective of a resource type associated with individual resources included in the set of periodic resources. In some aspects, the communication manager 2804 may communicate (for example, transmit or receive), or may cause the reception component 2802 to receive or may cause the transmission component 2806 to transmit, a communication with a child node of the IAB node or a parent node of the IAB node using the set of periodic resources based at least in part on the priority flag associated with the set of periodic resources. In some aspects, the communication manager 2804 may include a controller/processor, a memory, a scheduler, a communication unit, or a combination thereof, of the wireless node described above in connection with FIG. 2.

In some aspects, the communication manager 2804 may include a set of components, such as an association component 2810, or an adjustment component 2812, among other examples. Alternatively, the set of components may be separate and distinct from the communication manager 2804. In some aspects, one or more components of the set of components may include or may be implemented within a controller/processor, a memory, a scheduler, a communication unit, or a combination thereof, of the wireless node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2802 may receive the priority flag via a radio resource control message from a central unit of an IAB donor associated with the IAB node. The reception component 2802 may receive the priority flag via an F1 application protocol message from a central unit of an IAB donor associated with the IAB node. The reception component 2802 may receive the priority flag via a medium access control-control element from a distributed unit of the parent node of the IAB node. The reception component 2802 may receive the priority flag via an activation downlink control information from a distributed unit of the parent node of the IAB node.

The transmission component 2806 may perform, at a radio link control channel associated with the IAB node, the communication using the set of periodic resources. The transmission component 2806 may transmit, to the parent node, information associated with the set of periodic resources that is available to the IAB node irrespective of the resource type to enable an adjustment to a resource allocation at the parent node. The transmission component 2806 may transmit the information via a medium access control-control element.

The association component 2810 may associate a priority flag with a set of periodic resources. In some aspects, the association component 2810 may include one or more antennas, a demodulator, a MIMO detector, a receive processor, a controller/processor, a memory, or a combination thereof, of the node described above in connection with FIG. 2.

The transmission component 2806 may transmit, from the IAB donor to an IAB node, the priority flag associated with the set of periodic resources, wherein the priority flag indicates that the set of periodic resources are available to the IAB node irrespective of a resource type associated with individual resources included in the set of periodic resources. The transmission component 2806 may transmit the priority flag via a radio resource control message from a central unit of the IAB donor. The transmission component 2806 may transmit the priority flag via an F1 application protocol message from a central unit of the IAB donor. The transmission component 2806 may transmit, to a parent node of the IAB node, information associated with the set of periodic resources allocated to the IAB node with the priority flag.

The association component 2810 may associate a priority flag with a set of periodic resources. The transmission component 2806 may transmit, from the parent node to an IAB node, the priority flag associated with the set of periodic resources, wherein the priority flag indicates that the set of periodic resources are available to the IAB node irrespective of a resource type associated with individual resources included in the set of periodic resources. The transmission component 2806 may transmit the priority flag via a medium access control-control element from a distributed unit of the parent node. The transmission component 2806 may transmit the priority flag via an activation downlink control information from a distributed unit of the parent node.

The reception component 2802 may receive, from the IAB node, information associated with the set of periodic resources that is available to the IAB node irrespective of the resource type. The reception component 2802 may receive, from the IAB node, the information via a medium access control-control element. The reception component 2802 may receive, from a central unit of an IAB donor, the information via an F1 application protocol message or a radio resource control message.

The adjustment component 2812 may adjust a resource allocation based at least in part on the information received from the IAB node. In some aspects, the adjustment component 2812 may include one or more antennas, a demodulator, a MIMO detector, a receive processor, a controller/processor, a memory, or a combination thereof, of the node described above in connection with FIG. 2.

The quantity and arrangement of components shown in FIG. 28 are provided as an example. In practice, there may be additional components, fewer components, different components, or differently arranged components than those shown in FIG. 28. Furthermore, two or more components shown in FIG. 28 may be implemented within a single component, or a single component shown in FIG. 28 may be implemented as multiple, distributed components. Additionally or alternatively, a set of (one or more) components shown in FIG. 28 may perform one or more functions described as being performed by another set of components shown in FIG. 28.

Figure 29:
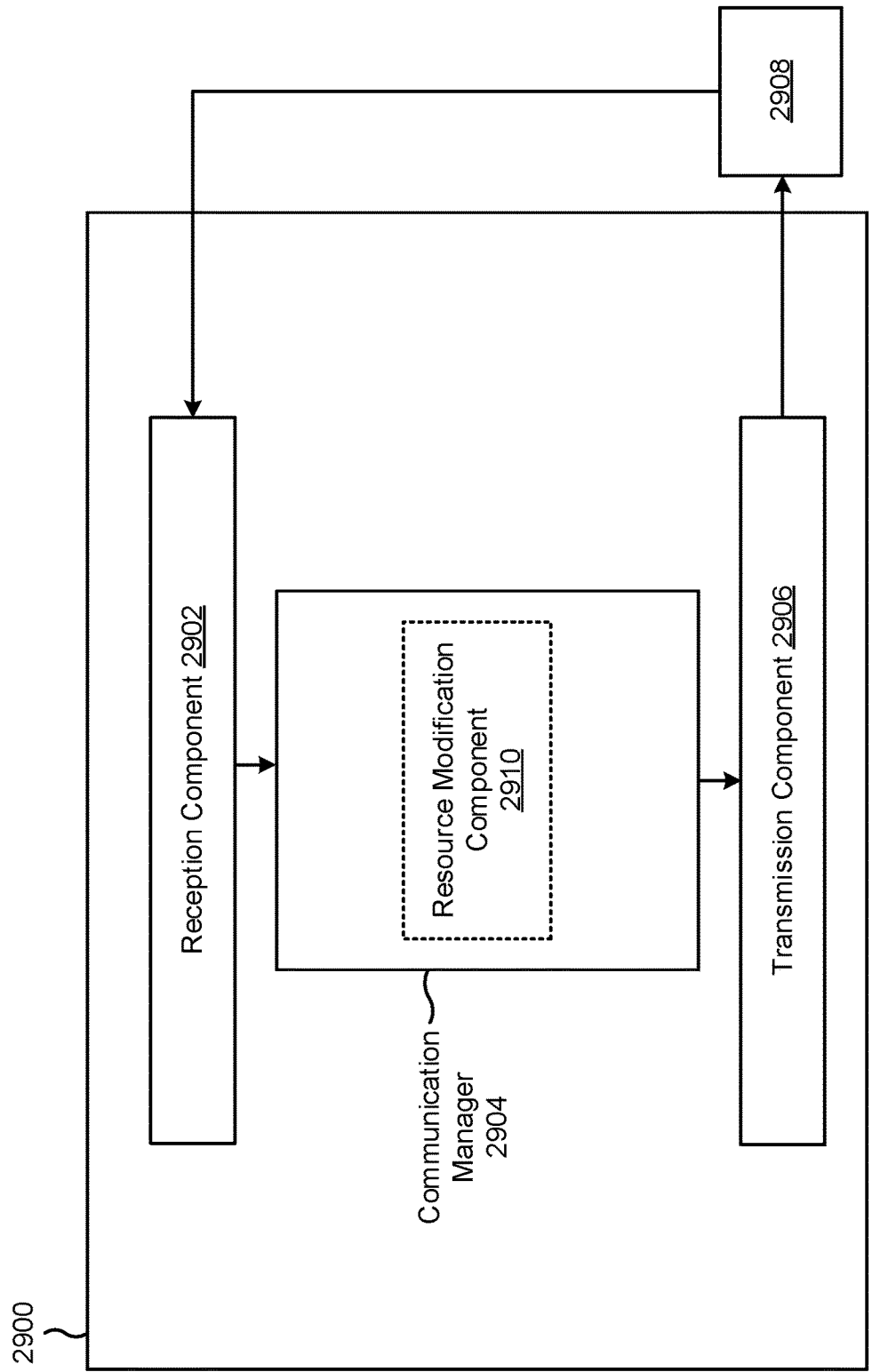

FIG. 29 is a block diagram of an example apparatus 2900 for wireless communication in accordance with the present disclosure. The apparatus 2900 may be a node (such as an IAB node), or a node may include the apparatus 2900. The node may be an IAB node, an IAB donor, or a parent node. In some aspects, the apparatus 2900 includes a reception component 2902, a communication manager 2904, and a transmission component 2906, which may be in communication with one another (for example, via one or more buses). As shown, the apparatus 2900 may communicate with another apparatus 2908 (such as a UE, a base station, or another wireless communication device) using the reception component 2902 and the transmission component 2906.

In some aspects, the apparatus 2900 may be configured to perform one or more operations described herein in connection with FIGS. 9-15. Additionally or alternatively, the apparatus 2900 may be configured to perform one or more processes described herein, such as process 2300 of FIG. 23, or a combination thereof. In some aspects, the apparatus 2900 may include one or more components of the wireless node described above in connection with FIG. 2.

The reception component 2902 may receive communications, such as reference signals, control information, data communications, or a combination thereof, from the apparatus 2908. The reception component 2902 may provide received communications to one or more other components of the apparatus 2900, such as the communication manager 2904. In some aspects, the reception component 2902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 2902 may include one or more antennas, a demodulator, a MIMO detector, a receive processor, a controller/processor, a memory, or a combination thereof, of the wireless node described above in connection with FIG. 2.

The transmission component 2906 may transmit communications, such as reference signals, control information, data communications, or a combination thereof, to the apparatus 2908. In some aspects, the communication manager 2904 may generate communications and may transmit the generated communications to the transmission component 2906 for transmission to the apparatus 2908. In some aspects, the transmission component 2906 may perform signal processing on the generated communications (such as filtering, amplification, modulation, digital-to-analog conversion, multiplexing, interleaving, mapping, or encoding, among other examples), and may transmit the processed signals to the apparatus 2908. In some aspects, the transmission component 2906 may include one or more antennas, a modulator, a transmit MIMO processor, a transmit processor, a controller/processor, a memory, or a combination thereof, of the wireless node described above in connection with FIG. 2. In some aspects, the transmission component 2906 may be co-located with the reception component 2902 in a transceiver.

The communication manager 2904 may receive, or may cause the reception component 2902 to receive an indication of a first periodic resource associated with the wireless node, wherein the first periodic resource is associated with one or more parameters for coordinating periodic resources or a priority flag that indicates that the first periodic resource is available to the wireless node irrespective of a resource type associated with the first periodic resource. In some aspects, the communication manager 2904 may communicate (for example, transmit or receive), or may cause the reception component 2902 to receive or may cause the transmission component 2906 to transmit, a message using a modified first periodic resource, wherein the modified first periodic resource includes a modified resource allocation associated with the first periodic resource or a modified resource type associated with first periodic resource. In some aspects, the communication manager 2904 may include a controller/processor, a memory, a scheduler, a communication unit, or a combination thereof, of the wireless node described above in connection with FIG. 2.

In some aspects, the communication manager 2904 may include a set of components, such as a resource modification component 2910, among other examples. Alternatively, the set of components may be separate and distinct from the communication manager 2904. In some aspects, one or more components of the set of components may include or may be implemented within a controller/processor, a memory, a scheduler, a communication unit, or a combination thereof, of the wireless node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2902 may receive an indication of a first periodic resource associated with the wireless node, wherein the first periodic resource is associated with one or more parameters for coordinating periodic resources or a priority flag that indicates that the first periodic resource is available to the wireless node irrespective of a resource type associated with the first periodic resource. The reception component 2902 or the transmission component 2906 may communicate (for example, receive or transmit) a message using a modified first periodic resource, wherein the modified first periodic resource includes a modified resource allocation associated with the first periodic resource or a modified resource type associated with first periodic resource.

The resource modification component 2910 may modify the first periodic resource based at least in part on the one or more parameters or the priority flag.

The quantity and arrangement of components shown in FIG. 29 are provided as an example. In practice, there may be additional components, fewer components, different components, or differently arranged components than those shown in FIG. 29. Furthermore, two or more components shown in FIG. 29 may be implemented within a single component, or a single component shown in FIG. 29 may be implemented as multiple, distributed components. Additionally or alternatively, a set of (one or more) components shown in FIG. 29 may perform one or more functions described as being performed by another set of components shown in FIG. 29.

The following provides an overview of some Aspects of the present disclosure:

Aspect 1: A method of wireless communication performed by a wireless node, comprising: receiving an indication of a first periodic resource associated with the wireless node, wherein the first periodic resource is associated with one or more parameters for coordinating periodic resources or a priority flag that indicates that the first periodic resource is available to the wireless node irrespective of a resource type associated with the first periodic resource; and communicating, with a child node or another wireless node, a message using a modified first periodic resource, wherein the modified first periodic resource includes a modified resource allocation associated with the first periodic resource or a modified resource type associated with first periodic resource.

Aspect 2: The method of Aspect 1, further comprising transmitting, to the child node, an activation message associated with the first periodic resource that indicates the modified resource allocation associated with the first periodic resource.

Aspect 3: The method of any of Aspects 1-2, wherein the first periodic resource is associated with a distributed unit (DU) of the wireless node, and wherein the one or more parameters for coordinating periodic resources are associated with coordinating the first periodic resource with a second periodic resource that is associated with a mobile termination (MT) component of the wireless node and that corresponds to the first periodic resource, and wherein communicating using the modified first periodic resource is based at least in part on the first periodic resource not satisfying at least one parameter of the one or more parameters.

Aspect 4: The method of any of Aspects 1-3, wherein the one or more parameters include at least one of: a time gap between periodic resources that are associated with a mobile termination (MT) component of the wireless node and periodic resources that are associated with a distributed unit (DU) of the wireless node, or a range of time gaps between periodic resources that are associated with the MT component and periodic resources that are associated with the DU.

Aspect 5: The method of any of Aspects 1-4, further comprising: receiving, from a control node or a parent node, an indication of the one or more parameters; or determining the one or more parameters.

Aspect 6: The method of any of Aspects 1-5, wherein the one or more parameters are based at least in part on at least one of: a processing capability of the wireless node, a latency requirement associated with the wireless node, or a packet delay budget (PDB) of a radio link control (RLC) channel associated with the first periodic resource or a second periodic resource.

Aspect 7: The method of any of Aspects 1-6, further comprising: transmitting, to a control node or a parent node, an indication of information to be used to determine the one or more parameters; and receiving, from the control node or the parent node, an indication of the one or more parameters based at least in part on transmitting the indication of information to be used to determine the one or more parameters.

Aspect 8: The method of any of Aspects 1-7, further comprising: receiving, from a control node or a parent node, the priority flag via at least one of a radio resource control message, an F1 application protocol message, a medium access control (MAC) control element (MAC-CE), or an activation downlink control information.

Aspect 9: The method of any of Aspects 1-8, wherein the first periodic resource includes one or more downlink resources allocated via downlink semi-persistent scheduling or one or more uplink resources allocated via an uplink configured grant.

Aspect 10: The method of any of Aspects 1-9, wherein the resource type includes a configured distributed unit resource type, a not available (NA) resource type, a hard resource type, or a soft resource type.

Aspect 11: The method of any of Aspects 1-10, further comprising transmitting, to a control node or a parent node, information associated with the first periodic resource that is available to the wireless node irrespective of the resource type to enable an adjustment to the resource allocation at the control node or the parent node.

Aspect 12: The method of any of Aspects 1-11, wherein receiving the indication of the first periodic resource comprises receiving, from a control node, a configuration indicating grant information, for the first periodic resource, that indicates resource locations associated with the first periodic resource.

Aspect 13: The method of Aspect 12, wherein receiving the configuration indicating grant information, for the first periodic resource, that indicates resource locations associated with the first periodic resource comprises receiving the configuration indicating full grant information.

Aspect 14: The method of Aspect 13, wherein the full grant information at least indicates: the resource locations associated with the first periodic resource, a modulation and coding scheme (MCS) associated with the first periodic resource, a frequency domain resource block (RB) allocation associated with the first periodic resource, and an antenna port of the wireless node associated with the first periodic resource.

Aspect 15: The method of any of Aspects 12-14, wherein receiving the configuration indicating grant information, for the first periodic resource, that indicates resource locations associated with the first periodic resource comprises receiving the configuration indicating partial grant information that at least indicates the resource locations associated with the first periodic resource.

Aspect 16: A method of wireless communication performed by a wireless node, comprising: receiving an activation message for activating a first periodic resource that is associated with a mobile termination (MT) component of the wireless node; identifying one or more parameters for coordinating periodic resources, including the first periodic resource, that are associated with the MT component of the wireless node with periodic resources, including a second periodic resource, that are associated with a distributed unit (DU) of the wireless node; determining whether the second periodic resource satisfies the one or more parameters; and modifying a resource allocation associated with the second periodic resource based at least in part on determining that the second periodic resource does not satisfy at least one parameter of the one or more parameters.

Aspect 17: The method of Aspect 16, further comprising transmitting, to a child node, an activation message associated with the second periodic resource that indicates the modified resource allocation associated with the second periodic resource.

Aspect 18: The method of any of Aspects 16-17, wherein the first periodic resource and the second periodic resource are both downlink semi-persistent scheduling (SPS) resources or are both uplink configured grant resources.

Aspect 19: The method of any of Aspects 16-18, wherein the first periodic resource or the second periodic resource are associated with a radio link control (RLC) channel that carries low-latency traffic.

Aspect 20: The method of any of Aspects 16-19, wherein the one or more parameters include at least one of: a time gap between periodic resources that are associated with the MT component and periodic resources that are associated with the DU, or a range of time gaps between periodic resources that are associated with the MT component and periodic resources that are associated with the DU.

Aspect 21: The method of Aspect 20, wherein the time gap is based at least in part on a processing capability of the wireless node.

Aspect 22: The method of any of Aspects 16-21, wherein identifying the one or more parameters for coordinating periodic resources that are associated with the MT component of the wireless node with periodic resources that are associated with the DU of the wireless node comprises receiving, from a control node, an indication of the one or more parameters.

Aspect 23: The method of Aspect 22, wherein receiving, from the control node, the indication of the one or more parameters comprises receiving the indication of the one or more parameters via a radio resource control (RRC) message or an F1 application protocol (F1-AP) message.

Aspect 24: The method of any of Aspects 22-23, wherein the control node is a central unit (CU) of an integrated access and backhaul (IAB) donor.

Aspect 25: The method of any of Aspects 16-24, wherein identifying the one or more parameters for coordinating periodic resources that are associated with the MT component of the wireless node with periodic resources that are associated with the DU of the wireless node comprises receiving, from a parent node, an indication of the one or more parameters.

Aspect 26: The method of Aspect 25, wherein receiving, from the parent node, the indication of the one or more parameters comprises receiving the indication of the one or more parameters via a downlink control information (DCI) message or a medium access control (MAC) control element (MAC-CE) message.

Aspect 27: The method of any of Aspects 25-26, wherein receiving, from the parent node, the indication of the one or more parameters comprises receiving the indication of the one or more parameters in the activation message.

Aspect 28: The method of any of Aspects 25-27, wherein the parent node is a DU of an integrated access and backhaul (IAB) node.

Aspect 29: The method of any of Aspects 16-28, wherein identifying the one or more parameters for coordinating periodic resources that are associated with the MT component of the wireless node with periodic resources that are associated with the DU of the wireless node comprises determining the one or more parameters.

Aspect 30: The method of Aspect 29, further comprising transmitting, to a parent node associated with the wireless node, an indication of the one or more parameters.

Aspect 31: The method of Aspect 30, wherein transmitting, to the parent node associated with the wireless node, the indication of the one or more parameters comprises transmitting the indication of the one or more parameters via a medium access control (MAC) control element (MAC-CE) message or an uplink control information (UCI) message.

Aspect 32: The method of any of Aspects 29-31, wherein determining the one or more parameters comprises determining the one or more parameters based at least in part on at least one of: a processing capability of the wireless node, a latency requirement associated with the wireless node, or a packet delay budget (PDB) of a radio link control (RLC) channel associated with the first periodic resource or the second periodic resource.

Aspect 33: The method of any of Aspects 16-32, further comprising transmitting, to a control node or a parent node, an indication of information to be used to determine the one or more parameters.

Aspect 34: The method of Aspect 33, wherein the information to be used to determine the one or more parameters includes at least one of: a processing capability of the wireless node, a latency requirement associated with the wireless node, or a packet delay budget (PDB) of a radio link control (RLC) channel associated with the first periodic resource or the second periodic resource.

Aspect 35: The method of any of Aspects 33-34, further comprising receiving, from the control node or the parent node, an indication of the one or more parameters that are based at least in part on the information to be used to determine the one or more parameters.

Aspect 36: The method of any of Aspects 16-35, wherein receiving the activation message for activating the first periodic resource that is associated with the MT component of the wireless node comprises identifying the second periodic resource that corresponds with the first periodic resource.

Aspect 37: The method of any of Aspects 16-36, wherein determining whether the second periodic resource satisfies the one or more parameters comprises determining whether a resource allocation associated with the second periodic resource satisfies the one or more parameters.

Aspect 38: The method of any of Aspects 16-37, further comprising receiving an indication of a scheduling gap indicating an amount of time between the activation message and the first periodic resource.

Aspect 39: The method of Aspect 38, wherein determining whether the second periodic resource satisfies the one or more parameters comprises determining, during the scheduling gap, whether the second periodic resource satisfies the one or more parameters.

Aspect 40: The method of any of Aspects 38-39, wherein receiving the indication of the scheduling gap indicating the amount of time between the activation message and the first periodic resource comprises receiving, from a control node, the indication of the scheduling gap via a radio resource control (RRC) message or an F1 application protocol (F1-AP) message.

Aspect 41: The method of any of Aspects 38-40, wherein receiving the indication of the scheduling gap indicating the amount of time between the activation message and the first periodic resource comprises receiving, from a parent node, the indication of the scheduling gap via a downlink control information (DCI) message or a medium access control (MAC) control element (MAC-CE) message.

Aspect 42: The method of any of Aspects 16-41, further comprising: receiving, by the MT component from a parent node using the first periodic resource, a first communication; and transmitting, by the DU to a child node using the second periodic resource, a second communication that is associated with the first communication.

Aspect 43: The method of any of Aspects 16-42, further comprising: receiving, by the DU from a child node using the second periodic resource, a first communication; and transmitting, by the MT component to a parent node using the first periodic resource, a second communication that is associated with the first communication.

Aspect 44: A method of wireless communication performed by a wireless node, comprising: determining one or more parameters for coordinating periodic resources that are associated with a mobile termination (MT) component of a different wireless node with periodic resources that are associated with a distributed unit (DU) of the different wireless node; and transmitting, to the different wireless node, an indication of the one or more parameters.

Aspect 45: The method of Aspect 44, wherein the wireless node is a central unit (CU) of an integrated access and backhaul (IAB) donor or a DU of an IAB node.

Aspect 46: The method of any of Aspects 44-45, wherein determining the one or more parameters for coordinating periodic resources that are associated with the MT component of the different wireless node with periodic resources that are associated with the DU of the different wireless node comprises determining at least one of: a time gap between periodic resources that are associated with the MT component of the different wireless node and periodic resources that are associated with the DU of the different wireless node, or a range of time gaps between periodic resources that are associated with the MT component of the different wireless node and periodic resources that are associated with the DU of the different wireless node.

Aspect 47: The method of any of Aspects 44-46, wherein determining the one or more parameters for coordinating periodic resources that are associated with the MT component of the different wireless node with periodic resources that are associated with the DU of the different wireless node comprises determining the one or more parameters based at least in part on information that includes at least one of: a processing capability of the different wireless node, a latency requirement associated with the different wireless node, or a packet delay budget (PDB) of a radio link control (RLC) channel associated with the periodic resources that are associated with the MT component of the different wireless node or the periodic resources that are associated with the DU of the different wireless node.

Aspect 48: The method of any of Aspects 47, further comprising receiving, from the different wireless node, an indication of at least one of: the processing capability of the different wireless node, or the latency requirement associated with the different wireless node.

Aspect 49: The method of any of Aspects 44-48, wherein transmitting the indication of the one or more parameters comprises transmitting the indication of the one or more parameters via a radio resource control (RRC) message or an F1 application protocol (F1-AP) message.

Aspect 50: The method of any of Aspects 44-48, wherein transmitting the indication of the one or more parameters comprises transmitting the indication of the one or more parameters via a downlink control information (DCI) message or a medium access control (MAC) control element (MAC-CE) message.

Aspect 51: The method of any of Aspects 44-50, further comprising: determining a scheduling gap indicating an amount of time between an activation message for activating a periodic resource associated with the MT component of the different wireless node and the periodic resource; and transmitting, to the different wireless node, an indication of the scheduling gap.

Aspect 52: The method of any of Aspects 44-51, further comprising transmitting, to the different wireless node, an activation message for activating a periodic resource associated with the MT component of the different wireless node.

Aspect 53: The method of Aspect 52, further comprising transmitting, to the different wireless node during the periodic resource, a communication, wherein the communication is to be forwarded by the different wireless node to a child node associated with the different wireless node.

Aspect 54: The method of any of Aspects 52-53, further comprising receiving, from the different wireless node during the periodic resource, a communication, wherein the communication is associated with a communication to be forwarded by the different wireless node from a child node associated with the different wireless node to the wireless node.

Aspect 55: The method of any of Aspects 44-54, wherein transmitting, to the different wireless node, the indication of the one or more parameters comprises transmitting, to a parent node associated with the different wireless node, the indication of the one or more parameters.

Aspect 56: A method of wireless communication performed by a wireless node, comprising: receiving, from a control node, a configuration indicating grant information, for downlink periodic resources, that indicates resource locations associated with the downlink periodic resources; and communicating downlink traffic using the downlink periodic resources in accordance with the grant information.

Aspect 57: The method of Aspect 56, wherein receiving the configuration indicating grant information, for downlink periodic resources, that indicates resource locations associated with the downlink periodic resources comprises receiving the configuration indicating full grant information; and wherein communicating the downlink traffic using the downlink periodic resources in accordance with the grant information comprises communicating the downlink traffic using the downlink periodic resources without receiving or transmitting an activation message associated with the downlink periodic resources.

Aspect 58: The method of Aspect 57, wherein the full grant information at least indicates: the resource locations associated with the downlink periodic resources, a modulation and coding scheme (MCS) associated with the downlink periodic resources, a frequency domain resource block (RB) allocation associated with the downlink periodic resources, and an antenna port of the wireless node associated with the downlink periodic resources.

Aspect 59: The method of any of Aspects 56-58, wherein receiving the configuration indicating grant information, for downlink periodic resources, that indicates resource locations associated with the downlink periodic resources comprises receiving the configuration indicating partial grant information that at least indicated the resource locations associated with the downlink periodic resources.

Aspect 60: The method of Aspect 59, wherein communicating the downlink traffic using the downlink periodic resources in accordance with the grant information comprises: transmitting or receiving an activation message indicating remaining grant information associated with the downlink periodic resources; and communicating the downlink traffic using the downlink periodic resources in accordance with the partial grant information and the remaining grant information.

Aspect 61: The method of Aspect 60, wherein the remaining grant information associated with downlink periodic resources indicates at least one of: a modulation and coding scheme (MCS) associated with the downlink periodic resources, a frequency domain resource block (RB) allocation associated with the downlink periodic resources, an antenna port of the wireless node associated with the downlink periodic resources, or a redundancy version (RV) associated with the downlink periodic resources.

Aspect 62: The method of any of Aspects 56-61, wherein the control node is a central unit (CU) of an integrated access and backhaul (IAB) donor.

Aspect 63: The method of any of Aspects 56-62, wherein the wireless node is an integrated access and backhaul (IAB) node and the downlink periodic resources are associated with a mobile termination (MT) component of the wireless node; and wherein communicating the downlink traffic using the downlink periodic resources in accordance with the grant information comprises receiving, from a parent node associated with the wireless node, the downlink traffic using the downlink periodic resources.

Aspect 64: The method of any of Aspects 56-62, wherein the wireless node is an integrated access and backhaul (IAB) node and the downlink periodic resources are associated with a distributed unit (DU) of the wireless node; and wherein communicating the downlink traffic using the downlink periodic resources in accordance with the grant information comprises transmitting, to a child node associated with the wireless node, the downlink traffic using the downlink periodic resources.

Aspect 65: The method of any of Aspects 56-64, wherein receiving the configuration indicating the grant information comprises receiving an indication of a periodicity associated with the downlink periodic resources and offset values associated with the downlink periodic resources.

Aspect 66: The method of any of Aspects 56-65, further comprising transmitting, to the control node, an indication of a processing capability associated with wireless node.

Aspect 67: A method of wireless communication performed by a control node, comprising: determining, for one or more wireless nodes included in a multi-hop network, grant information, for downlink periodic resources, that indicates resource locations associated with the downlink periodic resources; and transmitting, to the one or more wireless nodes, a configuration indicating the grant information.

Aspect 68: The method of Aspect 67, wherein transmitting the configuration indicating the grant information comprises transmitting, to each wireless node of the one or more wireless nodes, full grant information that enables the wireless node to communicate periodic downlink communications, using the downlink periodic resources, without an activation message.

Aspect 69: The method of Aspect 68, wherein determining, for one or more wireless nodes included in a multi-hop network, grant information, for downlink periodic resources, that indicates resource locations associated with the downlink periodic resources comprises determining, for each wireless node of the one or more wireless nodes, the full grant information.

Aspect 70: The method of any of Aspects 67-69, wherein transmitting the configuration indicating the grant information comprises transmitting, to each wireless node of the one or more wireless nodes, partial grant information that at least indicates the resource locations associated with the downlink periodic resources.

Aspect 71: The method of Aspect 70, wherein determining, for the one or more wireless nodes included in a multi-hop network, grant information, for downlink periodic resources, that indicates resource locations associated with the downlink periodic resources comprises determining, for each wireless node of the one or more wireless nodes, the partial grant information.

Aspect 72: The method of Aspect 71, wherein determining, for each wireless node of the one or more wireless nodes, the partial grant information comprises determining at least one of: a modulation and coding scheme (MCS) associated with the downlink periodic resources, a frequency domain resource block (RB) allocation associated with the downlink periodic resources, an antenna port of the wireless node associated with the downlink periodic resources, or a redundancy version (RV) associated with the downlink periodic resources.

Aspect 73: The method of any of Aspects 67-72, wherein determining, for the one or more wireless nodes included in a multi-hop network, grant information, for downlink periodic resources, that indicates resource locations associated with the downlink periodic resources comprises determining, for each wireless node of the one or more wireless nodes, grant information for downlink periodic resources to be used by the wireless node.

Aspect 74: The method of any of Aspects 67-73, wherein the one or more wireless nodes are included in a communication path for periodic multi-hop downlink communications.

Aspect 75: The method of Aspect 74, wherein the communication path includes one or more radio link control (RLC) channels that are associated with low latency traffic.

Aspect 76: The method of any of Aspects 67-75, wherein determining, for the one or more wireless nodes included in a multi-hop network, grant information, for downlink periodic resources, that indicates resource locations associated with the downlink periodic resources comprises determining, for each wireless node of the one or more wireless nodes, the resource locations associated with the downlink periodic resources for the wireless node.

Aspect 77: The method of Aspect 76, wherein determining, for each wireless node of the one or more wireless nodes, the resource locations associated with the downlink periodic resources for the wireless node comprises: determining a periodicity associated with the downlink periodic resources; and determining offset values associated with the downlink periodic resources.

Aspect 78: The method of Aspect 77, wherein transmitting the configuration indicating the grant information comprises transmitting, to a wireless node of the one or more wireless nodes, an indication of the periodicity associated with the downlink periodic resources and the offset values associated with the downlink periodic resources.

Aspect 79: The method of any of Aspects 67-78, wherein determining, for the one or more wireless nodes included in a multi-hop network, grant information, for downlink periodic resources, that indicates resource locations associated with the downlink periodic resources comprises determining, for each wireless node of the one or more wireless nodes, the grant information based at least in part on at least one of: a traffic pattern of the wireless node, a duplex communication mode capability of the wireless node, an integrated access and backhaul (IAB) resource type pattern of the wireless node, an average link quality associated with the wireless node, a processing capability of the wireless node, or a latency requirement of the wireless node.

Aspect 80: The method of Aspect 79, further comprising receiving, from the wireless node of the one or more wireless nodes, an indication of the processing capability of the wireless node.

Aspect 81: The method of any of Aspects 67-80, wherein the control node is a central unit (CU) of an integrated access and backhaul (IAB) donor.

Aspect 82: The method of any of Aspects 67-81, wherein determining, for the one or more wireless nodes included in a multi-hop network, grant information, for downlink periodic resources, that indicates resource locations associated with the downlink periodic resources comprises determining, for a wireless node of the one or more wireless nodes, grant information that indicates a resource location for a downlink periodic resource that is associated with a mobile termination (MT) component of the wireless node and that is to be used by the wireless node to receive periodic downlink communications.

Aspect 83: The method of any of Aspects 67-82, wherein determining, for the one or more wireless nodes included in a multi-hop network, grant information, for downlink periodic resources, that indicates resource locations associated with the downlink periodic resources comprises determining, for a wireless node of the one or more wireless nodes, grant information that indicates a resource location for a downlink periodic resource that is associated with a distributed unit (DU) of the wireless node and that is to be used by the wireless node to transmit periodic downlink communications.

Aspect 84: A method of wireless communication performed by an integrated access and backhaul (TAB) node, comprising: receiving a priority flag associated with a set of periodic resources, wherein the priority flag indicates that the set of periodic resources are available to the IAB node irrespective of a resource type associated with individual resources included in the set of periodic resources; and performing a communication with a child node of the IAB node or a parent node of the IAB node using the set of periodic resources based at least in part on the priority flag associated with the set of periodic resources.

Aspect 85: The method of Aspect 84, wherein receiving the priority flag comprises: receiving the priority flag via a radio resource control message from a central unit of an IAB donor associated with the IAB node.

Aspect 86: The method of any of Aspects 84-85, wherein receiving the priority flag comprises: receiving the priority flag via an F1 application protocol message from a central unit of an IAB donor associated with the IAB node.

Aspect 87: The method of any of Aspects 84-86, wherein receiving the priority flag comprises: receiving the priority flag via a medium access control-control element from a distributed unit of the parent node of the IAB node.

Aspect 88: The method of any of Aspects 84-87, wherein receiving the priority flag comprises: receiving the priority flag via an activation downlink control information from a distributed unit of the parent node of the IAB node.

Aspect 89: The method of any of Aspects 84-88, wherein the set of periodic resources include downlink resources allocated via downlink semi-persistent scheduling.

Aspect 90: The method of any of Aspects 84-89, wherein the set of periodic resources include uplink resources allocated via an uplink configured grant.

Aspect 91: The method of any of Aspects 84-90, wherein the set of periodic resources are available to a mobile termination or a distributed unit of the IAB node.

Aspect 92: The method of any of Aspects 84-91, wherein the resource type associated with the individual resources is a configured distributed unit resource type.

Aspect 93: The method of any of Aspects 84-92, wherein the resource type associated with the individual resources is a not available (NA) resource type, a hard resource type, or a soft resource type.

Aspect 94: The method of any of Aspects 84-93, wherein the communication is associated with periodic low-latency traffic.

Aspect 95: The method of any of Aspects 84-94, wherein performing the communication comprises: performing, at a radio link control channel associated with the IAB node, the communication using the set of periodic resources.

Aspect 96: The method of any of Aspects 84-95, further comprising: transmitting, to the parent node of the IAB node, information associated with the set of periodic resources that is available to the IAB node irrespective of the resource type to enable an adjustment to a resource allocation at the parent node.

Aspect 97: The method of Aspect 96, wherein transmitting the information comprises: transmitting the information via a medium access control-control element.

Aspect 98: A method of wireless communication performed by an integrated access and backhaul (IAB) donor, comprising: associating a priority flag with a set of periodic resources; and transmitting, from the IAB donor to an IAB node, the priority flag associated with the set of periodic resources, wherein the priority flag indicates that the set of periodic resources are available to the IAB node irrespective of a resource type associated with individual resources included in the set of periodic resources.

Aspect 99: The method of Aspect 98, wherein transmitting the priority flag comprises: transmitting the priority flag via a radio resource control message from a central unit of the IAB donor.

Aspect 100: The method of any of Aspects 98-99, wherein transmitting the priority flag comprises: transmitting the priority flag via an F1 application protocol message from a central unit of the IAB donor.

Aspect 101: The method of any of Aspects 98-100, wherein the set of periodic resources include downlink resources allocated via downlink semi-persistent scheduling.

Aspect 102: The method of any of Aspects 98-101, wherein the set of periodic resources include uplink resources allocated via an uplink configured grant.

Aspect 103: The method of any of Aspects 98-102, wherein the set of periodic resources are available to a mobile termination or a distributed unit of the IAB node.

Aspect 104: The method of any of Aspects 98-103, wherein the resource type associated with the individual resources is a configured distributed unit resource type.

Aspect 105: The method of any of Aspects 98-104, wherein the resource type associated with the individual resources is a not available (NA) resource type, a hard resource type, or a soft resource type.

Aspect 106: The method of any of Aspects 98-105, further comprising: transmitting, to a parent node of the IAB node, information associated with the set of periodic resources allocated to the IAB node with the priority flag.

Aspect 107: A method of wireless communication performed by a parent node, comprising: associating a priority flag with a set of periodic resources; and transmitting, from the parent node to an integrated access and backhaul (IAB) node, the priority flag associated with the set of periodic resources, wherein the priority flag indicates that the set of periodic resources are available to the IAB node irrespective of a resource type associated with individual resources included in the set of periodic resources.

Aspect 108: The method of Aspect 107, wherein transmitting the priority flag comprises: transmitting the priority flag via a medium access control-control element from a distributed unit of the parent node.

Aspect 109: The method of any of Aspects 107-108, wherein transmitting the priority flag comprises: transmitting the priority flag via an activation downlink control information from a distributed unit of the parent node.

Aspect 110: The method of any of Aspects 107-109, further comprising: receiving, from the IAB node, information associated with the set of periodic resources that is available to the IAB node irrespective of the resource type; and adjusting a resource allocation based at least in part on the information received from the IAB node.

Aspect 111: The method of any of Aspects 107-110, wherein receiving the information comprises: receiving, from the IAB node, the information via a medium access control-control element.

Aspect 112: The method of any of Aspects 107-111, wherein receiving the information comprises: receiving, from a central unit of an IAB donor, the information via an F1 application protocol message or a radio resource control message.

Aspect 113: An apparatus for wireless communication at a device, comprising a processor; memory coupled with the processor; and instructions stored in the memory and executable by the processor to cause the apparatus to perform the method of one or more of Aspects 1-15, 16-43, 56-66, and 84-97.

Aspect 114: A device for wireless communication, comprising a memory and one or more processors coupled to the memory, the one or more processors configured to perform the method of one or more of Aspects 1-15, 16-43, 56-66, and 84-97.

Aspect 115: An apparatus for wireless communication, comprising at least one means for performing the method of one or more of Aspects 1-15, 16-43, 56-66, and 84-97.

Aspect 116: A non-transitory computer-readable medium storing code for wireless communication, the code comprising instructions executable by a processor to perform the method of one or more of Aspects 1-15, 16-43, 56-66, and 84-97.

Aspect 117: A non-transitory computer-readable medium storing a set of instructions for wireless communication, the set of instructions comprising one or more instructions that, when executed by one or more processors of a device, cause the device to perform the method of one or more of Aspects 1-15, 16-43, 56-66, and 84-97.

Aspect 118: An apparatus for wireless communication at a device, comprising a processor; memory coupled with the processor; and instructions stored in the memory and executable by the processor to cause the apparatus to perform the method of one or more of Aspects 44-55, 67-83, and 98-106.

Aspect 119: A device for wireless communication, comprising a memory and one or more processors coupled to the memory, the one or more processors configured to perform the method of one or more of Aspects 44-55, 67-83, and 98-106.

Aspect 120: An apparatus for wireless communication, comprising at least one means for performing the method of one or more of Aspects 44-55, 67-83, and 98-106.

Aspect 121: A non-transitory computer-readable medium storing code for wireless communication, the code comprising instructions executable by a processor to perform the method of one or more of Aspects 44-55, 67-83, and 98-106.

Aspect 122: A non-transitory computer-readable medium storing a set of instructions for wireless communication, the set of instructions comprising one or more instructions that, when executed by one or more processors of a device, cause the device to perform the method of one or more of Aspects 44-55, 67-83, and 98-106.

Aspect 123: An apparatus for wireless communication at a device, comprising a processor; memory coupled with the processor; and instructions stored in the memory and executable by the processor to cause the apparatus to perform the method of one or more of Aspects 107-112.

Aspect 124: A device for wireless communication, comprising a memory and one or more processors coupled to the memory, the one or more processors configured to perform the method of one or more of Aspects 107-112.

Aspect 125: An apparatus for wireless communication, comprising at least one means for performing the method of one or more of Aspects 107-112.

Aspect 126: A non-transitory computer-readable medium storing code for wireless communication, the code comprising instructions executable by a processor to perform the method of one or more of Aspects 107-112.

Aspect 127: A non-transitory computer-readable medium storing a set of instructions for wireless communication, the set of instructions comprising one or more instructions that, when executed by one or more processors of a device, cause the device to perform the method of one or more of Aspects 107-112.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A wireless node for wireless communication, comprising:
    a processing system that includes one or more processors and one or more memories coupled with the one or more processors, the processing system configured to cause the wireless node to:

receive an indication of a first periodic resource associated with the wireless node, wherein the first periodic resource is associated with one or more parameters for coordinating periodic resources between a mobile terminal (MT) component of the wireless node and a distributed node (DU) of the wireless node or a priority flag that indicates that the first periodic resource is available to the wireless node irrespective of a resource type associated with the first periodic resource; and communicate a message, with a child node or another wireless node, using a modified first periodic resource, wherein the modified first periodic resource includes a modified resource allocation associated with the first periodic resource or a modified resource type associated with first periodic resource.

2. The wireless node of claim 1, wherein the processing system is further configured to cause the wireless node to:
transmit, to the child node, an activation message associated with the first periodic resource that indicates the modified resource allocation associated with the first periodic resource.

3. The wireless node of claim 1, wherein the first periodic resource is associated with the DU of the wireless node, and wherein the one or more parameters for coordinating periodic resources are associated with coordinating the first periodic resource with a second periodic resource that is associated the MT component of the wireless node and that corresponds to the first periodic resource, and wherein communicating using the modified first periodic resource is in accordance with the first periodic resource not satisfying at least one parameter of the one or more parameters.

4. The wireless node of claim 1, wherein the one or more parameters include at least one of:
a time gap between periodic resources that are associated with the MT component of the wireless node and periodic resources that are associated with the DU of the wireless node, or
a range of time gaps between periodic resources that are associated with the MT component and periodic resources that are associated with the DU.

5. The wireless node of claim 1, wherein the processing system is further configured to cause the wireless node to:
receive, from a control node or a parent node, an indication of the one or more parameters; or
determine the one or more parameters.

6. The wireless node of claim 1, wherein the one or more parameters are in accordance with at least one of:
a processing capability of the wireless node,
a latency requirement associated with the wireless node, or
a packet delay budget (PDB) of a radio link control (RLC) channel associated with the first periodic resource or a second periodic resource.

7. The wireless node of claim 1, wherein the processing system is further configured to cause the wireless node to:
transmit, to a control node or a parent node, an indication of information to be used to determine the one or more parameters; and
receive, from the control node or the parent node, an indication of the one or more parameters in accordance with transmitting the indication of information to be used to determine the one or more parameters.

8. The wireless node of claim 1, wherein the processing system is further configured to cause the wireless node to:

receive, from a control node or a parent node, the priority flag via at least one of a radio resource control message, an F1 application protocol message, a medium access control (MAC) control element (MAC-CE), or an activation downlink control information.

9. The wireless node of claim 1, wherein the first periodic resource includes one or more downlink resources allocated via downlink semi-persistent scheduling or one or more uplink resources allocated via an uplink configured grant.

10. The wireless node of claim 1, wherein the resource type includes a configured distributed unit resource type, a not available (NA) resource type, a hard resource type, or a soft resource type.

11. The wireless node of claim 1, wherein the processing system is further configured to cause the wireless node to;
transmit, to a control node or a parent node, information associated with the first periodic resource that is available to the wireless node irrespective of the resource type to enable an adjustment to the resource allocation at the control node or the parent node.

12. The wireless node of claim 1, wherein, to cause the wireless node to receive the indication of the first periodic resource, the processing system is configured to cause the wireless node to:
receive, from a control node, a configuration indicating grant information, for the first periodic resource, that indicates resource locations associated with the first periodic resource.

13. The wireless node of claim 12, wherein, to cause the wireless node to receive the configuration indicating grant information, for the first periodic resource, that indicates resource locations associated with the first periodic resource, the processing system is configured to cause the wireless node to;
receive the configuration indicating full grant information.

14. The wireless node of claim 13, wherein the full grant information at least indicates:
the resource locations associated with the first periodic resource,
a modulation and coding scheme (MCS) associated with the first periodic resource,
a frequency domain resource block (RB) allocation associated with the first periodic resource, and
an antenna port of the wireless node associated with the first periodic resource.

15. The wireless node of claim 12, wherein, to cause the wireless node to receive the configuration indicating grant information, for the first periodic resource, that indicates resource locations associated with the first periodic resource, the processing system is configured to cause the wireless node to;
receive the configuration indicating partial grant information that at least indicates the resource locations associated with the first periodic resource.

16. A method of wireless communication performed by a wireless node, comprising:
receiving an indication of a first periodic resource associated with the wireless node, wherein the first periodic resource is associated with one or more parameters for coordinating periodic resources between a mobile terminal (MT) component of the wireless node and a distributed node (DU) of the wireless node or a priority flag that indicates that the first periodic resource is available to the wireless node irrespective of a resource type associated with the first periodic resource; and communicating a message, with a child node or another wireless node, using a modified first periodic resource, wherein the modified first periodic resource includes a modified resource allocation associated with the first periodic resource or a modified resource type associated with first periodic resource.

17. The method of claim 16, further comprising transmitting, to the child node, an activation message associated with the first periodic resource that indicates the modified resource allocation associated with the first periodic resource.

18. The method of claim 16, wherein the first periodic resource is associated with the DU of the wireless node, and wherein the one or more parameters for coordinating periodic resources are associated with coordinating the first periodic resource with a second periodic resource that is associated with the MT component of the wireless node and that corresponds to the first periodic resource, and wherein communicating using the modified first periodic resource is in accordance with the first periodic resource not satisfying at least one parameter of the one or more parameters.

19. The method of claim 16, wherein the one or more parameters include at least one of:
 a time gap between periodic resources that are associated with the MT component of the wireless node and periodic resources that are associated with the DU of the wireless node, or
 a range of time gaps between periodic resources that are associated with the MT component of the wireless node and periodic resources that are associated with the DU of the wireless node.

20. The method of claim 16, further comprising:
 receiving, from a control node or a parent node, an indication of the one or more parameters; or
 determining the one or more parameters.

21. The method of claim 16, wherein the one or more parameters are in accordance with at least one of:
 a processing capability of the wireless node,
 a latency requirement associated with the wireless node, or
 a packet delay budget (PDB) of a radio link control (RLC) channel associated with the first periodic resource or a second periodic resource.

22. The method of claim 16, further comprising:
 transmitting, to a control node or a parent node, an indication of information to be used to determine the one or more parameters; and
 receiving, from the control node or the parent node, an indication of the one or more parameters in accordance with transmitting the indication of information to be used to determine the one or more parameters.

23. The method of claim 16, further comprising:
 receiving, from a control node or a parent node, the priority flag via at least one of a radio resource control message, an F1 application protocol message, a medium access control (MAC) control element (MAC-CE), or an activation downlink control information.

24. The method of claim 16, wherein the first periodic resource includes one or more downlink resources allocated via downlink semi-persistent scheduling or one or more uplink resources allocated via an uplink configured grant.

25. The method of claim 16, wherein the resource type includes a configured distributed unit resource type, a not available (NA) resource type, a hard resource type, or a soft resource type.

26. The method of claim 16, further comprising transmitting, to a control node or a parent node, information associated with the first periodic resource that is available to the wireless node irrespective of the resource type to enable an adjustment to the resource allocation at the control node or the parent node.

27. The method of claim 16, wherein receiving the indication of the first periodic resource comprises receiving, from a control node, a configuration indicating grant information, for the first periodic resource, that indicates resource locations associated with the first periodic resource.

28. The method of claim 27, wherein receiving the configuration indicating grant information, for the first periodic resource, that indicates resource locations associated with the first periodic resource comprises receiving the configuration indicating full grant information.

29. The method of claim 28, wherein the full grant information at least indicates:
 the resource locations associated with the first periodic resource,
 a modulation and coding scheme (MCS) associated with the first periodic resource,
 a frequency domain resource block (RB) allocation associated with the first periodic resource, and
 an antenna port of the wireless node associated with the first periodic resource.

30. The method of claim 27, wherein receiving the configuration indicating grant information, for the first periodic resource, that indicates resource locations associated with the first periodic resource comprises receiving the configuration indicating partial grant information that at least indicates the resource locations associated with the first periodic resource.

* * * * *